July 28, 1936.  H. E. GOLBER  2,049,256
CUTTER
Filed Oct. 17, 1932   21 Sheets-Sheet 1

Inventor:
Hyman Eli Golber

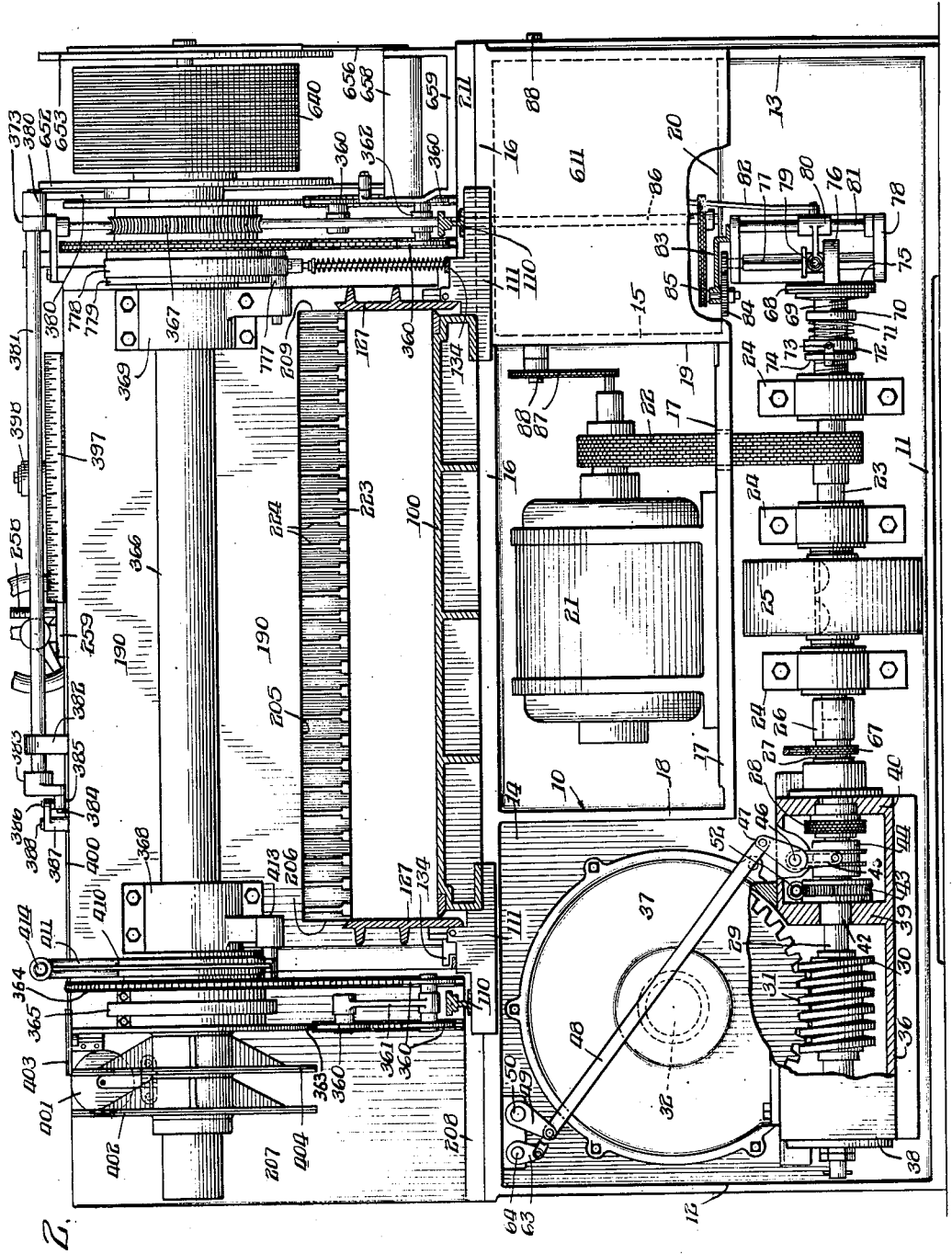

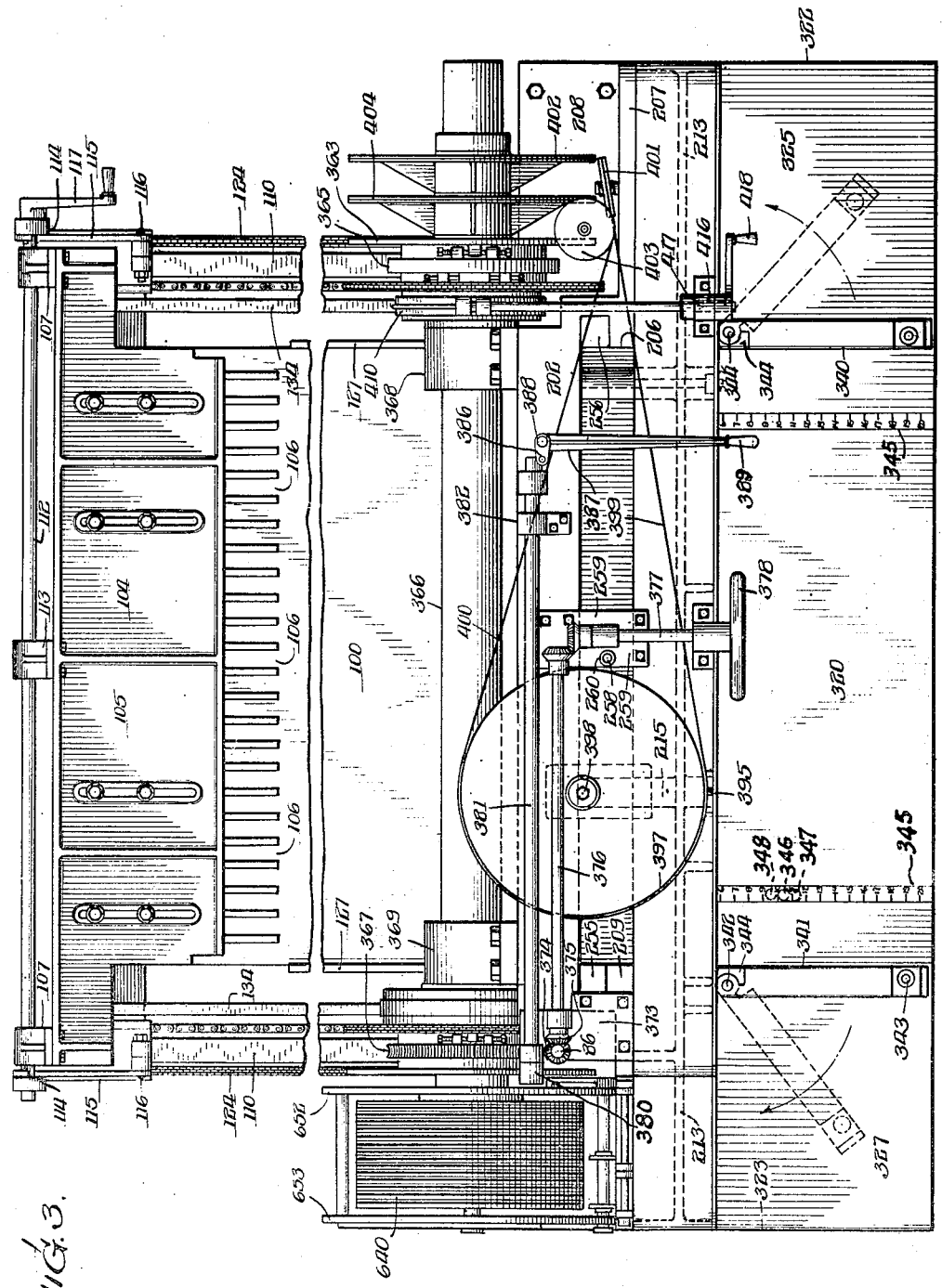

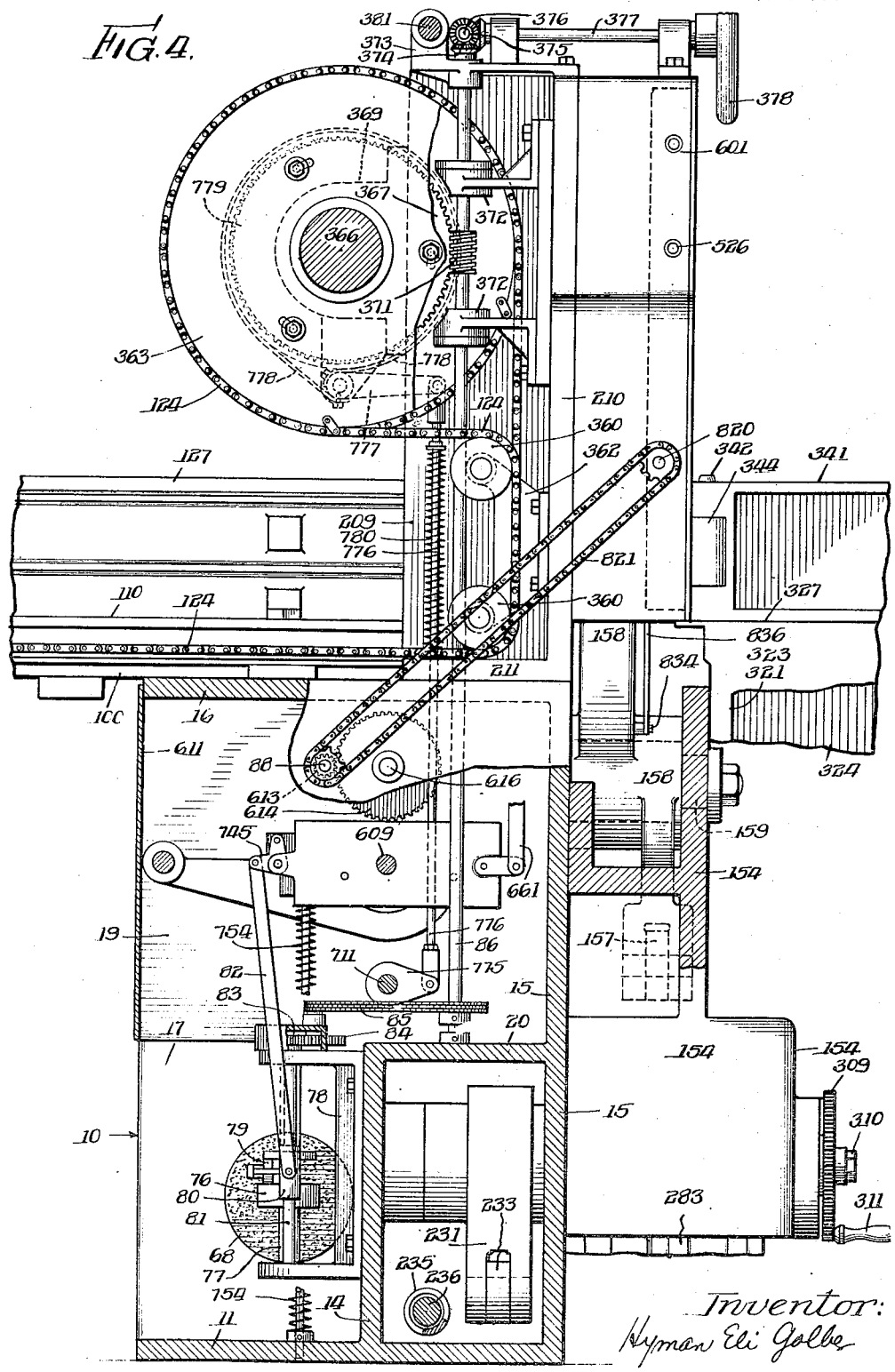

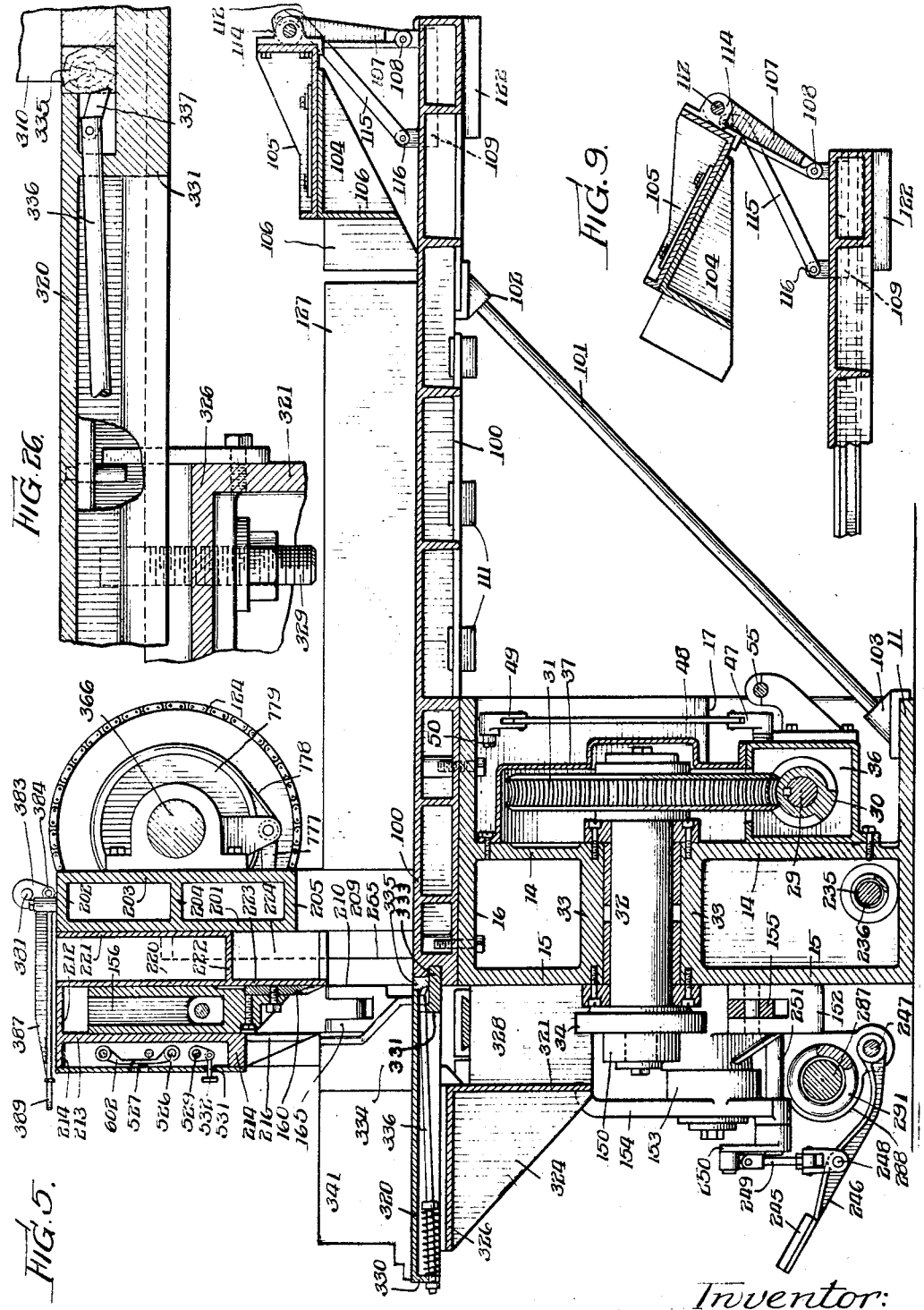

July 28, 1936.  H. E. GOLBER  2,049,256
CUTTER
Filed Oct. 17, 1932   21 Sheets-Sheet 6
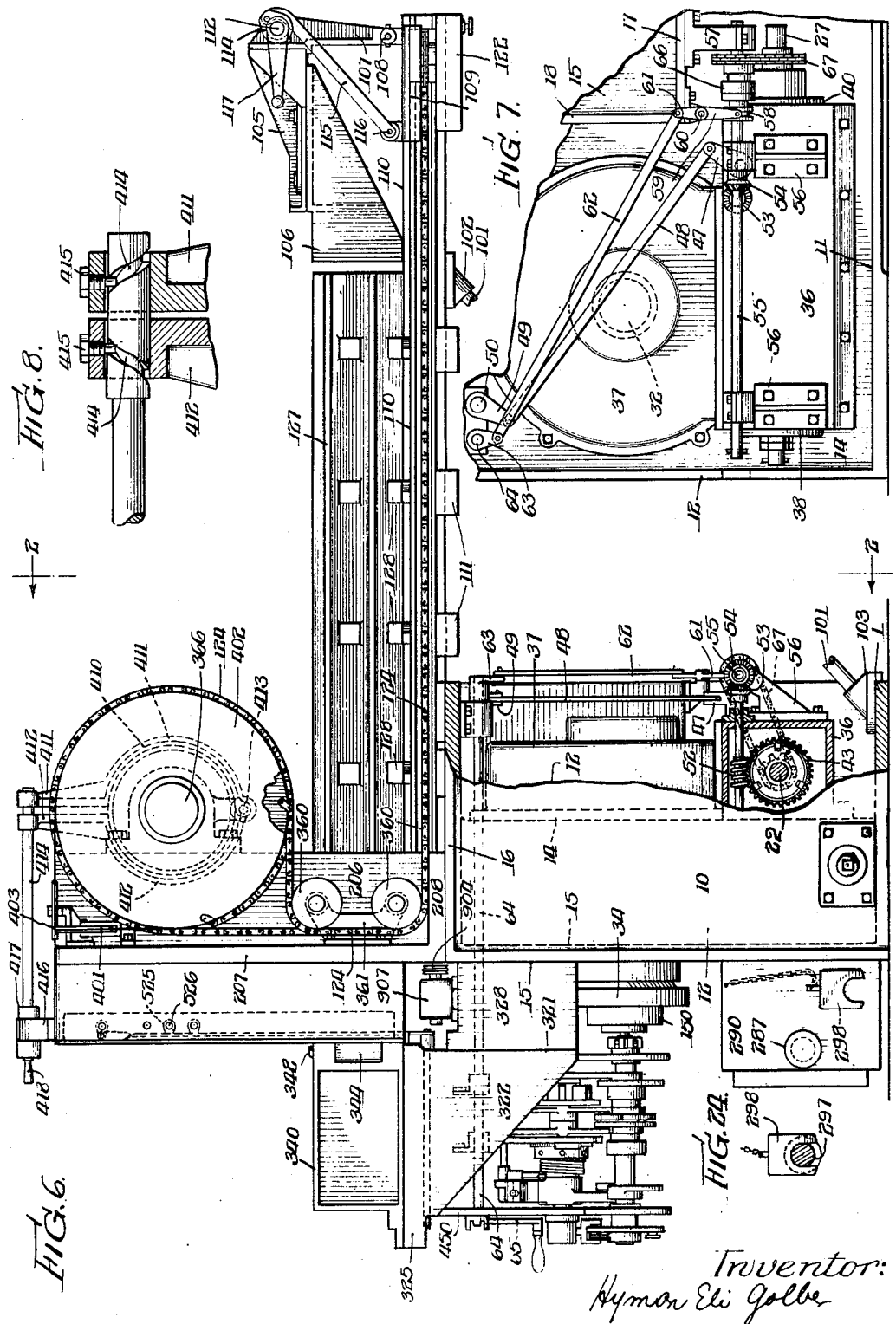
Inventor:
Hyman Eli Golber

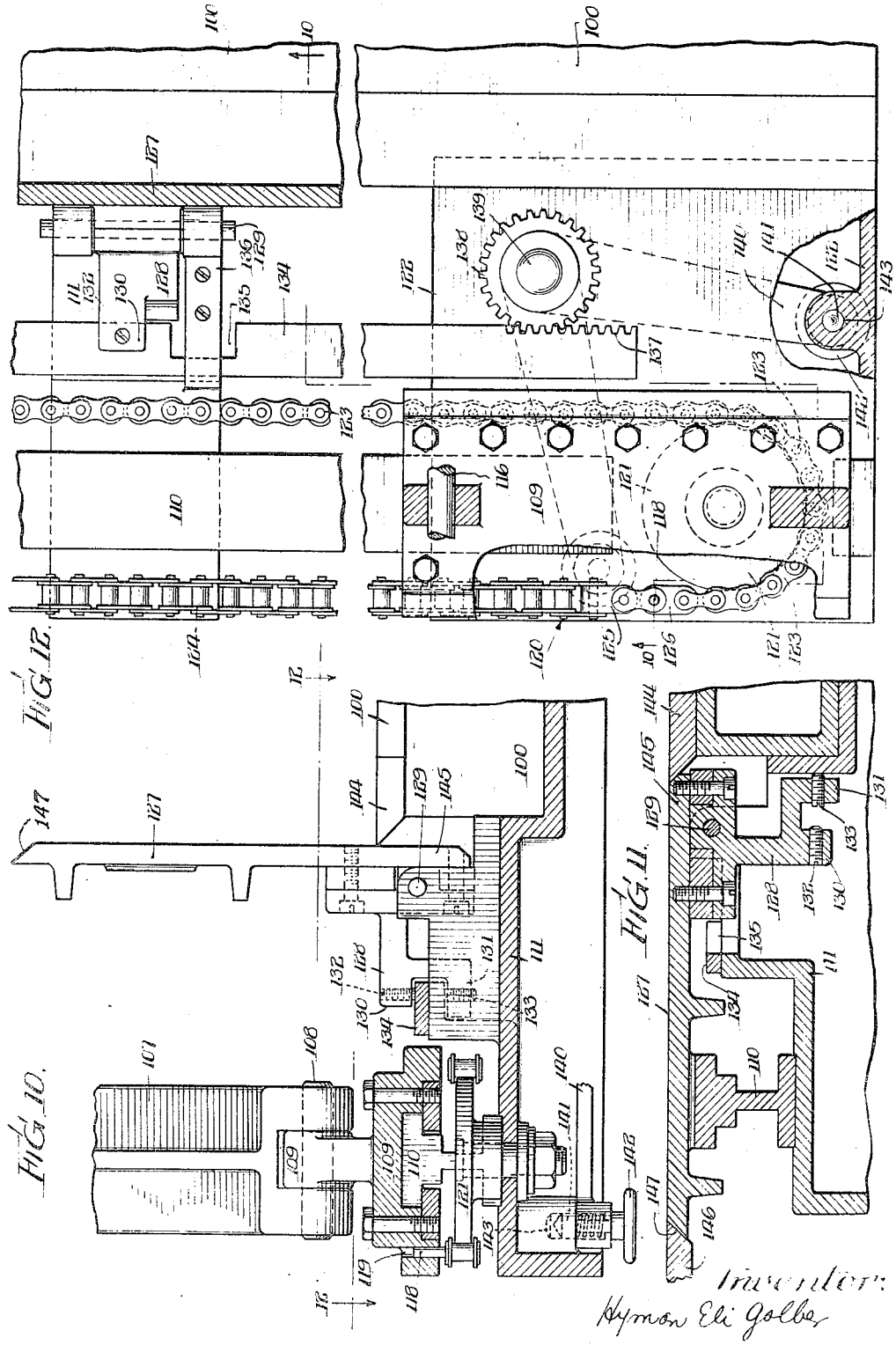

July 28, 1936. H. E. GOLBER 2,049,256
CUTTER
Filed Oct. 17, 1932 21 Sheets-Sheet 8
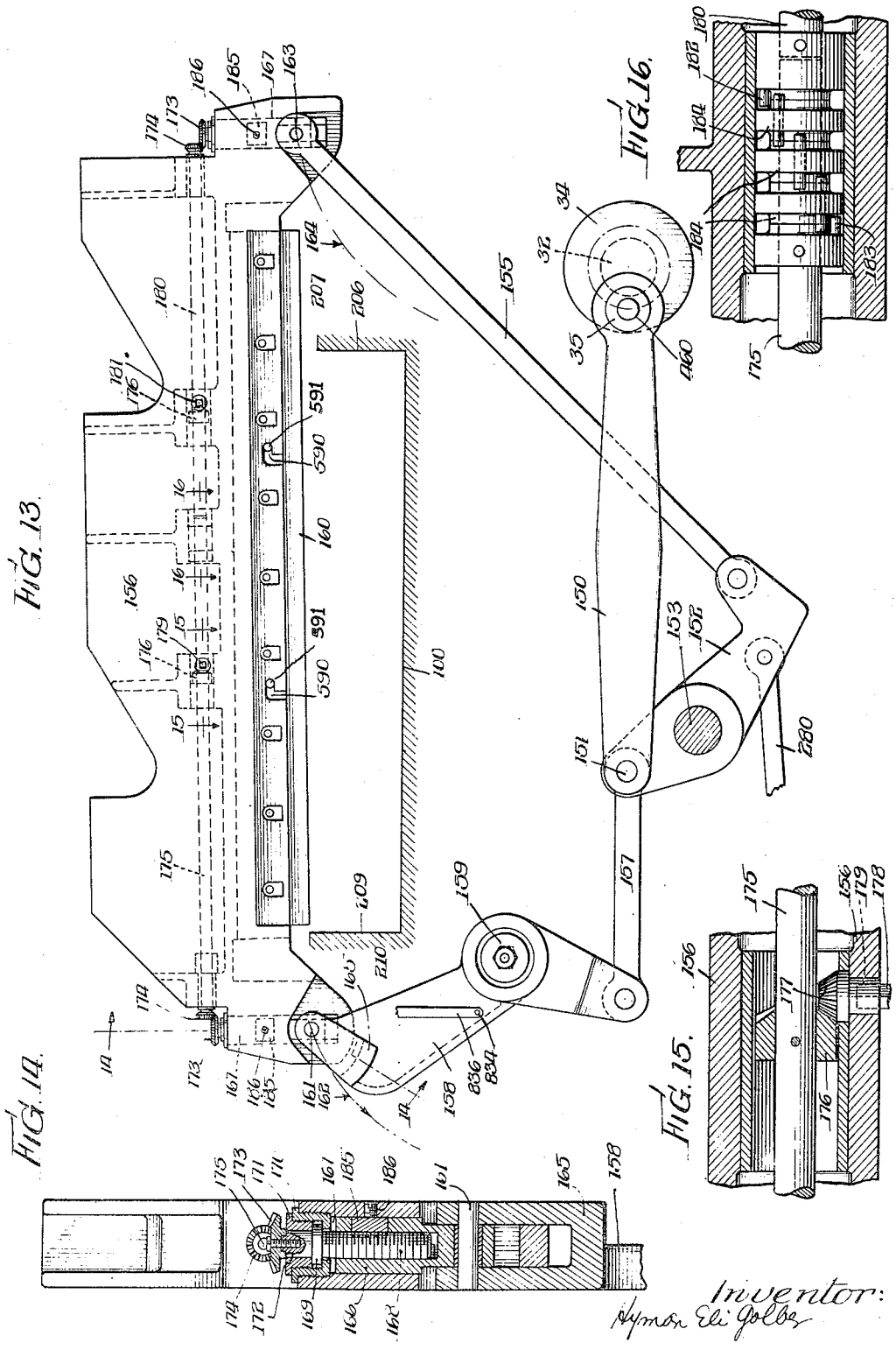

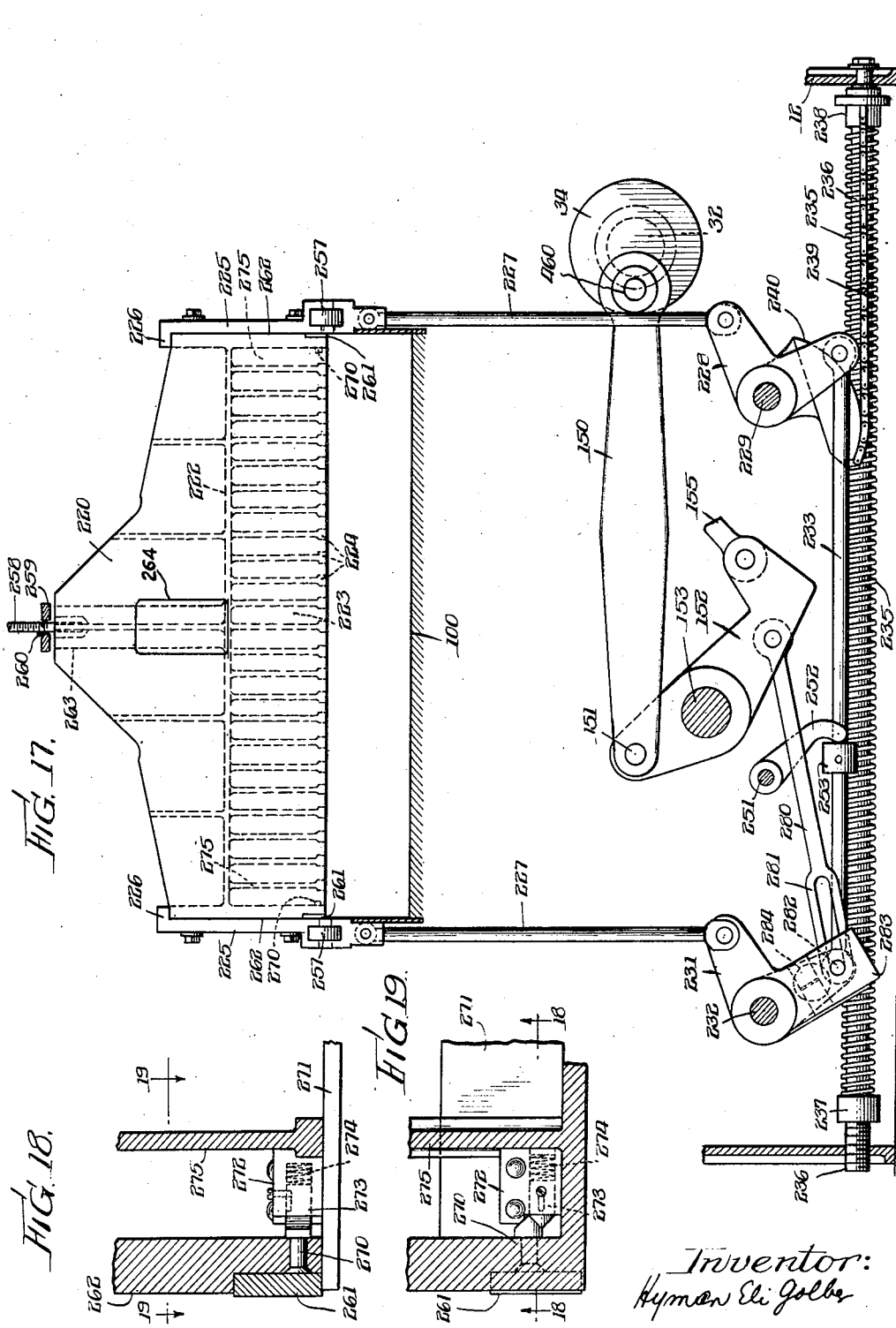

July 28, 1936.　　　　H. E. GOLBER　　　　2,049,256
CUTTER
Filed Oct. 17, 1932　　　21 Sheets-Sheet 10
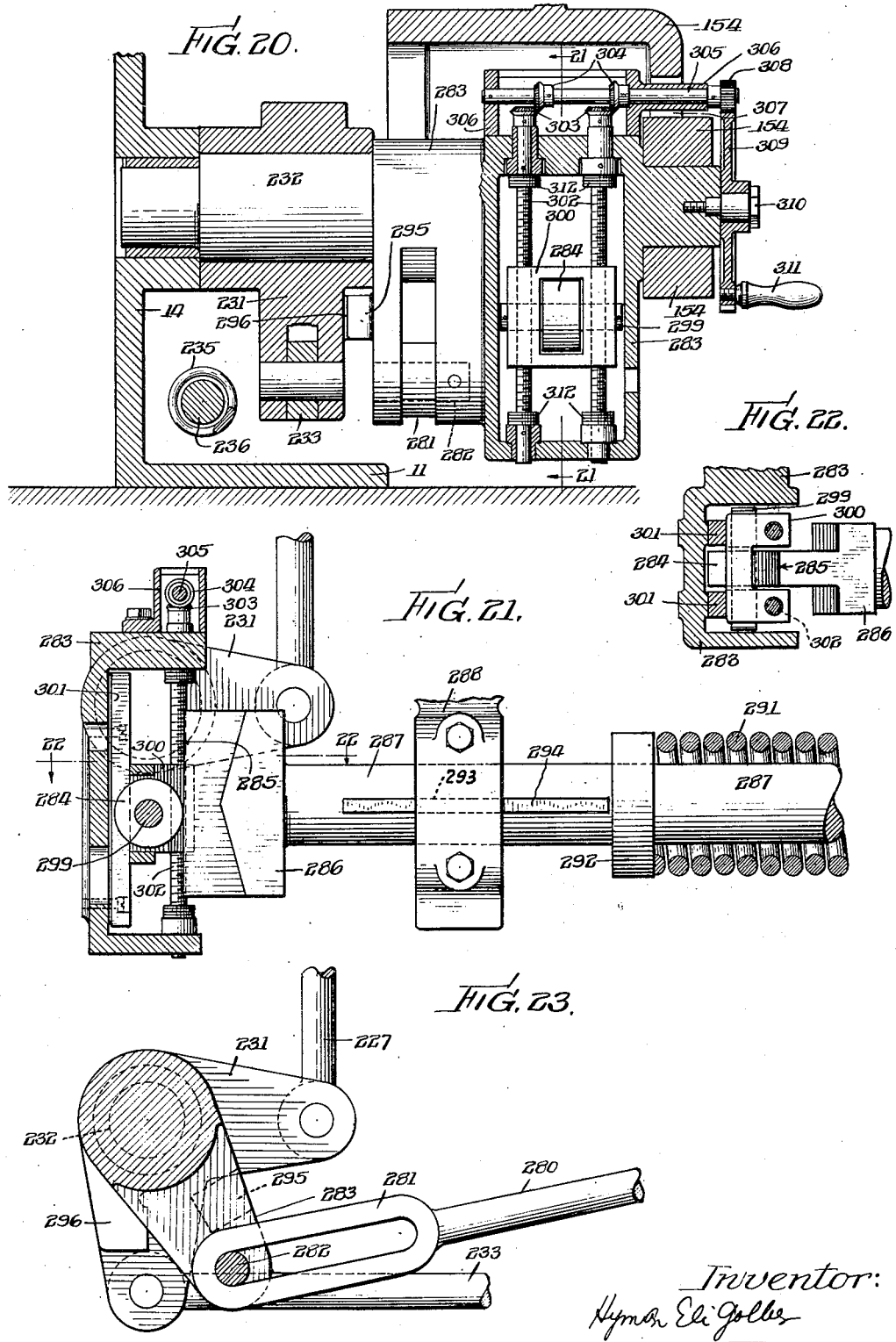
Inventor:
Hyman Eli Golber

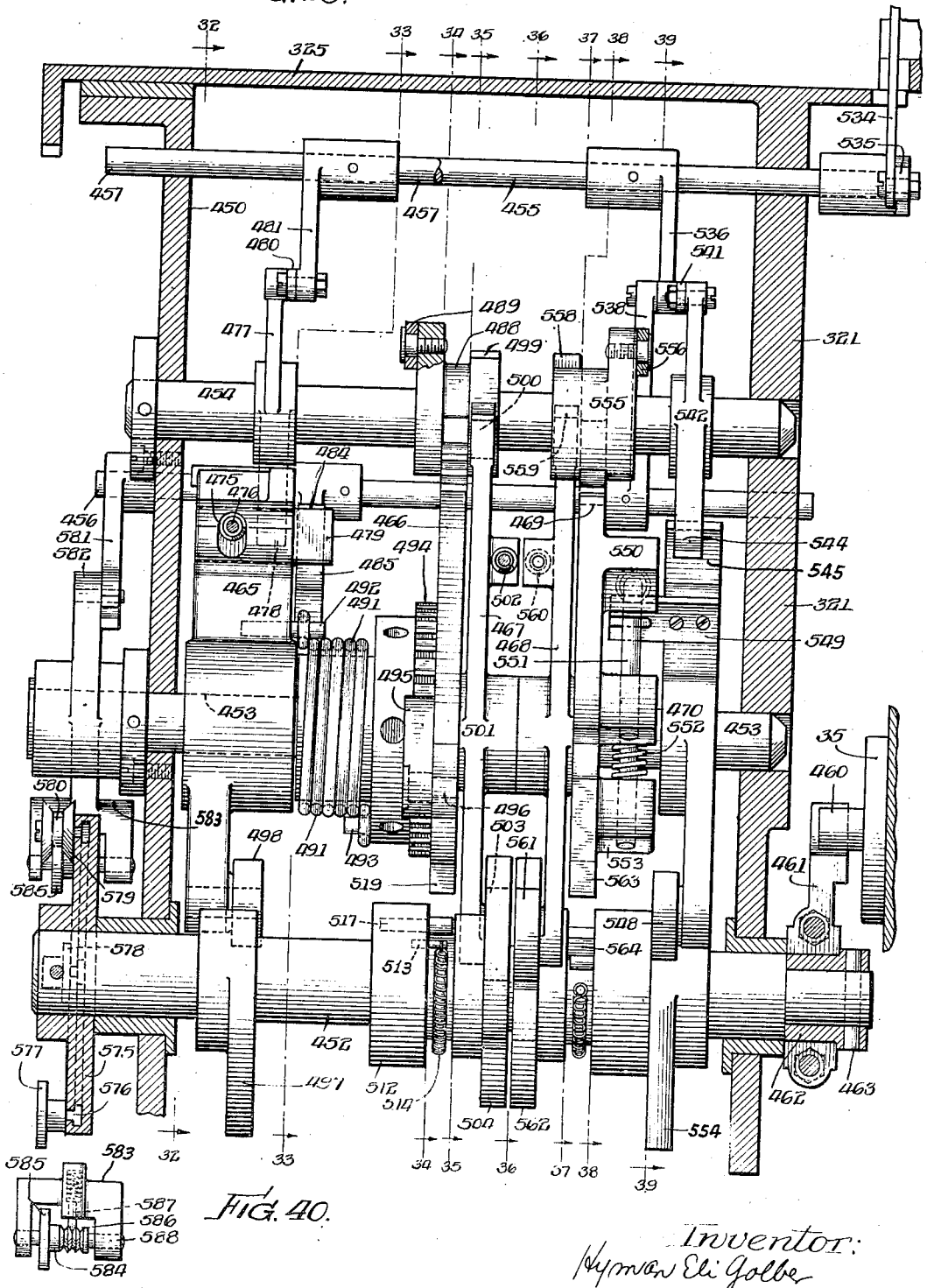

July 28, 1936.  H. E. GOLBER  2,049,256
CUTTER
Filed Oct. 17, 1932  21 Sheets-Sheet 12
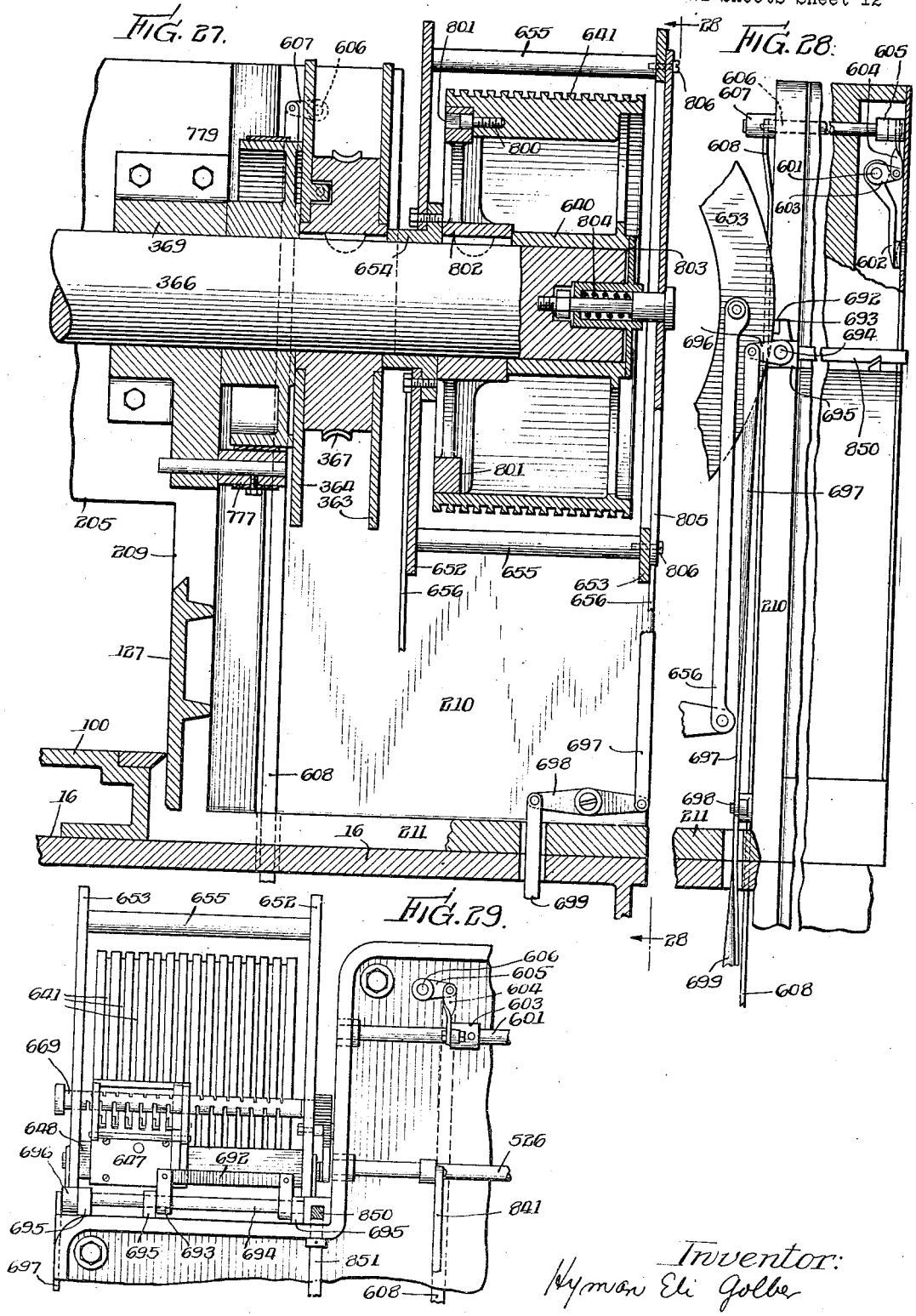

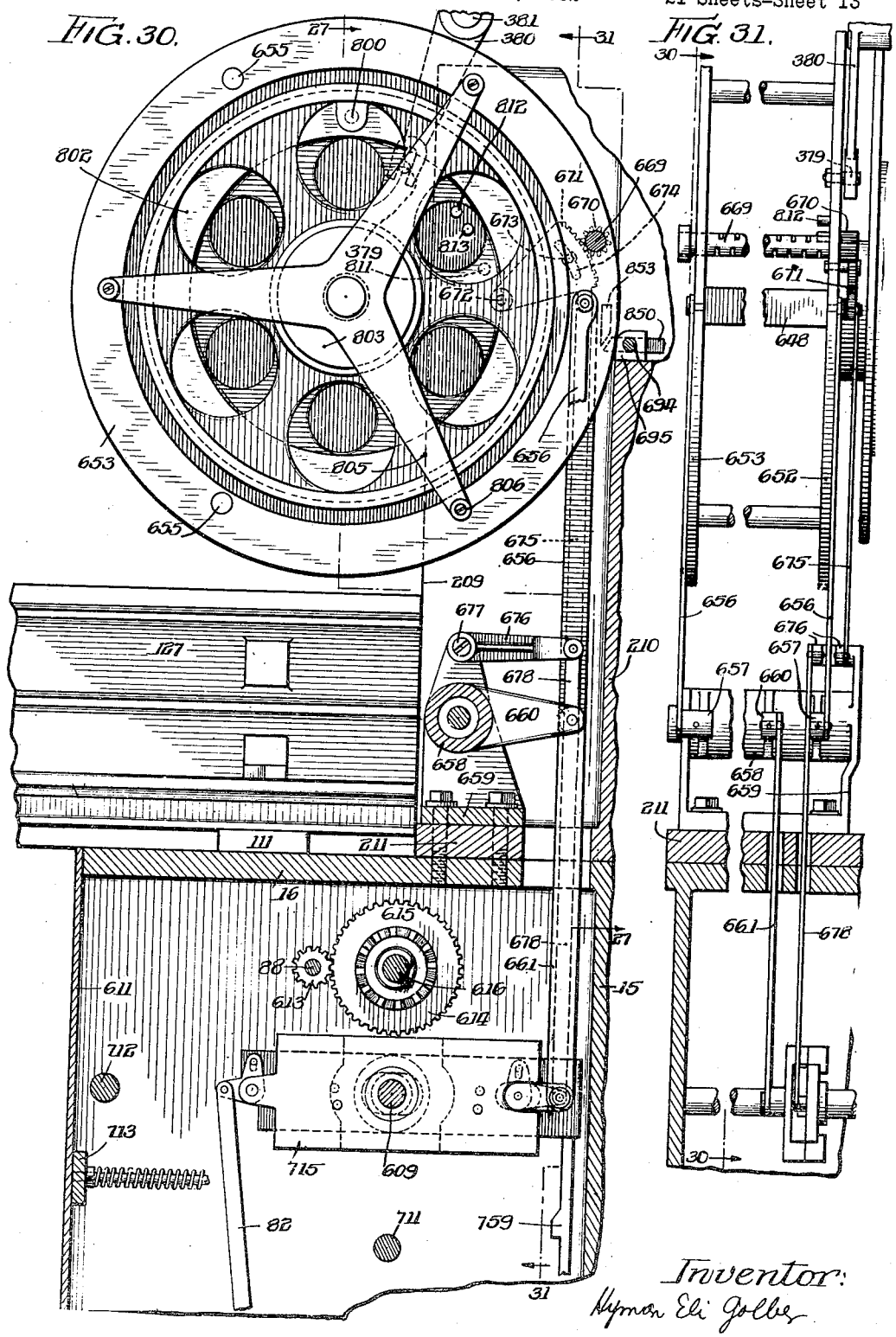

July 28, 1936.  H. E. GOLBER  2,049,256
CUTTER
Filed Oct. 17, 1932  21 Sheets-Sheet 14

Inventor:
Hyman Eli Golber

July 28, 1936.    H. E. GOLBER    2,049,256
CUTTER
Filed Oct. 17, 1932    21 Sheets-Sheet 15

Inventor:
Hyman Eli Golber

July 28, 1936.  H. E. GOLBER  2,049,256
CUTTER
Filed Oct. 17, 1932  21 Sheets-Sheet 16

Inventor:
Hyman Eli Golber

July 28, 1936.　　　　　H. E. GOLBER　　　　　2,049,256
CUTTER
Filed Oct. 17, 1932　　　21 Sheets-Sheet 17
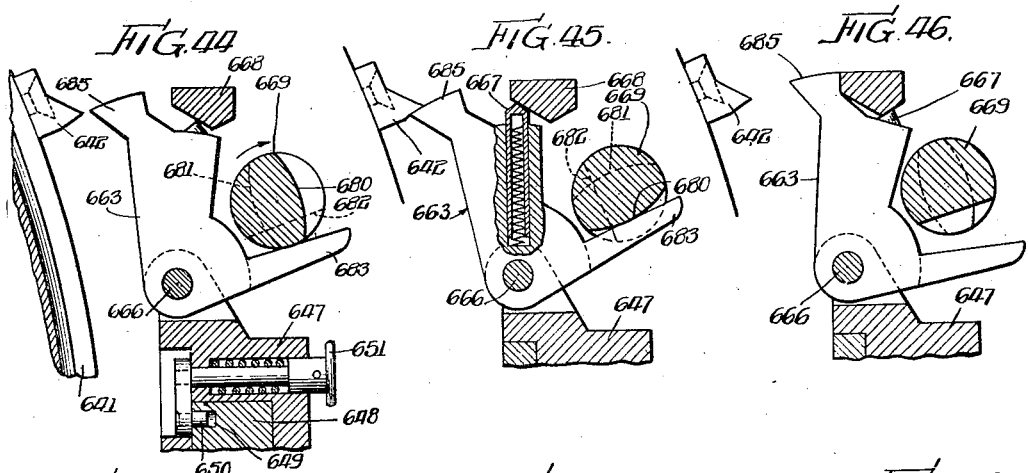
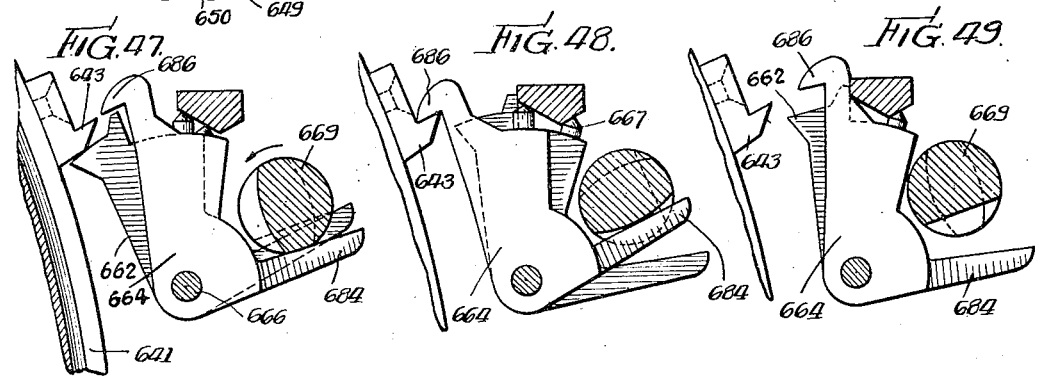
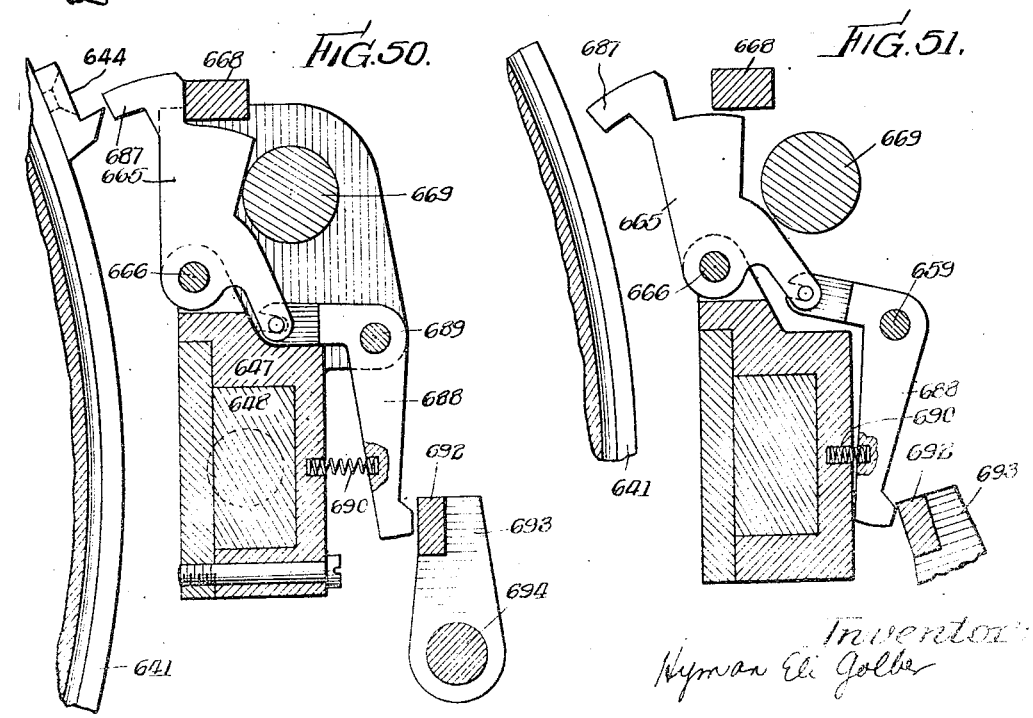
Inventor
Hyman Eli Golber July 28, 1936.   H. E. GOLBER   2,049,256
CUTTER
Filed Oct. 17, 1932   21 Sheets-Sheet 18
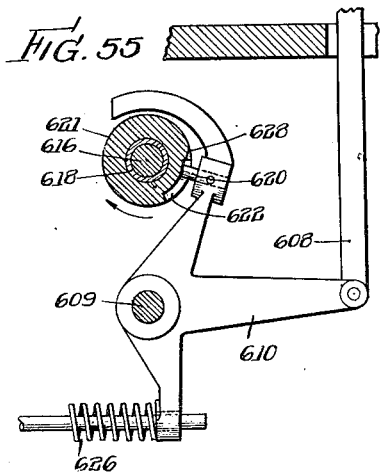
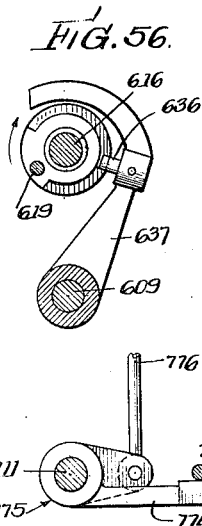
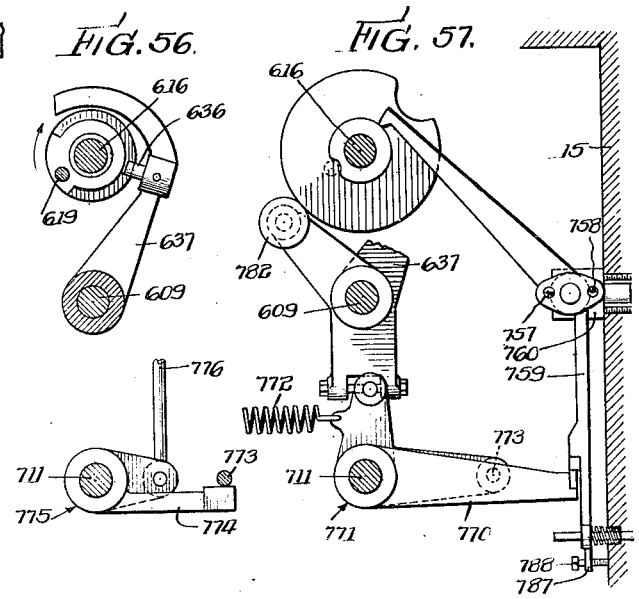
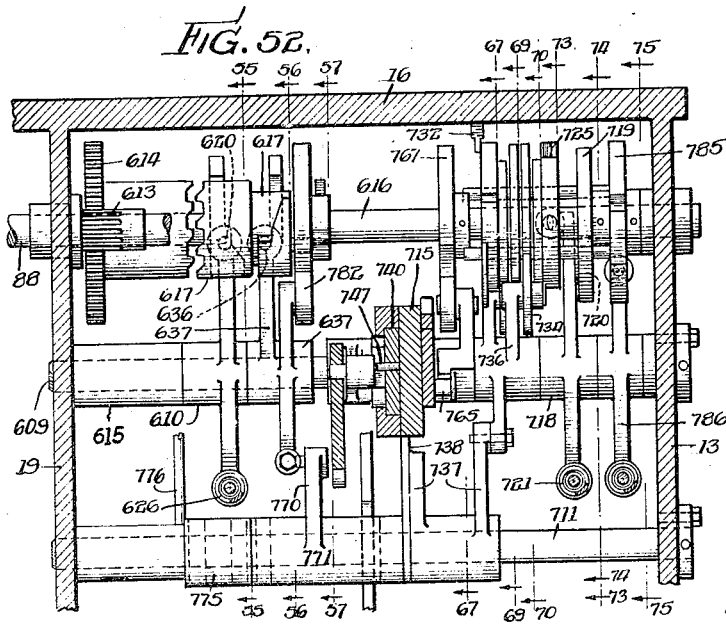
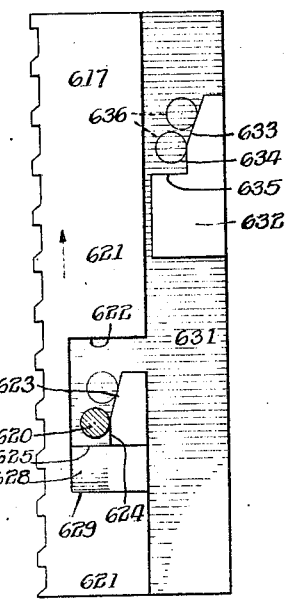
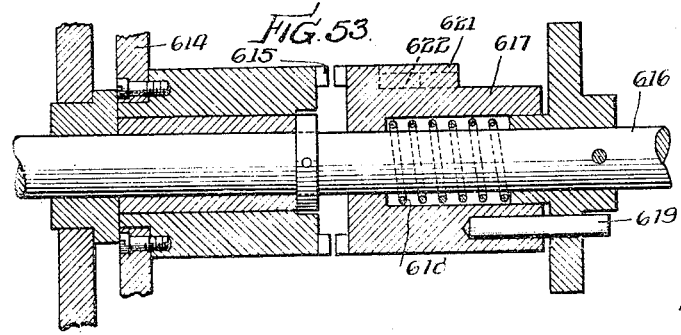
Inventor:
Hyman Eli Golber

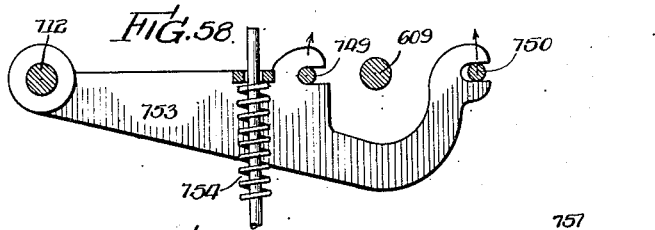
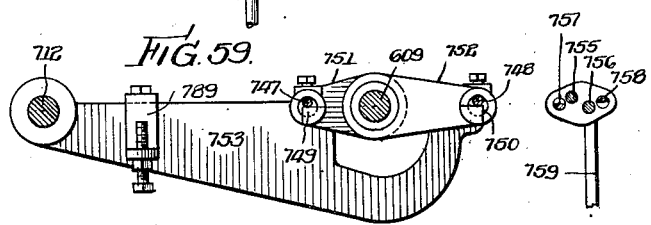
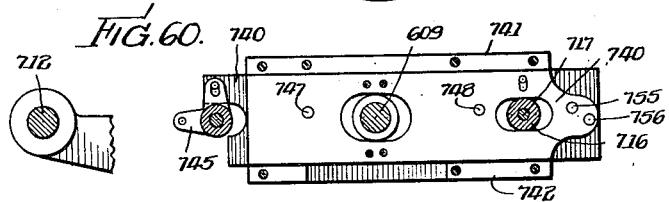
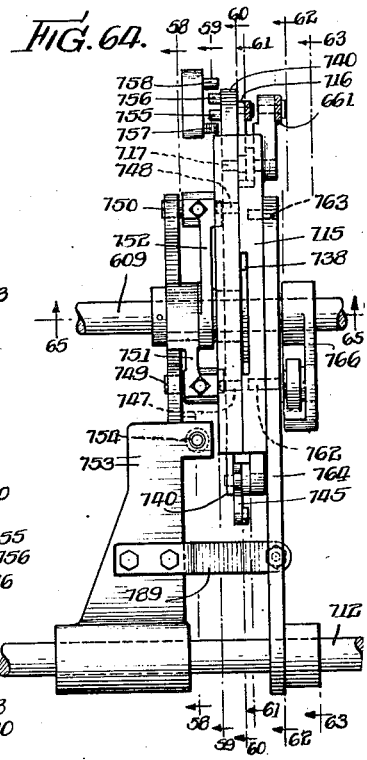
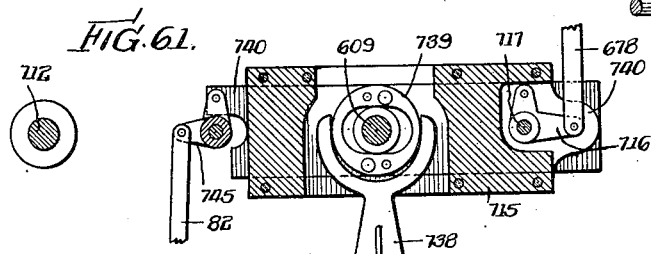
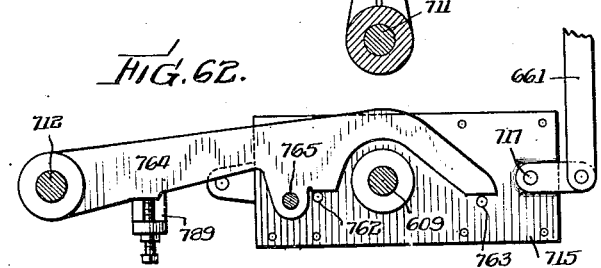
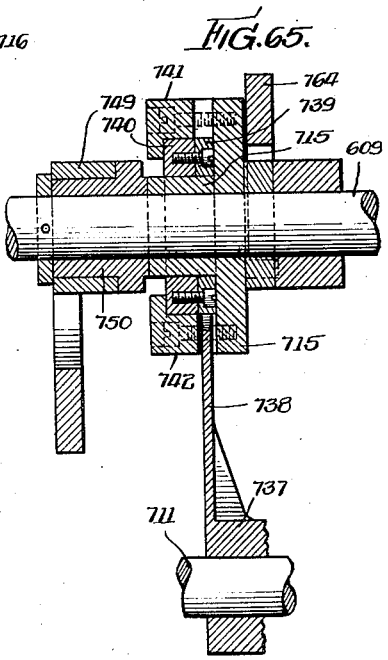
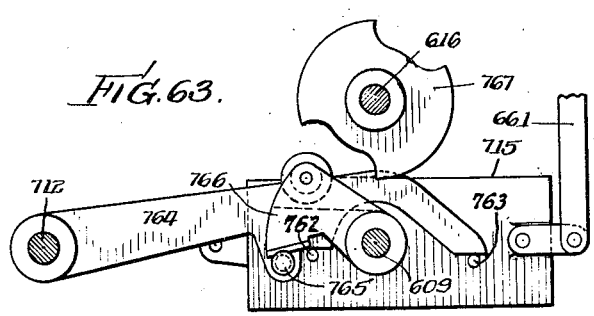

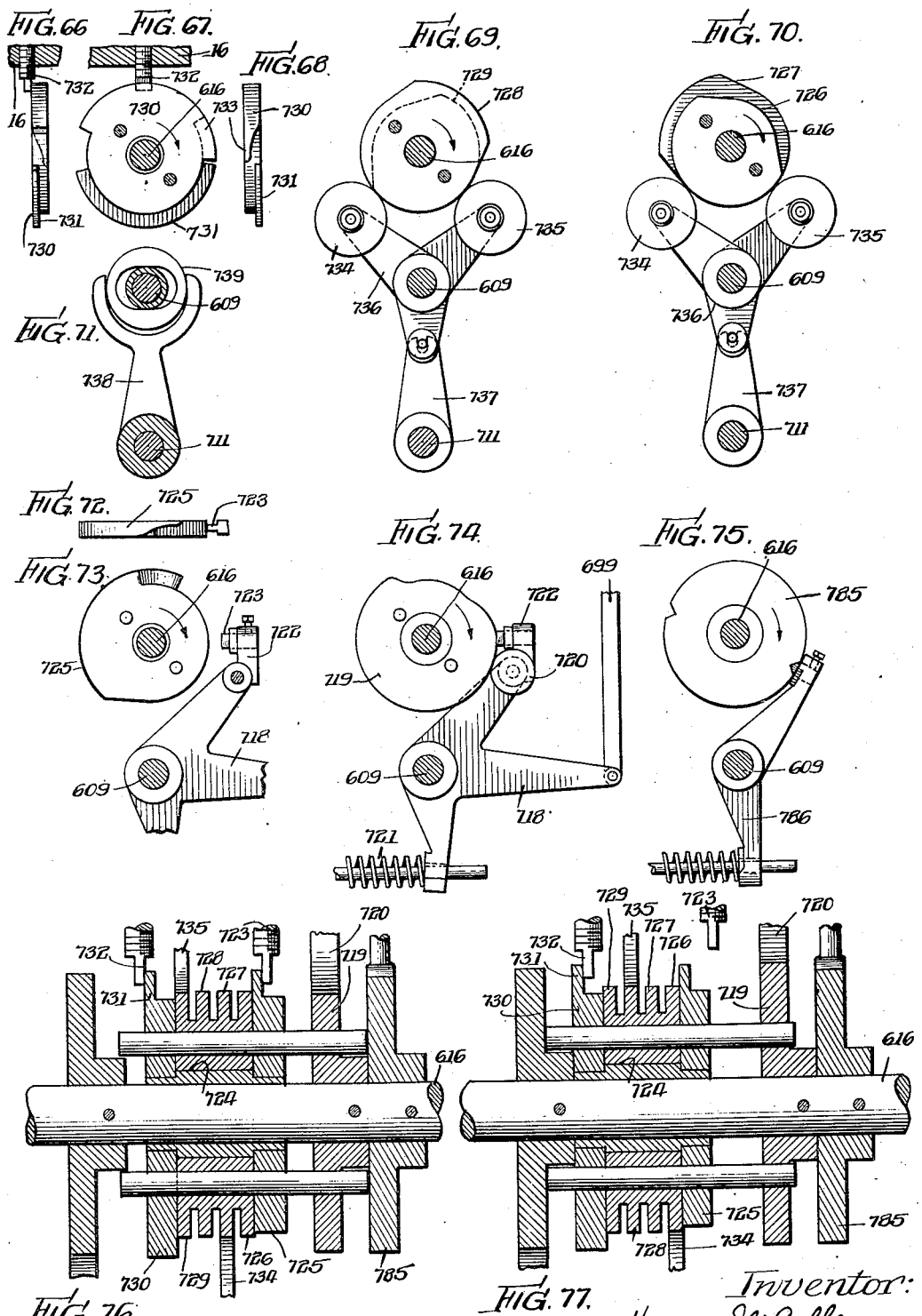

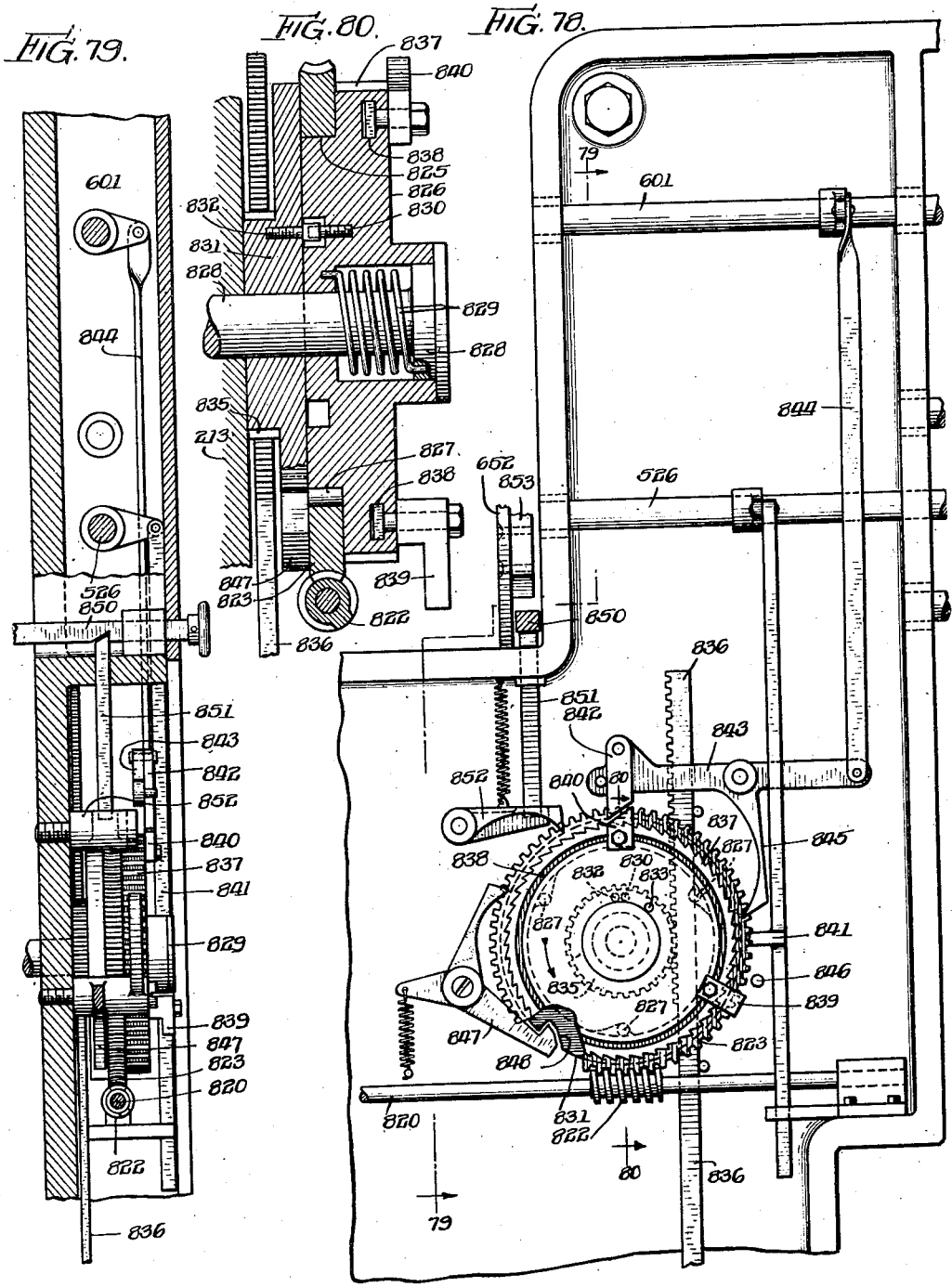

Patented July 28, 1936

2,049,256

UNITED STATES PATENT OFFICE 2,049,256

CUTTER

Hyman Eli Golber, Chicago, Ill., assignor to The Miehle Printing Press and Manufacturing Company, Chicago, Ill., a corporation of Illinois Application October 17, 1932, Serial No. 638,043

51 Claims. (Cl. 164—48)

This invention relates to a cutting machine, or cutter of the kind sometimes called a guillotine. Like other cutters of its class, this cutter has the three basic moving elements, the knife, the clamp, and the pusher; also a rear table and front table.

These mentioned elements have been very materially modified and improved. Besides the modifications, there have been introduced a number of features which are completely novel. Of these, some are manually operated, others are automatically operated. The purpose of the invention is to make a cutter which is safer, produces better cutting, is more convenient for the operator, handles work larger than previously possible on a machine of this size, and turns out much more work per hour. To show this more clearly, some of the improvements will be mentioned in more specific detail.

The mounting for the motor is novel. The drive from the motor to the bull gear is novel. Aside from the motor power, there are no electrically operated parts on the machine, but nevertheless it is operated by push buttons.

The knife drive is radically different. The knife insertion is new. So is the knife adjustment. There are automatic means for stopping the knife at the bottom of its cut.

There is a quick stop mechanism for the knife. There is a knife reverse mechanism so that the knife backs up without completing its stroke.

The method of holding the knife stick is new.

The clamp drive is new. The foot operation of the clamp is easy, as there are novel guiding means. The clamp pressure adjustment is very rapid. The clamp bottom plate mounting is new.

The back table is not split. It has lowerable side walls. It is supported wholly from the machine and not partly from the floor.

The pusher is liftable.

There is a stepping mechanism for the pusher, advancing it successively any number of steps. These steps can be of any length, large or small, equal or unequal, forward or back. The stepping mechanism steps the pusher automatically.

The number of possible steps to which the machine may simultaneously carry is quite large. This permits the complete setting up for a job of numerous steps. It also permits the carrying of two or more smaller jobs simultaneously. The set up is very rapid.

There is a waiting mechanism for repeat work. The waiting time after a cut and before a step is adjustable. So is the waiting time after a step and before a cut adjustable.

There is a grinder to grind the knife in place on the machine.

There are many other novel features described in the specification.

In the accompanying drawings showing the machine,

Figure 2 is a rear elevation;

Figure 3 is a plan, a part being broken out;

Figure 4 is a broken sectional elevation, looking from the left.

Figure 5 is a sectional elevation looking from the right, along the line 5—5, Figure 1;

Figure 6 is a right elevation, partly broken out;

Figure 32:
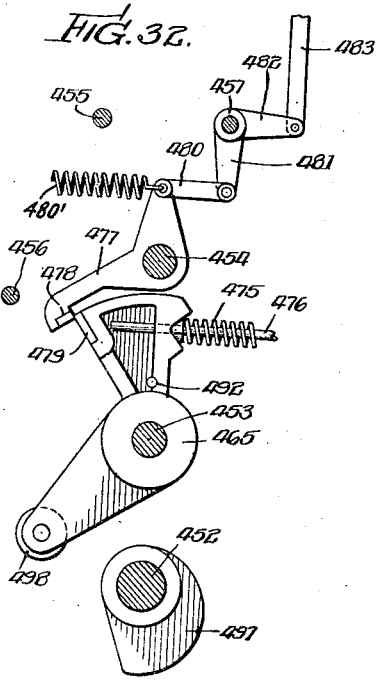
Figure 33:
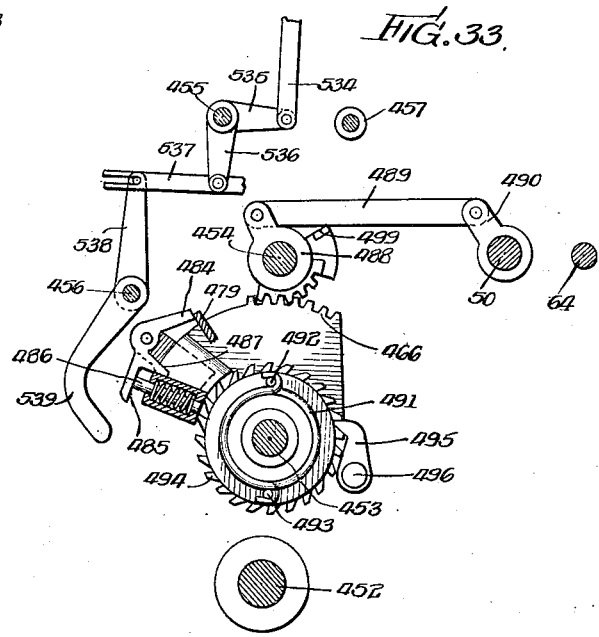
Figure 34:

Figure 7, Sheet 6, is a rear elevation showing the knife reverse clutch;

Figure 8, Sheet 6, shows a detail of the pusher feed lock;

Figure 9, Sheet 5, shows the pusher in its raised position;

Figures 10, 11, 12, Sheet 7, show on a large scale parts of the back table, pusher and feed; Figure 10 is a rear elevation partly in section; Figure 11 is a similar view with some of the parts in different positions; Figure 12 is a plan;

Figures 13, 14, 15, 16, Sheet 8, show knife mechanism; Figure 13 shows the knife mechanism by itself, all else being removed; Figure 14 shows a sectional elevation of Figure 13, taken along the lines 14, Figure 13, and showing the knife adjusting mechanism on a larger scale; Figure 15 shows the handle part and is a sectional plan; Figure 16 is a similar view showing the "lag" part;

Figures 17, 18, 19, Sheet 9, show clamp mechanism; Figure 17 is an elevation of the clamp mechanism showing the raising spring and having the hiding parts removed; Figures 18 and 19 are enlarged views showing the clamp auxiliary plate; Figure 18 is an elevation; Figure 19 is a plan;

Figures 20, 21, 22, 23, Sheet 10, show parts of the power operation of the clamp on a large scale; Figure 20 is an elevation partly in section of the power lever, looking from the left; Figure 21 is a front elevation; Figure 22 is a plan of some of the parts shown in Figure 21; Figure 23 is a front elevation of some rear parts otherwise hidden;

Figure 24, Sheet 6, lower left hand corner, is a view of the "rider plate";

Figure 25, Sheet 11, shows the automatic cut mechanism; it is an elevation from the right; some parts that would hide the others have been removed;

Figure 26, Sheet 5, shows on a large scale, the mechanism for holding the wood stick; it is a sectional elevation looking from the right;

Figures 27, 28, 29, Sheet 12, show parts of the feeding and stepping mechanism; Figure 27 is the view similar to Figure 2, but showing on an enlarged scale the portion on the upper right of Figure 2, and drawn mainly in section; Figure 28 is an elevation from the left showing cooperating parts, and Figure 29 is an enlarged front elevation of some of the same parts; Figure 29 shows the parts in the upper left corner of Figure 1;

Figures 30 and 31, Sheet 13, show some of the connections between the cage and the feeder-base; Figure 30 is an elevation from the left, the wall of the main casting having been broken away; Figure 31 is a similar view from the front (not the rear), showing the connections, the hiding parts having been removed;

Figure 32, 33, 34 and 35, Sheet 14, show partial assemblies of the knife direct mechanism; Figure 32 shows parts most to the front of the machine; Figure 33, parts are just behind; Figure 34, further behind, and Figure 35, still further behind.

Figure 36:
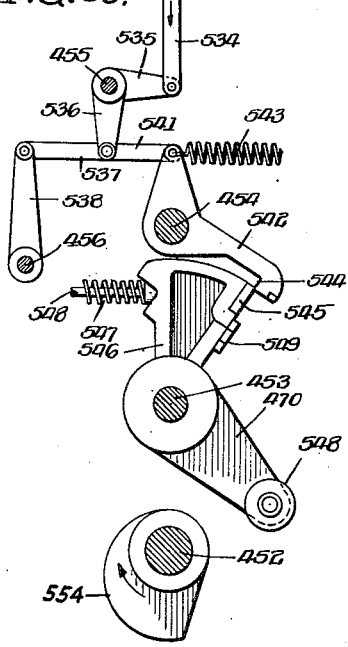
Figure 37:
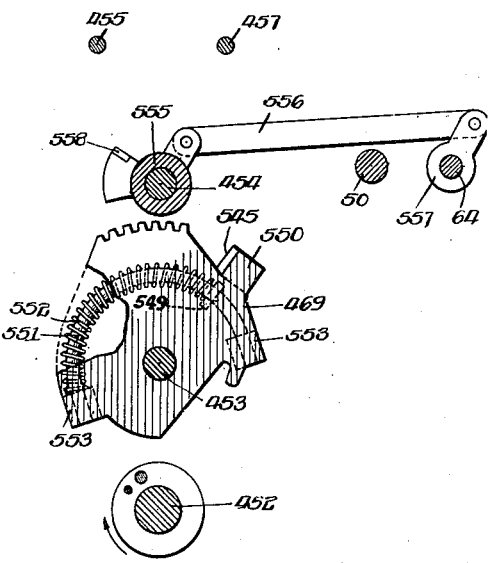
Figure 38:
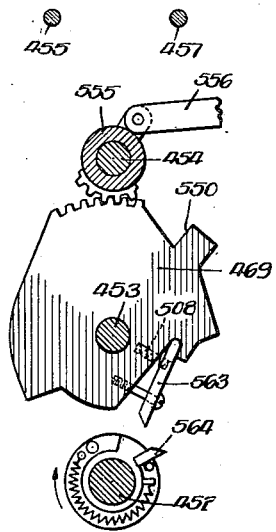
Figure 39:
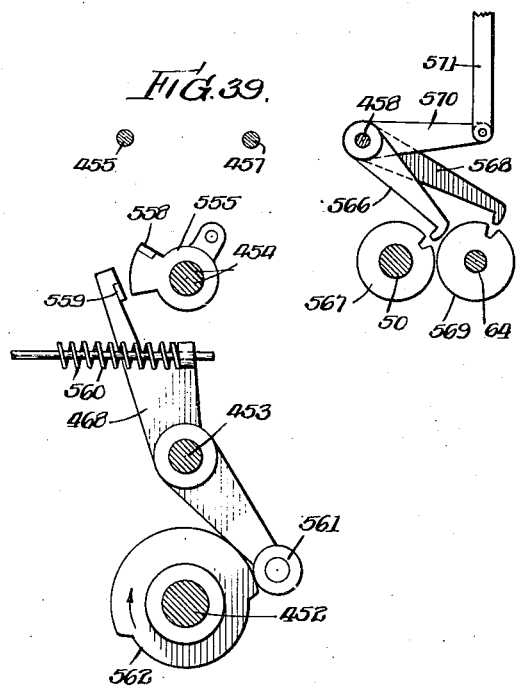
Figure 41:
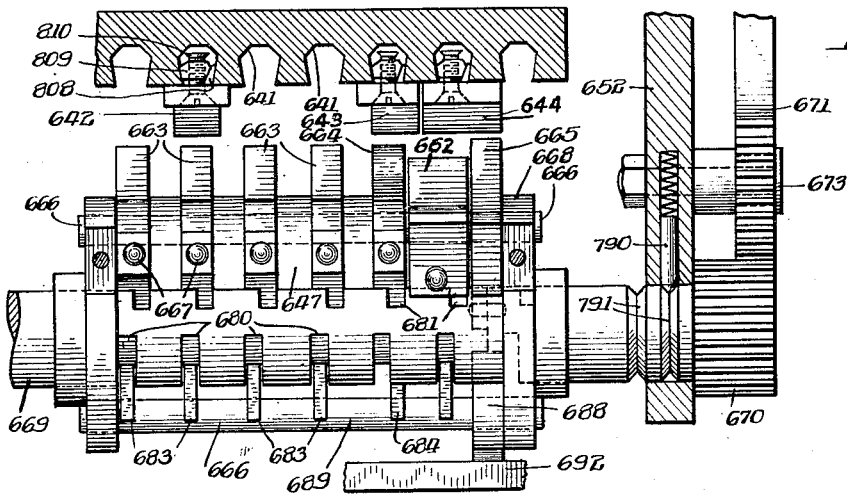
Figure 42:
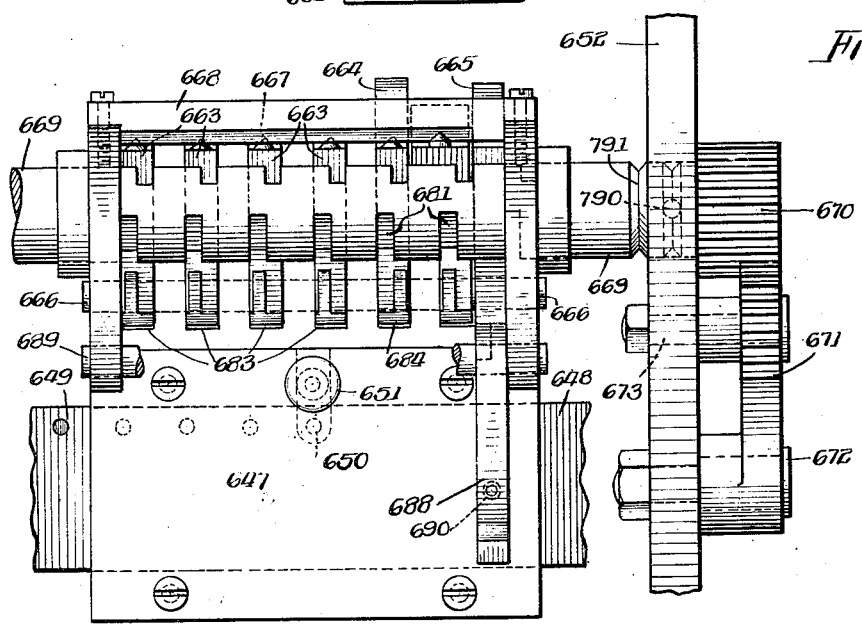
Figure 43:
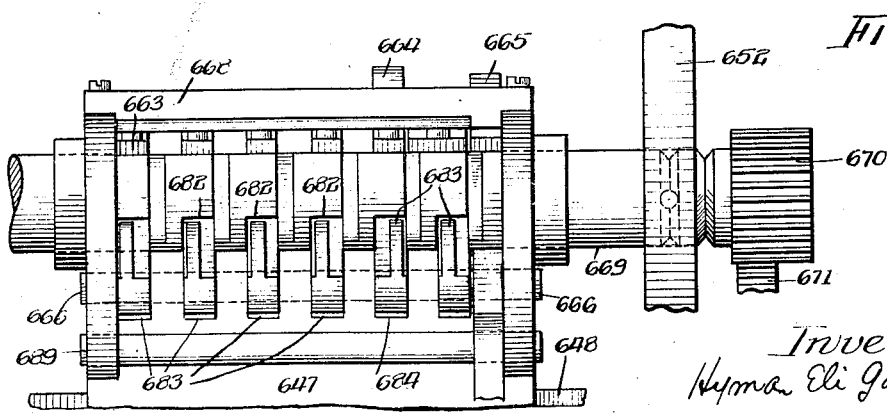

Figures 36, 37, 38, 39, Sheet 15, show partial assemblies of the knife reverse mechanism; the assemblies are in order; Figure 36 showing those most to the rear; Figure 39 those most to the front;

Figure 40, Sheet 11, lower left hand corner, shows some details of the knife-stop-mechanism;

Figures 41, 42, 43, Sheet 16, show the detector sled; Figure 41 is a plan; Figure 42 is a front elevation; Figure 43 is a view similar to Figure 42, with some of the parts in different positions;

Figures 44, 45, 46, 47, 48, 49, 50, 51, Sheet 17, show the operation of the detectors; Figures 44, 45, 46 show the fore-detector; Figures 47, 48, 49 show the back-detector; Figures 50, 51 show the direction detector;

Figures 52, 53, 54, 55, 56, 57, Sheet 18, show parts of the stepper-mechanism; Figure 52 is a rear elevation of the mechanism within the main casting; Figure 53 shows some details of the clutch; Figure 54 is a development of the jump clutch; Figures 55, 56, 57 show assemblies in progressive order, Figure 55 showing the innermost layer;

Figure 58, 59, 60, 61, 62, 63, 64, 65, Sheet 19, also show stepper-mechanism; Figures 58, 59, 60, 61, 62, 63 show partial assemblies in progressive order; of these Figure 58 is innermost; Figures 64 and 65 are a rear plan and a rear sectional elevation of some of the parts shown in the figures on the sheet to more clearly bring out their connection and arrangement;

Figures 66, 67, 68, 69, 70, 71, 72, 73, 74, 75, 76, 77, Sheet 20, show more details and partial assemblies of the stepper-mechanism; of these Figures 66, 67, 68 show one cam; Figure 69 is a view of the prepost lever and one pair of its cams; Figure 70 shows the same prepost lever and the other pair of its cams; Figure 71 shows the prepost fork; Figures 72 and 73 show the direction lever and its shiftable cam; Figure 74, the direction lever and direction cam; Figure 75, the locating lever and its cam; Figures 76 and 77 are sectional rear elevations of the compound cam; Figure 76 is the unshifted or back-step position of the cam; Figure 77 is the shifted or fore-step position;

Figures 78, 79, 80, Sheet 21, show the wait mechanism; Figure 78 is a front elevation and Figure 79 a left elevation thereof; Figure 80 is on a larger scale and is a sectional left elevation taken on the line S80, Figure 78;

Frame and motor

The machine has a main frame casting 10, see Figures 1, 2, 3, 4, 5, 6, which is roughly box shaped. It has a bottom 11, which is cast thicker at its ends and relieved at the middle to thereby more readily accommodate itself to any unevenness of the floor, see Figure 2, which, however, being a view from the rear, has the rights and lefts interchanged. Rising from the bottom are a right wall 12, a left wall 13, a central wall 14, and a front wall 15. There is also a top 16, to which the front wall, right wall and left wall join, and the central wall joins at its right side. The central upper portion of the frame has a platform 17, united to the central wall beneath, and to the front wall in-front. The platform has a right wall 18 and a left wall 19, which unite the platform to the front wall and the top. To the left of the platform and in line with it is a smaller platform 20, uniting the platform left wall 19, the central wall 14, the left wall 13, and the front wall 15.

This main frame (in fact the whole machine), has in it a number of holes, for accessibility and easy introduction of the parts. It has also other holes for visibility, air circulation, etc. These holes are not all shown in the drawings.

Mounted on the platform 17 is a motor 21, which, by means of a chain 22, drives a shaft 23, supported in bearings 24, bolted to the central wall 14. On the shaft is mounted a steel fly wheel 25. The fly wheel runs at the speed of the motor, and thus can be made of comparatively small diameter. The fly wheel shaft extends to the right where, by means of a coupling 26, including some safety shear pins (not shown), it is connected to the input shaft 27 of a friction clutch 28, embracing a shaft 29, which has mounted on it the bull-worm 30, meshing with the bull-worm gear wheel 31. The latter is mounted on the bull shaft 32, rotating in a cylindrical tube 33, Figure 5, specially cast for it, and uniting the central wall 14 and the front wall 15. The bull shaft extends beyond the front wall 15, and on its end carries the bull crank 34 and bull crank pin 35, which operates the knife and clamp, as will be later explained.

The bull worm shaft 29 runs on antifriction bearings (not shown) and is supported by a box 36, which contains oil to lubricate the worm 30 and wheel 31. The box is bolted to the central wall and to prevent the oil from splashing out, there is a cover 37, bolted to both the top of the box and the face of the central wall.

The box 36 has a right wall 38, Figure 2, a middle wall 39, and a left wall 40. The latter supports the power friction-clutch input shaft 27 (by means of antifriction bearings not shown). The middle wall 39 supports a hub 42, which surrounds, but has clearance from, the shaft 29 extending through it.

The hub 42 is integral with a cup shaped worm wheel 43, which on its inside carries a brake friction-clutch (not shown), but similar to 28. The shaft 29 extends through to 28 and intermediately there rides upon it the shipper-sleeve 44. This is embraced by the shipper fork 45, fastened to the shipper shaft 46, supported by the front and rear walls of the oil box 36. The shipper shaft extends to the outside of the oil box and at its end, it has on it an arm 47, which by a link 48, joins it to an arm 49 fastened to a shaft 50, extending through the machine and on the front end of which is mounted the direct shipper handle 51, Figure 1.

When the shipper handle 51 is moved, then the chain of parts 51, 50, 49, 48, 47, 46, 45 and 44 is moved. The motion of the shipper sleeve 44 toward the power friction clutch 28 makes the shafts 29 and 27 clutch. The return of the shipper sleeve toward its central position releases the power friction clutch 28, and the shafts 29 and 27 are freed from each other. Further movement of the shipper sleeve 44 to the right, makes effective the brake friction clutch inside of the worm wheel 43, and clutches it to the shaft 29. Thus, depending on the position of the sleeve 44, that is, on the position of the shipper shaft 50, or its shipper handle 51, the chain 29, 30, 31, 32, 34 and inclusive of the bull crank pin 35 are clutched to the input shaft 27, or are freed, or are clutched to the worm wheel 43. That is, they are powered, freed or braked.

The worm wheel 43 is held by a worm 52, Figure 6, which is prolonged like a shaft, is supported by the box 36, and extends to the outside, and on its end carries a bevel gear 53. The latter meshes with a bevel gear 54 fast on a shaft 55, Figure 7, supported by brackets 56 fastened to the oil box 36, and by a bracket 57 fastened to the bottom of the platform 17.

On the shaft 55 is mounted a reverse shipper sleeve 58, shiftable by a fork 59, fastened to shaft 60, to which is fastened an arm 61, which by a link 62 joins an arm 63, which is fastened to a shaft 64. The latter extends through the machine, and on its front has a handle 65, Figure 1. The latter is called the reverse-shipper handle. When it and its shaft 64 are moved, the sleeve 58 slides on the shaft 55 and becomes effective to clutch the shaft to a reverse friction clutch 66 surrounding it. This clutch 66 is driven by a chain 67, Figures 7, 2, which is driven by a sprocket on the shaft 27. The worm 52 and meshing worm wheel 43 are cut so that when the reverse clutch 66 drives the shaft 55, bevel gear 54, bevel gear 53, worm 52 and finally shaft 29, the last will rotate in a direction reverse to its rotation by the direct-power clutch 28.

In operation, the reverse-shipper shaft 64 normally keeps the reverse-shipper 58 away from reverse-clutch 66, and therefore worm 52 is not driven. When the direct-shipper shaft 50 moves the shipper-sleeve 44 to the worm wheel clutch 43, the shaft 29 is clutched. Now 43, being a worm wheel, cannot drive its meshing worm 52 and is thus held. 43 thus brakes the shaft 29 and bull-worm, bull-worm wheel, etc. But this does not prevent a movement being now given to worm 52 by means of either the reverse-clutch 66 or by a handle placed upon the end of shaft 55, and the bull-crank thus rotated.

Attention is called to the fact that the direct-shipper sleeve 44 can be effective on either 28 or on 43, or on neither, but never on both at the same time. Therefore, there can never be any opposition between the direct clutch 28 and the reverse clutch 66. The latter is a much smaller clutch, but by means of its worm 53 and worm wheel 43, it is able to do all that the larger clutch 28 does, although more slowly.

The flywheel shaft 23 also extends to the left (right in Figure 2), and on its end it carries the feed-friction-disk 68. This disk is mounted on a sleeve 69 constantly urged out, to the left, by an adjustable collar 70, mounted on it and pushed by a spring 71, which abuts against a fixed collar 72, carried by a pin 73 fastened in the shaft and passing through slots in the sleeve 69. Excessive motion to the left is prevented by an adjustable stop collar 74, which abuts against the collar 72, mounted on the sleeve 69. The disk 68 carries a leather face 75 which serves to drive a friction wheel 76 slidably, but not rotatably, mounted on a shaft 77, rotatable in a bracket 78 bolted to the central wall 14. The wheel 76 is slid on its shaft by a ball bearing roller 79, held by a slider 80, supported by a shaft 81, mounted in the bracket 78. Slider 80 is slid by a link 82 moved by the feed mechanism to be later described.

The leather face 75 has a clearance hole cut at its center large enough to clear the wheel 76 in that position, which is the rest or normal position. Motion of link 82 upward or downward will carry the friction wheel 76 off this hole, whereupon the leather face starts driving the wheel. The further from the center wheel 76 is, the faster it is driven, and the faster its shaft 77 is driven. The shaft 77 has on its top a spur pinion 83, meshing with a spur gear 84, which drives a chain 85, which drives the long vertical feed shaft 86. This feed shaft drives the paper pusher, as will be later explained.

The motor 21, also drives a small chain 87, which drives a shaft 88 extending through the left platfrom wall 19, and the left wall 13, Figures 2 and 4. This shaft drives both the step-mechanism, which controls the motion of the paper pusher, and also drives the repeat mechanism as will be later explained.

*Back table, walls and pusher (Figures 2, 3, 4, 5, 6)*

Bolted to the top 16 of the main casting 10 is the front part of the back table 100. At its rear, it is supported by diagonal struts 101, Figure 5, entering into top caps 102, fastened to the table, and into bottom caps 103 fastened to the main-casting-bottom. The back table is thus completely supported by the main casting, and therefore is not affected by any unevenness or warping of the floor. The back table is of a ribbed structure to give it both strength and lightness, and has its upper surface smooth and plane that paper may be slid easily thereon. This surface is called the table-top.

Sliding on the table top is the paper pusher 104, Figures 3, 5, 9, 6. This is composed of the pusher cross bar 105, to the bottom of which are attached three pusher parts 106, Figure 3. The middle pusher part is rigidly fastened to the cross bar 105, but the two outside parts are adjustable upon it, and the front portion of each part ends in fingers, as is well known in the art. The cross bar 105 at its ends is fastened to the top of legs 107. At its bottom each leg 107 has a hinge pin 108, see Figure 10, which is held by a sled 109, which glides on a slide 110, fastened to some brackets 111, fastened to the bottom of the back table. There are a leg, a sled, a slide and brackets for it, on each side of the table. If the sleds are held still and the pusher rotated on the hinge pins 108, it can be lifted to the position, Figure 9, where it bridges over the table and makes room for passing paper through between its legs. This is highly important as will be later explained.

In order to hold the pusher in its lifted position, it is supplied with a lifting shaft 112, suported in its middle by a bracket 113, fastened to the rear of the pusher cross bar 105, Figure 3; and at its ends by passing through bearings formed for it in the legs 107. The shaft 112 on each end has an arm 114 which is joined to the top of a bent link 115, which at its bottom is mounted on a hinge pin 116 in the front part of sled 109. The shaft 112 has a handle 117, Figure 3, by means of which it can be turned, and consequently the pusher can be lifted, Figures 5 and 9, the same sheet. The link 115 is bent to permit the link and arm 114 to assume a dead-center position, Figure 5. This is to prevent harm when the operator carelessly lets go the handle 117 too soon. The pusher then falls by gravity and would slam on the table, but the dead-center mechanism above described minimizes the slam. When the pusher is lifted and the parts are as in Figure 9, the link 115 and arm 114 are again in a dead-center position, in fact slightly beyond it. The arm 114 now hits the cross bar 105 and can go no further. The mechanism is thereby self-locking, and gravity thus keeps the pusher from falling.

Attention is called to the fact that, Figure 9, Sheet 5, when lifted the center of gravity of the pusher falls within the rectangle bounded by the front edges of the sleds and their rear edges. Therefore, there is no upward strain on the gibs holding the sleds on their slides. It is sometimes necessary to feed the pusher while it is in its lifted position to pass over some stock on the table. The present construction does not throw any extra wear on the gibs.

Each pusher sled 109, has attached to it a chain 120, Figures 12 and 10. The chain passes around an idler wheel 121, mounted on a table rear bracket 122, fastened to the rear corner of the back table. The chain is composed of a part 123 in the middle, passing around the idler 121, and two end parts 124, never passing around it, being turned at right angles. Each junction between 123 and 124 is by a special cross link 125. There is also the link 126 whose pins 118 are longer than the other chain pins and extend up and fit snugly into holes 119 in the sled 109, Figure 10. The motion of the chains produces motion in the sleds 109, hinge pins 108, legs 107, cross bar 105, and finally the fingered pushers 106, to thereby push the paper. The mechanism for moving the chains 123, 124 will be explained later, under power-feed-mechanism.

Mounted at the side of the back table are the side-walls 127, Figures 2, 3, 4, 5, 6, 10, 11, 12. Each wall is supported by some supports 128, Figures 6, 10, 11, fastened to it, and themselves hinged about pins 129 mounted in the brackets 111. Each support 128 is provided with two arms 130 and 131, offset from each other, and the arms have adjustable screws 132 and 133 respectively. The side wall 127 can be swung about the hinge pins 129 and brought down to have it rest upon the top of the slide 110, Figure 11. In that position the wall upper surface is in line with the table top. When the side-wall 127 is raised, its arm 130 passes through a hole in the bracket 111, until the parts assume the position, Figure 10. Now the screw 133 in arm 131 strikes the bottom of a portion of the bracket 111, and the wall can go no further. The screws 133 are so adjusted that now the wall 127 is accurately perpendicular to the table top. To lock the wall in this elevated position, a lock bar 134 is used. This bar has a cut-out 135, Figure 12, for each support 128. To permit the arm 130 to pass, this cut-out is brought opposite to it. To prevent the arm 130 from passing, the bar 134 is slid to bring a full portion opposite the arm. The screws 132 are adjusted so that when the wall is perpendicular, Figure 10, there is no back-lash between the parts.

The lock-bar 134 is held by some hold downs 136, Figure 12, fastened to the brackets 111. As it requires some force to move the bar 134, it has been provided with some teeth 137 at its rear which mesh with a gear 138 fastened to the top of a shaft 139, rotatable in the table rear bracket 122, and provided underneath with an arm 140, which carries at its end, a spring pin 141, Figure 10, provided with a finger knob 142. There are two holes in bracket 122 for the entry of the spring pin to thus locate the arm 140, gear 138 and lock bar 134. One of these holes is shown as 143, Figure 12, the other hole is shown as 143, Figure 10.

It is very important that there shall be no gap between the table top and the side-wall surface, whether the wall is vertical or horizontal. To produce this continuity of surface, the table has been provided with a bevel edge bar 144, and the wall has been provided with an extension 145 reaching below the table top, Figure 10. When the wall is brought horizontal, Figure 11, the extension 145 is raised until it becomes in line with the table top.

In many cutters, the time of loading the machine with paper is a large part, frequently by far the major part of the total time of operating. To save time, it is common to have auxiliary tables or jogging machines upon which the paper sheets are jogged to make a proper pile, before being placed on the cutting machine table. Even then the pile is disturbed again, as it is now loaded piecemeal on the cutting table and therefore has to be re-jogged. Some machines have the back table much larger, so that the pusher occupies only a part of the table, and while the pusher is pushing one lift of paper, an operator is jogging into place a new lift of paper. This construction has disadvantages of its own, as will be pointed out later.

Moreover, it has been found that in these cutters the action of the knife and clamp disturbs the paper pile. To replace it in order to continue the cutting, the paper must be jogged back ordinarily into a corner. A corner for the placing of the paper is always convenient and frequently indispensible. All jogging machines and all auxiliary tables are provided with such corners. In this machine, such a corner is provided by the side wall and the pusher. If an auxiliary table has been used and the paper which is usually rectangular, jogged to have its two register sides in the auxiliary table corner, then if the paper is later transferred to the cutting machine, the same two register sides of the paper should abut a corner on the table. This is not as easy as it sounds, and has not been accomplished in some machine attempts, for instance on the machine with the larger table above mentioned. But if an auxiliary table is used which is provided with a lowerable wall like 127, then on the auxiliary table the paper could be jogged against that wall, and then that wall could be let down like in Figure 11. Here the lowered wall of the auxiliary table is numbered 146, where it slightly overlaps at 147, the side-wall 127 of the cutting machine. The paper can then be slid off the auxiliary table, over the auxiliary table lowered wall 146, over the cutting table lowered wall 127, over the bevel bar 144, onto the table top 100, and then be pushed across the width of the table until it abuts the raised wall 127 on the opposite side of the cutting table. Thus the register side of the paper, which had been jogged against the previously raised auxiliary-table-wall 146 is now abutting a raised cutting table wall 127. And this is very important.

Of course there may be another auxiliary table on the other side of the cutting machine and paper may be jogged on both auxiliary tables simultaneously. There may be still a third auxiliary table at the rear of the machine, on which table paper may be jogged. When ready, the pusher could be lifted, Figure 9, and the paper pushed forward underneath it, between its legs, onto the cutting machine table until the rear register edge of the paper is in front of the pusher, whereupon the pusher may be lowered. The cutting machine table can thus be loaded from one side, the other side or the rear. It is of course not necessary that the auxiliary tables be immovable. They might be rolled up to the cutting machine, when desired, and thus the number of auxiliary tables is unlimited.

The cutting machines on the market usually have a capacity for square paper. For instance, a 60 inch machine has the clear area of its back table somewhat larger than 60 x 60 inches, say 61 x 61 inches. No longer paper can be placed on the back table as the pusher limits the space. In this machine the raisability of the back pusher eliminates its interference, so that much longer paper can be cut on this machine.

Again, it is frequently necessary to square paper. If the machine happened to be say a 60 inch machine and the untrimmed paper was nearly square, then that machine would readily accommodate square paper whose length was about (60+1.414) or say about 42 inches on the side. The paper could then be turned on the table, through a right angle, advanced to the knife, and cut square. Any larger size paper could not be readily turned. Speaking approximately, the squareable size of paper is two-thirds of the size of the machine. And in order to square paper of a given size, a machine 3/2 times as large has been used. This is a needlessly large machine, which is expensive, etc. On this new cutting machine, the lowering of the side walls, and the raising of the pusher gives clearance for the turning of the paper so that full capacity stock may be turned and squared, and commercially this is very important.

*Knife mechanism (Figures 1, 5, 13, 14, 15, 16)*

Figure 1:
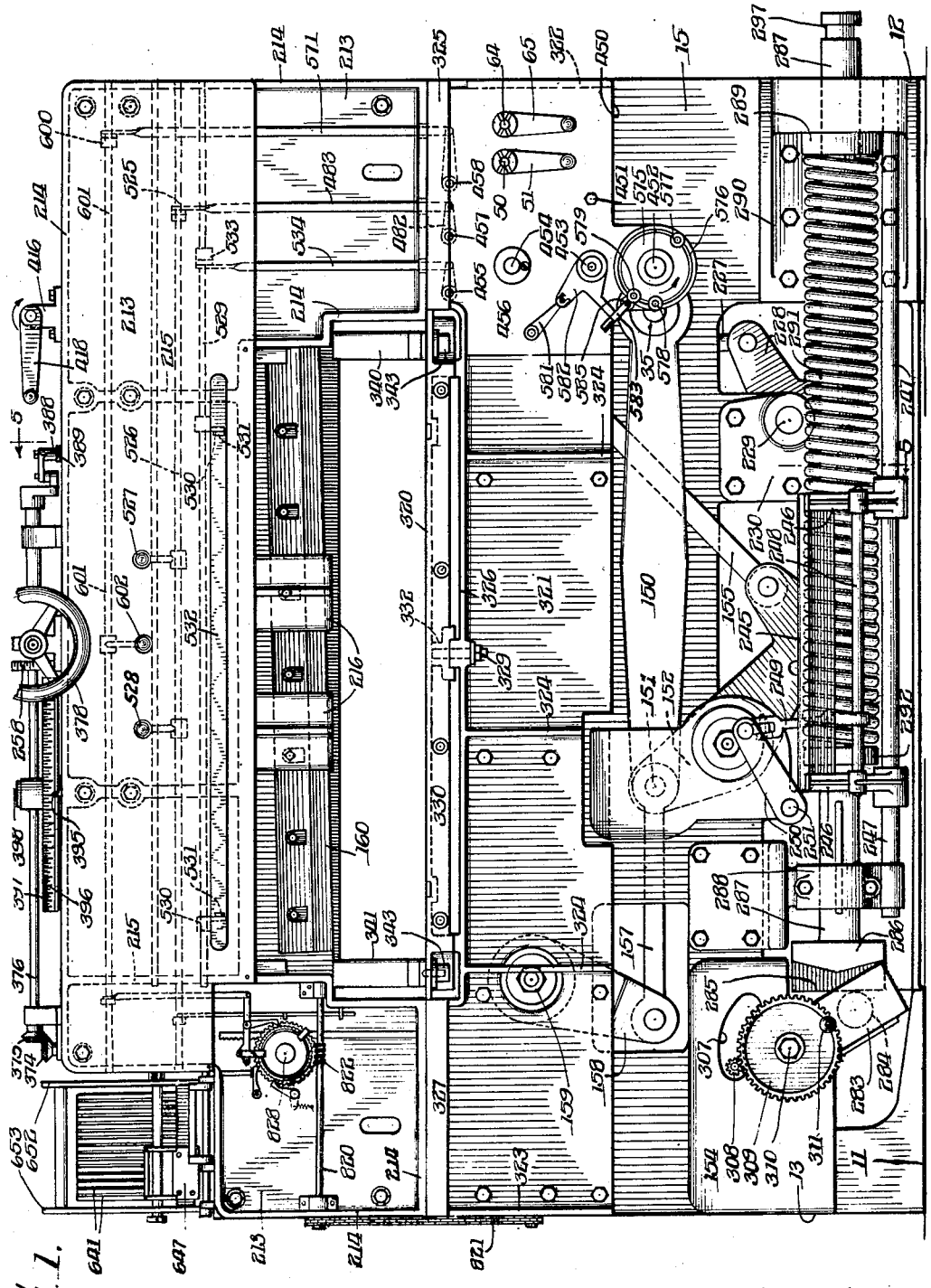
Figure 1 is a front elevation.

The bull crank pin 35 has mounted on it the right eye of the bull-connecting-rod 150, whose left eye embraces a pin 151, mounted in the bull-lever 152, fulcrumed on a shaft 153, whose rear end is supported by the front wall 15, and the front end by the main bracket 154 (Figures 1, 5). The main bracket itself is bolted to the front wall 15. The lever 152 is joined to an oblique link 155, whose upper eye forks to support the right end of the knife beam 156. The lever 152 and pin 151 are joined also to a link 157, which joins to the lower arm of a lever 158, rotatable on a shaft 159, which is supported by the front wall 15, and the main bracket 154. At its upper end the lever 158 supports the left end of the beam 156.

Fastened to the beam 156 is the knife 160. The parts are shown in Figure 13 in their rest position, that is elevated position. The left end is nearer the table 100 than the right end. When the bull-rank pin 35 rotates, then link 150, lever 152, link 155, link 157 and lever 158 move and bring the knife edge to be approximately coincident with the table top. The left end of the knife passes through the paper pile first by a shearing cut toward the left, thus producing a double shearing cut, one due to the side motion of the knife, the other due to the inclination of the knife.

The pin 161, joining the lever 158 and the beam 156, moves in a circular arc 162, about the axis of 159 as center. The pin 163, joining the link 155 and the beam 156, moves in a curved arc 164 shown in Figure 13. Attention is called to the fact that in both arcs 162 and 164, the slope is much less at the top than on the bottom. The knife thus receives a far greater shear motion at the top than on the bottom. This is very important as will now be explained.

It has been found to be a fact, that a knife, passing without shear through a pile of paper to cut it, encounters large resistance. This resisting force, however, is not uniformly distributed. It is (1) a very high peak force at the moment of contact with the paper, the peak dying away with the complete entry of the knife, and then (2) a diminishing force while the knife is cutting through. To eliminate the peak force (1), the knife has been slanted as above described and the peak force is found to be removed. But even so, there remains the force (2) which is larger at first and less afterward. It would be less strain on the mechanism if that force (2) would be lessened at the top, even if enlarged at the bottom, so the arcs 162 and 164 have been intentionally so inclined that at their top they have less slope than at their bottom, thus equalizing and minimizing the resisting force.

The actual design of the knife mechanism is based on the above explanation, other mechanism not taking that explanation into account having been discarded. By test, this mechanism was found to give very efficient cutting. If we examine the cutting machines on the market, we find that the powerful cutters have the side motion controlled by one or more plane slides, ordinarily at approximately 45° to the table top. Certain firms, for instance the Krausewerk, make two kinds of cutters, one a cutter having the knife supported by links pivoted above the table top, and another cutter which they call a "powerful" cutter, where the knife is guided by plane slides. Their first kind makes the knife have less shear motion at the top than at the bottom. Their "powerful" cutter makes the knife have equal shear motion at top and at bottom. In this machine the knife has more shear motion at the top than at the bottom. This is because the knife beam ends move in arcs whose centers are below the table top.

*Knife adjusting mechanism*

The mechanism is so constructed that when the bull crank pin 35 has made a semi-revolution, the centers of the pins 161 and 162 are about on the table top. The knife edge should at that moment be in approximately that position. However, as the machine is used, the knife 160 gets dull, chips out, etc., and has to be replaced, ordinarily by another knife. It is unlikely that the new knife edge will occupy the proper position so that when the beam 156 is down, the knife will cut just through the lowest sheet and not any further. The knife must be adjusted. This is done by adjusting the beam 156 as follows.

The pin 161 (Figure 14) is held by a fork 165 forming the upper part of the knife lever 158.

The pin rotates in a nut piece 166 which is slidably mounted in a hole 167 in the beam 156. On its inside the nut-piece 166 has an adjusting screw 168, which has integrally upon it, a collar 169. This is held closely by a lower screw-nut 170, screwed into the beam 156 and upper screw 171 screwed into the screw nut. The collar 169 is continued into a shank 172 which passes through a hole in 171, and on its top the shank is keyed to a bevel gear 173 fastened thereto. This bevel gear meshes with a bevel pinion 174 fastened to a shaft 175 mounted inside the beam, Figures 15 and 16. The shaft 175 has rigid therewith a bevel gear 176, with which meshes a bevel pinion 177, held in the beam and which can be turned by a removable handle 178. The handle is stuck into the square hole 179, made for it in the bevel pinion, and turned. Rotation is thus given to 177, 176, 175, 174, 173, 172 and 168; also 166 is given a sliding motion in the hole 167 in the beam. As 166 cannot move, being held by the pin 161, which is held by knife lever 158, the beam itself must move and does so.

A perfectly similar mechanism is assembled at the right end of the beam and is connected to the top of the oblique link 155, which is fork-shaped to correspond to the fork 165 of the knife lever. There is thus a similar couple 166 and 168 at the right, but the thread on them is cut to be of the opposite hand to the thread on the couple 166 and 168 at the left. Also the shaft extending from the right and corresponding to shaft 175 is marked 180. Also the hole corresponding to 179 is marked 181.

The knife 160, upon being sharpened, has a portion ground off but its new edge ought to be approximately parallel to its old edge. While the height of the knife is greatly changed by repeated grinding, its parallelism is changed but little. It would therefore be desirable to be able to give the beam 156 an adjustment parallel to itself, up and down, a fairly large amount (over one inch), while the adjustment from parallelism is much less (about one-fourth inch). This is accomplished thus: the shafts 175 and 180, Figures 16 and 13, meet near the center of the beam. Shaft 180 carries pinned thereto a collar, which carries a pin 182. Shaft 175 also carries a collar and pin 183. Between 183 and 184 are assembled some back lash collars carrying pin 184. Upon rotating 175 and 180 relatively, there is freedom of motion until all the backlash between the pins 182, 183, 184 has been taken up. From then on relative motion is prevented. Both shafts then rotate together.

Now suppose the handle 178 is inserted in the hole 179 and turned. The pinion 177, gear 176, shaft 175 and connected parts at the left, now turn, and the left end of the beam is raised. For some time, the right side mechanism is unaffected. But as soon as backlash is taken up, the right side mechanism also commences to move and raises the right end of the beam. The right end follows the left end but with a lag. On rotating the handle in hole 179 in the opposite direction, the left end lowers, and the right end again follows with a lag.

Similarly, if the handle be put in the right hole, 181, it is the left end of the beam that follows with a lag. The beam can thus be raised or lowered as a whole except for the lag and that lag is sufficient to permit the parallelizing of the new knife edge at the table top 100. This is easily done by first operating the machine to rotate the bull crank 35 a half revolution, which brings the knife adjacent to the table, and then operating with the handle in the holes 179 and 181 as need be.

The raising or lowering of the knife and the parallelizing thereof is thus accomplished from the front of the machine, and the operator adjusts each side of the knife from a station adjacent to that side, where the paper and knife are both visible to him. This is highly convenient and therefore commercially important.

After the beam ends have been properly adjusted, they are locked in place by locking the screw 168 (Figure 14) and nut piece 166 in the beam. This is done by a jammer 185 and a hollow set screw 186. The latter is tapped into the front of the beam, while the former is fitted into a space made for it in the nut piece 166. The inside of the jammer is threaded like the nut piece. The screw 186 pushes the jammer 185, which pushes the screw 168, which pushes the nut piece 166 against the rear wall of the beam. The tightening of the screw 185 therefore tightens all the parts mentioned and eliminates all looseness.

*Upper framing*

The knife is supported against forward and rear motion by bearing against the rear upper frame and the front upper frame. The rear frame is composed of a middle portion, a right portion and a left portion. The middle portion is seen in section in Figure 5, where there is shown the front wall 201 of the middle portion, the top 202 and the rear wall 203. There is also a middle brace 204 and a bottom 205. The bottom is high enough above the table, making room for the front portion of the pusher, which comes underneath when it is in the most forward position.

The middle portion just described, at its right side merges into a vertical side wall 206, Figures 13, 2, 3, 6, which is machined to have its inner surface to be a continuation of the right side wall 127 of the table. This wall 206 bends into a front wall 207, Figures 2, 3, 6. Both the vertical wall 206 and the front wall 207 unite into a horizontal foot 208, resting on and bolted to the main frame top 16, Figures 2, 3, 6.

One the left side of the machine, the rear frame has the middle portion merge into a left side wall 209, Figures 2, 3, 4, 5, 13, 27, 30, which is machined to be continuous with its adjacent table-side-wall plane. At its front 209 bends into a left front wall 210, both 209 and 210 are united at their bottom into a foot 211, which rests upon and is bolted to the top 16 of the main casting.

Bolted upon the front of the walls 207 and 210 of the rear frame is the front frame. This has a rim 212 to rest against the rear frame, Figure 5, and a continuous wall 213, Figure 1, reaching across the full width of the machine. The rim follows the outline of the wall 213 all the way around except on the bottom. On the front, the wall 213 carries another rim 214, Figures 5, 1, which follows the wall all the way around, and which is also strengthened by some cross ribs 215, Figure 1.

The space behind the wall 213 and in front of the walls 207 and 210 is occupied by the beam 156, whose surfaces bear against the adjacent surfaces of the walls. Moreover, there are some stalactites 216, Figures 1, 5, hanging down from the wall 213 and forming an additional bearing for the beam. The reason why stalactites are used instead of a continuous support clear across is that the latter would too greatly interfere with the visibility of the paper on the machine.

The beam and its connected mechanism occupies all the working space behind the wall 213 and in front of the walls 207 and 210. However, at the center behind the beam and before the front wall 201 of the middle portion of the rear frame, there is a working space in which has been installed the paper clamp, which will now be described.

Clamp mechanism

The clamp is a piece having a front wall 220, Figure 5, a rear wall 221, and a bottom 222. The front wall 220 is continued below the bottom into a continuation portion 223. Joining the bottom 222 and the portion 223 are a number of fingers 224, Figures 2, 17, as is well known in the art.

The clamp has bolted thereto pull-pieces 225, Figure 17, which are formed into hooks 226 at their top. At their bottom they are hinged to clamp links 227 which reach down through holes in the main frame. At the lower end the right link is hinged to the upper arm of a bell crank 228, rotatably mounted on a shaft 229, whose rear end is supported in the central wall 14 of the main frame and whose front end is supported by a bracket 230, bolted to the front face 15 of the main frame. The left link 227 is hinged to the upper arm of a bell crank 231, rotatably mounted on a shaft 232 which forms part of the clamp-power-lever to be later described.

The bell cranks 231 and 228 have their lower arms connected by a link 233. Its length is equal to the center distance of the shafts 229 and 232, and the quadrilateral composed of the frame front wall 15, right bell crank 228, link 233 and left bell crank 231, is a perfect parallelogram. The motions of the two bell cranks are therefore always equal. Therefore the two links 227 always rise and fall equally and the clamp moves equally on both its sides. So that if some paper is placed under only one side of the clamp, nevertheless on pressing down, the clamp lower face would still remain parallel to the table top 100.

The clamp is kept in an elevated position by a clamp raising spring 235, Figures 4, 5, 17. This spring extends the full width of the machine near the bottom. It surrounds a shaft 236, bolted at its right end to the right wall 12 and supported at its left end by the left wall 13. At its left the shaft carries a nut 237 for adjusting the strength of the spring. At its right end the spring abuts a slider 238 to which are attached two chains 239, one in front, the other behind the spring, and these chains wrap around cams 240, rigidly fastened to the bell crank 228. Thus there is a constant tendency for the spring to expand and to lift the clamp. The cams 240 are so shaped that the stress of the spring is equalized and the force necessary to bring down the clamp is uniformized.

The clamp is brought down by the operator's stepping on a pedal 245, Figures 1, 5. This is held by two arms 246, fastened to a shaft 247, held in the framing. Uniting these pedal arms is a shaft 248, which, by a multiple link 249, operates an arm 250, fastened to a cross shaft 251, Figures 1, 5, 17, supported in front by the main bracket 154, and in the rear by the front wall 15. The shaft bears on its rear end an arm 252, which pushes on a collar 253, fastened to the parallelogram link 233. Stepping on the pedal causes the arm 252 to push the collar 253, to move the bell crank 228 and cams 240, to slide 238, to compress the spring 235, and also to lower the clamp.

In some machines there are two clamps, a main clamp operated by power and an auxiliary clamp operated by the foot. That has been found unsatisfactory as the auxiliary clamp is ordinarily very flimsy. Therefore many machines use only a single clamp. This has troubles of its own, because it is found that it is very hard to depress the single clamp by the foot, particularly in the larger machines. Referring to Figure 17, the spring 235 is supposed to slightly overbalance the clamp and to keep it raised. Stepping on the pedal is supposed to easily overcome this overbalance and to bring the clamp down. This is what is desired.

In order to guide the clamp in the framing, the rear frame side walls 206 and 209 had grooves machined in them. The left side wall 209 has groove 255, Figures 3, 5, while the right side wall 206 has groove 256, Figure 3. The grooves were machined as carefully as possible, and the clamp 220 with its pull pieces 225, also machined carefully, then was assembled in them. The parts were supposed to be a good fit with proper allowance for oiling.

But things did not go smoothly. The clamp worked too hard. Finally it was recognized that due to strains, changes of temperature, aging or other causes, it was commercially very difficult to make both pull pieces 225 fit in the grooves 255 and 256, tightly enough to guide the clamp properly and freely enough to allow it to be readily operated by the pedal. When the trouble was recognized means were taken to cure it. Thereupon, the pull pieces 225 were machined off until they worked in the grooves with ample clearance. Also now to take up this clearance, a roller 257, a nice fit in the groove, was put into each pull piece. And finally, to prevent the clamp from flapping around at the top, a vertical rod 258, incidentally graduated to show the height of the clamp from the table top, was inserted in the top of the clamp, and there was guided by a bracket 259, Figure 3, fastened to the top of the upper framing, in which bracket was a slot 260, elongated right to left but a good fit for the rod 258 from front to rear.

The right to left motion was prevented by making two little cheeks 261, Figures 18, 19, extend slightly beyond the general surface 262 of the side of the clamp, these cheeks being the only pieces rubbing on the side walls 206 and 209. The reason why these cheeks were used rather than the converting of the slot 260 into a good side to side fit, was that it was desired to have that fit at the clamp bottom, not some distance above.

Attention is called to the fact that the front-to-back bearings, namely rollers 257, and side-to-side bearings, namely cheeks 261, were brought very close to the clamp bottom. The only remaining bearing, namely the rod 258 and slot 260, was placed as far away as possible so that any looseness in it would have but little effect on the position of the lower front edge of the clamp. The final result was to remove all large surface bearings. The bearings left were small in area, minimum in number, and concentrated at the clamp line, all but one, which was placed at the maximum possible distance away. And the clamp, now free from binding due to any distortion in either the frame or the clamp, simply floated on its new bearings, making it possible to greatly reduce the strength of the spring 235, and to decrease the pedal pressure required to depress the clamp. And all this without sacrificing any accuracy of movement.

The rear surface of the clamp was thus kept from rubbing on the rear frame, and also the front surface of the clamp was slightly away from the surface of the knife beam. To help keep the knife beam from bending far under a heavy cut, however, the rear surface of the clamp had on its center a raised portion 263, but a little away from the rear frame, while the front portion of the clamp had a similar raised portion 264. As the knife never starts to cut until the clamp is all the way down, and therefore no front-rear stress is thrown on the clamp until it has finished its motion, the knife cut strain never interferes with the free motion of the clamp, whether going up or down, but the clamp, after bending slightly, braces itself against the rear frame and prevents the knife beam from bending much to the rear under a very heavy stress.

The clamp itself has its bottom fingered as is usual in the art. Sometimes it is necessary to place an auxiliary plate on the bottom of the clamp, as is well known. On most machines this is a clumsy procedure. To simplify this work, the clamp has been provided with a rigid pin 270 in each of the sides of the clamp, Figures 17, 18, 19. The auxiliary plate 271 has riveted at each end thereof a holder block 272 in which is a pin 273, of limited movement, pushed out by a spring 274. The holder is made to fit on the adjacent clamp finger 275 and the back of the continuation portion 223 of the clamp. To place the plate on the clamp, the operator stands in front, takes the plate, tilts it for easier passage, pushes it through the opening, lifts the plate and enters the plate and holder blocks 272 into their proper places. A smart pull toward the front, and the spring pin 273 jumps over the fixed pin 270, and the plate is on. To remove the plate, the plate 271 is given a smart blow opposite 273. The spring pin 273 is thus pushed over the fixed pin 270. This is done on each side, and the plate is removed by pushing back until it clears the clamp. It is then brought out through the opening.

Power mechanism for clamp

The bull crank 35, Figure 17, operates the bull connecting rod 150, and the bull lever 152. The latter has hinged thereto a link 280 having a slotted piece 281 which embraces a pin 282, mounted in the power clamp lever 283, Figures 1, 14, 17, 20, 21, 22, 23. This power lever is journaled with its rear end into a bearing in the central wall 14, and its front end journaled in the main bracket 154. In their rest position, the parts are as shown in Figures 1, 17, 23, with the slotted piece 281 holding the pin 282 toward the right.

Mounted in the power-clamp-lever 283 is a roller 284 against which is pressed the face 285 of a spring pusher 286. This pusher is extended as a shaft 287 reaching clear to the right of the machine, Figure 1. At its left the shaft 287 is supported in a split bearing 288 attached to the main bracket 154 and at its right by a bearing 289, held by a bracket 290, bolted to the front face 15 of the main casting. There is a very powerful bull-spring 291 surrounding the shaft 287, and with its right end constantly pushing against 289, and with its left end constantly pushing against a collar 292, rigid with the shaft 287. The split bearing 288 has a groove 293 and the shaft 287 has a key 294 and thereby preventing the pusher 286 from rotating.

The power lever 283 has an ear 295, and working with it is an ear 296 on the bell crank 231, Figures 20, 23. In the latter figure, the power lever is shown in its normal position, but the bell crank 231 is shown in its middle position. The figure shows that the bell crank can move away from the power lever without interference. This permits the operating of the pedal and clamp as above described independently of the power mechanism.

However, when the bull crank 35 rotates, the bull lever 152 moves the slotted link 281 to the left. It therefore releases pin 282. Nothing now holds the power lever 283 from rotating about its axis and it is constantly urged to do so by the pressure of the bull spring 291 and pusher face 285 on the roller 284. The lever 283 therefore does rotate, and ear 295 moves toward ear 296, Figure 23, and strikes the latter. From then on, the lever 283 and the bell crank 231 move together as a solid piece. But the bell crank 231 operates the clamp as previously explained. The clamp therefore descends, the comparatively weak clamp-raising spring 235 being overpowered. The clamp continues to descend until something stops it, which ordinarily is some paper on the table, or the table itself.

Thus far the pin 282 has kept up with the advancing slotted link 281. From now on, the pin 282 can go no further, so the slotted link 281 advances, sliding its slot about the pin.

Meanwhile the knife descends, makes the cut, and starts to rise. Also the slotted link 281 commences to slide backwards over the pin 282. In due time the end of the slot will again catch the pin 282 and pull back the power lever 283. This will push back roller 284, pusher 286, shaft 287, spring collar 292 and compress the bull spring 291. When the bull crank stops in its rest position, the ear 295 will again be completely to the right and the ear 296 will be free, and therefore so will the clamp. Between times the clamp itself was raised by its own clamp-raising spring 235. The parts are so proportioned that the clamp advances always ahead of the knife. The paper is therefore clamped before it is cut. On the return, the knife lifts out before the clamp does.

The bull spring 291 is very powerful. It is found that for the cutting of certain soft papers, the pressure on the clamp must be reduced. This is done by moving the roller 284 nearer the fulcrum of the power lever 283. The bull spring 291 and pusher-face 285, continue to push as before, but the leverage of roller 284 on the lever 283 is much reduced. Therefore the pressure of ear 295 on ear 296 is reduced, and therefore the clamp pressure itself is reduced.

However, to adjust the roller 284 requires some mechanism. The pressure of the bull spring 291 is much too great for a man to work against it conveniently. So the shaft 287 is extended to the extreme right, Figure 1, and a grooved portion 297 is machined in it.

A little rider-stop-plate 298, Figures 6, 24, Sheet 6, may be placed on the grooved part 297, the machine started, and the bull-crank pin given a semi-revolution. There is supposed to be no paper on the table at this moment, so the bull spring pushes the clamp without resistance, until the rider-stop-plate 298 strikes the bracket 290. This stops the plate 298 and the shaft 287, and the parts are so dimensioned that now the pusher face 285 has brought the roller 284 directly under the fulcrum of the lever 283, Figure 21. If now the roller is moved up or down, it will travel parallel to the pusher face 285, and so will not be affected by it.

The roller is mounted on a pin 299 which is carried in a sled 300, bearing against some slides 301, fastened to the lever 283. Also the sled has threaded through it two long screws 302, rotatably, but not slidably mounted in the top and bottom of lever 283. At their top the screws carry miter gears 303, which mesh with similar miter gears 304, fastened to a cross shaft 305, supported in a little frame 306, fastened to the top of the lever. The front portion of the little frame 306 extends forward through an arcual hole 307 in the main bracket 154, Figure 1, and shaft 305 has rigid thereon a spur pinion 308, which meshes with a large spur gear 309, fulcrumed on a stud 310 in the journal of the lever 283. The spur gear 309 has a handle 311. One rotation of the handle, and the spur gear gives a number of rotations to the pinion, miter gears and screws; and the roller sled 300 and roller 284 travel some distance up or down. However, as the sled 300 is held by the screws 302, it will not move up or down under pressure of the pusher 286 upon the roller 284.

Having set the roller 284 at the distance out desired, the operator starts the power again. The bull crank completes its revolution and stops. The rider plate 298 is now removed, and the machine is ready for further work.

In actual practice in adjusting the roller, it was found desirable to relieve the roller of the pressure of the clamp raising spring 235 also. This the operator does by stepping on the pedal while he turns the handle 311. When he steps off, the roller returns to the face.

There is also another reason why the rider plate is made to stop the pusher face 285 so that the adjustment of the roller 284 moves it parallel to the face. If the groove 297 had been located on the spring shaft so that the rider plate would have stopped the shaft earlier, then the roller would still have been relieved of the spring pressure and the operator would still have been able to adjust the roller. But here there would be trouble. If he adjusted the roller nearer to the power-lever-fulcrum, then the power lever on its return would not push the shaft back, and the rider plate would remain locked between the spring shaft and the framing. And therefore the pusher becomes ineffective for the next cut. Even if the operator could by main force pull the rider plate off, the spring would immediately cause the shaft to advance against the roller with a terrific bang, not to be thought of. Should the operator wish to adjust the roller out further, he might do so without interference from the spring-pusher, but this adjustment will compel the movement of the power-lever. The stopping of the pusher, so that the roller during its adjustment in or out, travels parallel to the face of the pusher, avoids all these troubles.

Moreover, it was found that the operator sometimes carelessly runs the roller sled 300 too far up or down on the screws 302, whereupon it jams on them. To prevent this jamming, leather washers, not shown, are placed on the screws both above and below the sled.

The bull spring 291 is a very powerful spring, exerting a pressure of several tons. It is held compressed by the crank-pin 35, through the intermediation of the parts above described. In its normal position the crank pin 35, and connecting-rod 150 are supposed to be in a dead center position, so that no back pressure of the bull spring on the connecting rod will tend to rotate the crank pin 35. But suppose the crank pin did not stop on the dead center? The back pressure then does tend to rotate the crank and might do so, and the knife might descend, undesiredly. To prevent that possibility, the crank pin is solid to a bull worm wheel 31, Figure 2, and not to a bull spur gear. The engaging bull worm 30 is intentionally made of large diameter, to have a gentle thread, so that no back pressure from the wheel will move it.

To test the efficiency of this construction, experiments have been made by removing the braking clutch in worm wheel 43. The bull gear was started under power by the shipper 44 engaging the clutch 28, and at the moment of greatest leverage of the bull spring on the bull crank pin, the shipper 44 was moved away from the clutch 28. The driving force was thus removed. However, no braking force by any other clutch was applied. The parts therefore "coasted" along with the bull spring exercising a force to continue this coasting. But in spite of all this, the rotation stopped in about one-eighth of a revolution, the friction between the worm 30 and worm wheel 31 acting as its own brake. This is a highly important feature for the safety of the operation. A fortiori, the bull spring can never by itself start the rotation of the crank pin and consequent descent of the knife.

*Front table*

The paper having been clamped and cut, the cut off part remains resting on the front table until removed. This front table 320, Figures 1, 3, 5, is somewhat wider than the capacity of the machine. The table is supported by the table base. This table base has a back wall 321, Figures 1, 4, 5, 6, 25, a right end wall 322, Figures 1, 3, 6, a left end wall 323, Figures 1, 3, 4, and some intermediate walls 324, Figures 1, 4, 5. The end and intermediate walls and the back wall are joined by a top. This table base top has a high portion 325 at the right, Figures 1, 3, 6, 25, whose surface is coplanar with the back table top. At the middle, the table-base-top is lowered into a portion 326, Figures 1, 5, which supports the front table 320. At its left, the table base rises again to the table top height and forms the portion 327, Figures 1, 3, 4.

The table base is bolted at its left to the main bracket 154, Figures 1, 4, and at its middle and right it is bolted to some spacers 328 which themselves are bolted to the front wall 15 of the main frame, Figures 5, 6.

The table 320 rests upon the middle portion 326 of the table base, Figures 1, 5, on which it can be slid forward or back and on which it can be bolted by bolts 329. The table is of a ribbed structure, being composed of the table top 320, a front wall 330, a rear wall 331, and some intermediate ribs 332. Extending to the back from the rear wall is a ledge 333. This ledge fits snugly into a groove in the front face of the back table 100.

Resting on top of the ledge 333 and pinched between the front of the back table 100 and the back of the rear wall 331 of the front table, is the cutting stick 335. This is ordinarily made of wood, although other materials have been used.

In actual practice it is found almost impossible to commercially obtain cutting sticks that are immediately usable. Sometimes they are too narrow, and then have to be packed up; sometimes they are too high and have to be reduced. Again, if the stick is loose, the knife 160, which enters it slightly, will actually lift the stick out. Again a stick that was in the machine for some time may warp or may have been too tight in the first place, or may have had some paper dust driven in. In any case, it is so tight that it cannot be removed without a great deal of trouble. Frequently it is removed piecemeal. To avoid all these troubles which occur when the slot for the stick is in solid metal, the front table has been made movable as above described.

Moreover, to prevent the stick from being lifted out by the knife, the spring rods 336, Figure 5, are provided, which at their stick ends are provided with holddowns 337, Figure 26, Sheet 5, tending to hold the stick down against the back table and the ledge. They operate like the holddowns used on planer beds.

The mere pushing of the front table toward the rear thus pushes the stick into the corner, and holds it down there. To release the stick, the front table is pulled forward, and the stick is completely freed and easily removed. This is highly convenient.

However, this pushing of the table up to the stick thus makes the location of the table itself an irregular distance from the knife ledge line, but the table has in it some scales 345, one, two or three, and they are supposed to read from the knife line. This irregular setting of the front table disturbs the reading of the front-table scale. So the scale 345, Figure 3, is made slidable a small amount in a groove in the front table, and is properly set by a stud 346 fast to the scale, reaching through an elongated hole 347 in the front table and striking a stud 348 fast in the table base. The table is set to the stick, the table scales to their studs and all is bolted.

Mounted on the front table are a right gate 340, Figures 1, 3, 6, and a left gate 341, Figures 1, 3, 4, 5. These gates swing about gate posts 342 fastened to the front table, Figure 3, and each gate is capable of being swung clear back so that paper may be freely slid over the table top 320, and the table base tops 321 and 325. However, it is frequently desired to have a wall on the front table in continuation with the side walls on the back table, and for this purpose each gate may be brought into that position, Figure 3, and then bolted to the front table by some bolts 343, Figure 1. Each post 342 is held in a side piece 344, Figures 3, 4, 5, 6, which itself is bolted to the table.

*Power feed mechanism*

The paper having been cut off and removed, the stock must now be pushed forward for a new cut. The pusher mechanism has already been partly described in connection with the back table. Now it will be described further.

The pusher chains 124, Figures 10, 12, Sheet 7, reach forward and pass over idlers 360, Figures 2, 4, 6. There is a set of three idlers on the right side of the machine held by a bracket 361, Figures 2, 6, bolted to the back of the rear-frame right front wall 207. There is a similar set of three idlers held by a bracket 362, Figures 2, 4, bolted to the back of the rear-frame left front wall 210. In each bracket there are two idlers on the bottom and one idler at the top. The top idler is located to the outside. The pusher chain, operating one sled, has two parts 124, an inner and an outer, Figures 10, 12, Sheet 7. The outer chain 124 passes around the outer two idlers 360, and then wraps around the outer chain disc 363 to which it is fastened. The inner chain part 124 passes around the inner-lower-idler 360, then rises vertically and wraps around the inner chain disc 364, to which it is fastened. There are thus an outer and an inner chain disc at the right, operating the sled 109 and pusher right leg 107, and a similar pair of chain discs on the left side operating the pusher left leg.

The right pair of chain discs is mounted on a hub 365 between them, Figures 2, 3. The hub itself is adjustable about the feed main shaft 366, which extends to the left and on which is fast a worm wheel 367. This wheel serves as a hub, and on it are mounted the left pair of chain discs.

Each chain outer disc is capable of an adjustment upon its hub, and also capable of being firmly locked thereto. The slack in the chain of either sled thus can be taken up. Moreover the relation of the right side pair of chain discs to the left side pair may be changed by adjusting hub 365, and this will adjust the sleds and the pusher legs 107, and therefore also the face of the pusher. Each chain may therefore first be made taut, and the pusher face parallelized to the knife edge. If the chains wear, that wear can be taken up by adjusting the chain discs. Attention is called to the fact that the chains act not as sprocket chains, but as flexible bands. The chains therefore do not have to be of accurate pitch. All that is necessary is that their rollers be of constant diameter, and even here a moderate error has no effect. What is important is that the diameters of the chain discs must be equal. But this work is the easiest of all in the machine shop, so is easily accomplished. The diameter of the chain discs is large enough so that for the full motion of the pusher, the chain does not wrap around completely. This makes all the mechanism simple.

The main shaft 366 has intentionally been made quite large in diameter. This is to give it rigidity so a load on one side will not stress it enough to produce a commercially objectionable strain. The shaft is supported by a bracket 368 at the right and a bracket 369 at the left. These brackets are bolted on to the back face of the rear frame.

The worm wheel 367 is driven by a worm 371, Figure 4, which is fast on the long shaft 86 driven by the friction feed disc 68 already described, Figures 2, 4. The shaft quite near the worm is supported by antifriction bearings assembled in a bracket 372, bolted to the rear frame. The shaft rises and is supported by a bracket 373, bolted on top of the rear frame. At its top the shaft carries a miter gear 374, which meshes with a miter gear 375, fast on a shaft 376, whose left end is supported by the bracket 373, and which extends to the right, where it is supported by the bracket 259, Figure 3, already mentioned. Here is another pair of miter gears driving a cross shaft 377, which is supported by a front bracket bolted to the top of the front frame. The shaft carries at its front the feed hand wheel 378, Figures 3, 4, 1.

The handwheel 378, when manually rotated will drive the chain of parts 378, 377, 376, 375, 374, 86, 371, 85, 84, 83, 77 and friction wheel 76, when the latter is in its central position, and thus clears the leather face 75. Incidentally the handwheel, by the worm 371, drives the worm wheel 75

367 and all parts connected thereto inclusive of the paper pusher.

Conversely, when the wheel 76 is slid off the center position, it sets all the above parts into rotation inclusive of the pusher and the handwheel. The mechanism for sliding the wheel 76 will now be more thoroughly described.

It has already been said that the feed wheel 76 is slid by the link 82. This link operates the automatic step mechanism which will be described later. Sufficient now is that the motion of link 82 may be brought about by motion of an arm 380, Figures 2, 3, 30, 31, located at the top-left portion of the machine. This arm is fast on a shaft 381, supported in bracket 373, and extends to the right where it is supported by a bracket 382, fastened to the top of the rear frame.

The shaft 381 at its right end carries an arm 383, which carries a pin 384, parallel to the axis of the shaft. Mounted on 384 is a short cross link 385, having two offset perpendicular holes. In one hole the pin 384 slides. In the other hole slides a vertical pin 386, mounted in a lever 387, fulcrumed on a stud 388, inserted in the top of the rear frame. The lever 387 extends forward into a handle 389 called the power-feed-handle. Figure 3 shows the handle in its central, non-feeding or rest position. Now the feed wheel 76 is central or non-feeding. Movement of the handle to one side moves the parts 387, 386, 385, 383, 381 and 380. The latter was said to move 82 and thus friction wheel 76. The latter then engages the friction disc and the motion of the pusher started.

In order that the operator constantly shall know the location of the pusher, an indicator has been provided as is usual in the art. On this machine it consists of a pointer 395, located on top of the front frame, and which gives the reading on a scale 396, wrapped around a drum 397, rotatable on a stud 398, fastened to the top of the machine. Wrapped around the drum, and individually fastened to it, are a front wire 399, and a rear wire 400. The front wire passes over an idler-sheave 401, then extends down, wraps around and is fastened to a wire pulley 402. The back wire 400 passes over an idler-sheave 403, then extends horizontally rearwards, wraps around and is fastened to a wire pulley 404. Both 402 and 404 are individually adjustable upon the main shaft 366. The wires never make a complete revolution upon either the scale drum 397 or the wire pulleys 402 or 404. The latter are adjusted so that the wires are taut, to eliminate all backlash, and the parts are so dimensioned and assembled that the pointer reading shows the distance of the pusher from the knife line.

The bringing of the pointer, the scale, the handwheel 378, and the feed handle 388 to the top and close together is a very convenient arrangement. The pointer and scale should naturally be at the top where it is light, not dark. In reading the scale, the operator naturally leans forward, thus bringing his head and his arms near to the handwheel. He is thus able to operate with great ease. The same applies to his operation of the power feed handle 388 on which he uses his right hand only.

*Pusher brake*

In jogging stock against the pusher, some operators frequently do some hard pounding against it. In spite of the fact that the pusher is held by the worm wheel 367, Figure 4, which itself is held by the worm 371, it is found that under repeated pounding, all the parts will move back, the worm 371 and connected parts rotating back. To prevent this undesirable feature, a brake has been added. This consists of a brake drum 410, Figures 2, 3, 6, fast on the main shaft 366, and which can be embraced by two semicircular pieces 411 and 412, Figure 6, hinged at their bottom and on a pin 413 set into the right bracket 368. The pieces 411 and 412 have riser arms and at their top have holes, Figure 8, sheet 6, through which passes loosely a spirally cammed rod 414. There is a screw pin in the top of each of the pieces 411 and 412. The screw pin has a tit 415, which fits into the spiral cam. The rod 414 extends to the front, Figure 6, and there it is supported by a bracket 416. To the rear of the bracket there is a collar 417 fast on the shaft 414. To the front of the bracket is a handle 418 fast on the shaft. The shaft 414 thus can rotate but not slide. Rotation of the handle thus will rotate the spiral cam and tighten or loosen the pieces 411 and 412 on the drum 410. To hold the brake pieces 411 and 412 positively locked, the spiral cam must be quite gentle. So the cam is steep at the beginning but gentle near the locking point. In order to keep the parts in their set position, the handle 418, Figure 1, is moved only a semicircle, where gravity will hold it in each of its end positions.

The above concludes the complete description of the machine, excepting the automatic mechanisms. These are three: The cut mechanism, the step mechanism, and the repeat mechanism.

*Automatic cut mechanism*

This is located almost completely under the right table-base top 325, Figure 3, and in front of the table-base back wall 321, Figure 6. It is drawn on a larger scale in Figure 25, sheet 11, while sheets 14 and 15 give detail assembly views.

Fastened to and hanging down from the table-base top 325 is an apron 450, Figures 1, 6, 25, which serves as a front wall to the automatic cut mechanism. The wall 450 is braced to the rear wall 321 by a strut 451, Figure 1.

Assembled in walls 450 and 321 are a number of shafts. There are the direct-shipper shaft 50, and the reverse-shipper shaft 64, Figure 1, already described. There are also a cam shaft 452 rotating in bushings supported in the walls, a cam-lever shaft 453, and an upper shaft 454, the latter two fast in the walls. Then there are four smaller shafts, a reverser shaft 455, a quick-stop shaft 456, a cut-button shaft 457 and a step-interlock shaft 458. These four shafts are rotatably mounted in the walls 450 and 321.

Attached to the front of the bull crank 35 is a pin 460, Figure 25. This fits into a radial slot of a fork 461, adjustably mounted on a bushing 462, which is pinned by a safety-shear-pin 463 to the reduced rear end of the cam shaft 452. The cam shaft and the bull shaft 32 are concentric, so the rotation of the pin 460 causes the rotation of the cam shaft 452.

The automatic cut mechanism may be considered as in three parts. There is the mechanism outside, in front of the wall 450. This is for stopping the knife at predetermined places. Immediately in front of the rear wall 321 is mechanism for reversing the knife in special cases. In front of this and behind the front wall 450 is the mechanism for regular cutting. We start with the last mentioned part, and will call it the direct mechanism.

Direct mechanism

Loosely mounted on the cam lever shaft 453 are a direct-shipper one-way-driver cam lever 465, a direct-shipper-gear 466, and a direct-delayer cam lever 467. Continuing, we find a reverse-delayer cam lever 468, a reverse-shipper-gear 469, and a reverse-shipper one-way driver cam lever 470. Refer now to Figure 25 and to Figures 32, 33, 34, 35, Sheet 14, which show the direct mechanism. In Figure 32 we see the shafts 452, 453, 454, 455, 456, and 457 in section. The direct-shipper one-way-driver 465 is always urged to rotate anticlockwise by a spring 475 on a spring rod 476, whose right end is fast in the table base right wall 322. This rotation is normally prevented by a direct pawl 477, rotatable on the upper shaft 454. The pawl has a hook 478, which hooks over a plate 479 integral with the driver 465. The pawl 477, Figure 25, has an upper arm which is joined to a link 480, and to a tension spring 480', whose left end is fastened to the framing. The link 480 is joined to an arm 481, fastened to the shaft 457. Much further to the rear, behind the rear wall 321, the shaft 457 has on it another arm 482, joined to a vertical link 483. This link is operated by fingering the cut button, as will be later explained. The pawl 477 can therefore be called the finger pawl.

The plate 479 extends somewhat to the rear. In Figure 33 the plate is seen in cross section. Pressing against it is the quick-stop pawl 484, fulcrumed on a pin fast in the shipper gear 466. The pawl has a lower arm 485, against which pushes a spring pin 486, mounted in an offset portion of the shipper gear 466. Excessive motion of 484 is prevented by its stop arm 487.

The shipper gear at its top is geared to the shipper pinion 488, Figure 25, which by a link 489 is connected to an arm 490 fast upon the shipper shaft 50 which operates the shipper sleeve 44.

There is a torsion spring 491, Figures 25, 33, with one end hooked over a pin 492, fast in the driver 465, and the other end hooked over a pin 493 fast in an adjustable ratchet 494 mounted on the hub of the shipper-gear 466. There is a pawl 495, pivoted on a stud 496, fast in the shipper gear 466. By rotating the ratchet and catching it on the pawl, the torsion spring is wound up to exercise a desired pressure on the pin 492. Thus the torsion spring urges the shipper gear to rotate clockwise, that is to move the shipper to dispower and to brake the bull gear.

This clockwise rotation is normally prevented by the quick stop pawl 484 on the shipper gear, abutting the plate 479 on the one-way-driver. Under these circumstances, the driver and shipper gear can rotate as one piece about their shaft 453.

When the finger link 483 is lifted, the hook 478 frees the plate 479. The spring 475 rotates the driver 465 anticlockwise. The plate 479 pushes on the pawl 484 and is pivot pin, thus rotating the shipper gear 466, anticlockwise. There is no resistance offered by the torsion spring as both its hook pins 492 and 493 move like a rigid body. The shipper-gear 466 moves the chain of intermediate parts 488, 489, 490 and 50, and so finally shipper sleeve 44, Figure 2. This makes the brake ineffective and the power friction clutch 28 effective and starts the rotation of the bull gear, bull crank, knife, clamp and cam shaft 452, Figure 32. The spring 475 therefore unbrakes and powers the bull gear.

Fast on the cam shaft 452 is a cam 497. In due time it strikes a roller on a lower arm of the one-way-driver 465. The cam pushes the roller away, rotating the driver clockwise, compressing the spring 475, until finally the plate 479 is sufficiently retracted for the hook 478 to again hook over it. Further rotation of the cam 497 leaves the driver hooked. The cam 497 continues its rotation until it makes a complete revolution and stops in its normal position, Figure 32, with ample room for the next in-jump of the roller 498.

The return of the driver causes the return of its pin 492, and through the intermediation of the dispowering and braking torsion spring 491, pin 492, ratchet 494, pawl 495 and stud 496, urges the return of the shipper gear 466, and thus to cause the unclutching of the power friction clutch 28, and the clutching of the braking gear clutch. But this dispowering and braking gear 466 is intentionally delayed by the delayer mechanism.

Figure 35:

This consists of a delay tooth 499, Figures 33, 34, 35, on the clutch shipper pinion 488. This operates to be caught by a hook 500, Figure 35, forming part of the delayer pawl 501, rotatable on its shaft 453. This delayer lever pawl 501 is urged by a spring 502 to hook the shipper pinion, but is prevented at times from doing so by its roller 503 and the cam 504 therefor, fast on the cam shaft 452.

Normally the parts are located as shown in the figures. Hook 500 is off tooth 499. When the shipper pinion 488 jumped clockwise, as above described, the tooth 499 jumps low enough to be hookable by 500. This is at first prevented by the cam 504. In due time the cam in its rotation clears the roller 503, and the hook 500 now hooks over 499. This is before cam 497, Figure 32, commences to push back roller 498. Later on, roller 498 is pushed and pin 492 is moved, but all that results is that the torsion spring 491, Figure 33, is stressed the more, because the parts 499, 488, 466, 495, 494 and pin 493 cannot move back. Link 489, arm 490 and shaft 50 therefore remain still, and the clutch 28 still supplies power and rotation.

Still later on, near the end of the complete revolution, the cam 504, Figure 35, again forces roller 503 out and thus forcibly pulls hook 500 off the tooth 499. Then the shipper-gear and connected parts under the force of the doubly stressed torsion spring, jump to their first positions, Figure 33, and the shaft 50 pushes the shipper-sleeve 44 first to dispower clutch 28 and then to brake the machine, whereupon the bull worm and other parts rapidly stop. The parts are so dimensioned that the stop brings the parts to their previous normal or rest positions.

On examination, it is seen that the finger pawl 477 and delayer pawl 501 operate quite similarly. Pawl 477 prevents the shipper sleeve 44 from jumping out of the brake into the power, and pawl 501 prevents the jumping out of the power into the brake. Both pawls prevent their shipper sleeve operating springs from moving. Both are released after their springs are energized. The difference is that the finger pawl 477 is released by the finger, while the delay pawl 501 is released by the cam.

The cam shaft therefore energizes the spring 475, tending to shift the shipper sleeve out of brake and into power, and the torsion spring 491 tending to shift the shipper sleeve out of power into brake. This the springs are prevented from doing by the pawls 477 and 501 respectively. These pawls are simply triggers for a load-and-fire mechanism, as above explained.

The description is complete. But it sometimes happens that the parts of the clutch 28 "seize" and refuse to let go in time to stop the parts in their desired normal position. For this contingency, the dispower compeller mechanism is provided.

Upon the shipper-gear 466, Figure 34, is mounted the clicker 506, fulcrumed at 507, urged outward by spring 508, but limited in this outward motion by screw 509. Rotatably mounted on the cam shaft 452 is a compeller 511, fast on a ring 512, surrounding the cam shaft 452, and carrying a pin 513 to which is attached one end of a coil spring 514 whose other end is attached to a pin 515, fast in the hub of one of the adjacent cams. The compeller 511 thus has a tendency to rotate anticlockwise about the cam shaft 452, but this rotation is limited, forward by pin 516, and backward by pin 517. Pins 516 and 517 are fast in the adjacent cam.

The parts are normally as shown. When the link 483 operates the shipper one-way-driver 465 and shipper gear 466 rotate anticlockwise, the face 519 of the clicker 506 rotates into the path of the compeller 511. The cam shaft continues its rotation and in due time, the delayer lever frees the shipper pinion 488 and the shipper gear 466 is urged by its torsion spring to dispower and to brake the machine.

Slightly before this the compeller 511 came up against the intruded clicker face 519, and tried to pass by. As it could not, the compeller stopped moving. But the cam shaft continued its rotation. The backing pin 517 therefore came nearer and nearer to the compeller 511. Slightly before contact, the delayer lever 501, Figure 35, released the shipper pinion and freed the shipper. The torsion spring 491 urged the shipper gear 466 to jump clockwise to shift the shipper-sleeve 44, Figure 2, to dispower and to brake the machine. If the shipper gear 466 did jump, then pin 517 did not push compeller 511, which did not push clicker 506. If, however, the shipper gear did not jump back, then compeller 511 could not pass by. So pin 517 came up behind the compeller and pushed it. So the compeller pushed the clicker, which pushed the shipper gear, etc. and forced the shipper sleeve 44 away from the clutch 28 and dispowered the machine.

It is found that once the "seizing" of clutch 28 on the shipper-sleeve is broken, then it moves the rest of the way out readily enough to brake the machine. So shipper gear 466 now jumps to normal position, and frees compeller 511, which then jumps away from pin 517 to pin 516 and thus makes clearance for clicker 506 for the next operation of the machine.

Since the compeller 511 is ultimately relied on for moving the shipper-sleeve 44, then why all the other mechanism, namely the torsion spring 491, delayer 501, etc.? This is because ordinarily the torsion spring 491 does have strength enough, and because of the operation of the spring 475, Figure 32, and torsion spring 491, Figure 33, the mechanism operates like a load-and-fire device, as previously explained, which is easy on the friction clutches, so that they last for a long time. This would not be the case if that feature were eliminated.

The button link 483, Figures 32, 1, rises and at its upper end is connected to an arm 525, fast on the button shaft 526, Figures 5, 1, 4, 6, which is rotatable in the front frame 213, and carries a button 527, Figures 5, 1. Pressure upon this button 527 lifts the link 483 and initiates the rotation of the cam shaft 452 as above described.

There is an interlock button 528, which must be pushed to release the finger button shaft 526. Its mechanism is old, and therefore not shown.

Below the button shaft 526 is the reverser shaft 529, Figures 1, 5 which by depending arms 530, carries the stems 531 of the safety reverser manal plate 532. This plate extends practically the full width of the paper opening. Pressure on any part of the manal pushes its stems and rotates the manal shaft 529. This shaft has an arm 533, connected to a link 534, extending down, and connected to an arm 535 mounted on the rear end of the reverser manal cross-shaft 455, Figures 1, 33.

Fast on shaft 455, considerably forward, is a down arm 536, Figure 33, connected by a link 537 to an up arm 538, fast on the quick-stop shaft 456. Again further forward, fast on the shaft 456 is a bent down arm 539. Pushing on the manal plate 532, thus pushes quick-stop arm 539 to the right.

With the parts as shown, Figure 33, pushing the plate produces no effect. But if the cut-button 527 had been pushed and the shipper driver 465 and shipper gear 466 had jumped anticlockwise, the quick-stop pawl 484 would have been depressed, bringing its lower end 485 opposite the lower end of 539. A push now on the manal 532, and the quick-stop arm 539 pushes the quick-stop pawl 485 which frees 484 from plate 479. The abutting of 479 and 484 had previously held the shipper-driver 465 and shipper-gear 466 together as one piece. Their freeing permits the torsion spring 491 to jump the shipper gear 466 clockwise, the plate 479 remaining stationary, the pawl 484 rising from its depressed position to its normal position, and the shipper pinion 488, etc., inclusive of the shipper-sleeve 44, resume their braking position. The pushing of the reverser thus has brought the bull gear and connected mechanism to a quick stop by dispowering the friction clutch 28 and braking the bull worm shaft 29 into the worm wheel 43, Figure 2.

Of course, the reverser, instead of being a plate, might be only one push button, or several buttons. Again instead of the plate moving forward or back, it might move in some other direction, say up or down. All that is required is that it shall release the quick-stop release mechanism and that it shall be readily operated.

Suppose the operator has his hands occupied and wishes to stop the machine, then he may strike the reverser with his head. As the head is not controlled as readily as the hand, it was decided to make the reverser reach clear across the paper window and near it so that the operator may strike anywhere. The reverser is thus a kind of a handle, but intended to be operated by the hand, head or shoulder or elbow, or any other part of the man's body. As a part operated by the hand is called a handle, one operated by treading is called a treadle or pedal, so this operated by the man will be called a manal. Therefore a push-button, a handle, a treadle, etc. are each of them a manal. If there were a telephone transmitter and the operator spoke therein to effect a result, that transmitter would be a manal. A manal as used in this specification and claims means, a part whose change (of position, velocity, etc.) is initiated by the man and not by the machine, and which in the absence of the man would not be changed.

It is, however, desired that when the corpal plate 532 is pushed, not only shall the knife have a quick stop of its down motion, but should reverse and go up and this is accomplished by the reversing mechanism, Figures 25, 36, 37, 38, 39.

Reverse mechanism

This mechanism is almost a duplicate of the direct mechanism, sheet 14. The parts, however, are reversed. Thus starting from the reverser we have the link 534, arm 535, shaft 455, and down arm 536 already described. The latter has a link 541 which connects to a reverse pawl 542, rotatable on shaft 454, and urged to hook by a tension spring 543, fastened to the framing. The hook 544 catches a plate 545, fast on the reverse shipper one-way-driver 470. This is rotatable on shaft 453, urged by a spring 547 to move clockwise and carries a roller 548, which cooperates with a cam 549 fast on cam shaft 452. There is also a forked plate 554 fast on the lever 470. Both plates 545 and 554 extend toward the front to be operated by the reverse shipper gear 469.

The reverse shipper gear 469, Figure 37, has a block 550 serving as a stop for the plate 545. Also the tines of the forked plate 549 embrace a semicircular rod 551, and push a helical spring 552, mounted on the rod. The ends of the rod are fast in ears 553 in the reverse shipper gear 469.

The reverse gear 469 is geared to mesh with a reverse-shipper-pinion 555, rotatable on shaft 454 and joined by link 556, to an arm 557 fast on the reverse shipper shaft 64. The shipper gear 555 has a tooth 558, for a hook 559, Figure 39, of the reverse-delayer cam pawl 468. The latter is rotatable on shaft 453, urged by a spring 560 to hook, and carries a roller 561, working with the cam 562 fast on the cam shaft 452.

Similarly there is a reverse clicker 563 and a reverse dispower cam puller 564, Figure 38.

The reverse parts just described are approximate duplicates of the direct parts previously described. Their operations also are similar. But they are all reversed. For their operation, the cam-shaft 452 rotates clockwise, not anticlockwise as in the direct operation.

There is no interference caused by the reverse rotation of the cam shaft. The only place where it might have occurred was in the compeller 511 or 564 striking the clicker 506 or 563 respectively, Figures 34, 38. That is why the clickers were made to be held out by their springs 508. On reversed motion of the cam shaft, the compeller simply pushes the clicker in and passes by.

The manal plate 532 and link 534 operating arm 536, Figures 33, 36, thus operates two mechanisms. One is the quick-stop release of the power clutch 28 by means of the mechanism, Figure 33, already described. The other is the opening of the reverse pawl 542, Figure 36, and consequent starting of the rotation of the reverse shipper pinion 555, Figure 37, and reverse-shipper shaft 64. It has already been described how that shaft operates the reverse clutch 66 and reverse worm 52, Figures 6, 7, sheet 6. Therefore, the reverse worm-wheel is set into rotation and the bull gear and cam shaft rotate reversely. The knife rises and clears whatever it might have previously contacted. This reverse operation continues until the reverse delayer 468 frees the reverse shipper gear 558, whereupon it jumps back carrying with it the reverse shipper shaft 64 and the reverse-shipper-sleeve 58, Figure 7. This frees the reverse clutch 66 and stops the power on shaft 55 and worm 52, and worm wheel 43, which thereupon comes to rest, also bringing the bull worm and knife to rest in its elevated position.

This finishes the description of the automatic direct and reverse cut-mechanism. However, in Figures 1, 39, is shown the step-interlock-shaft 458. This has on it an arm 566 for a notched disc 567 fast on shaft 50; another arm 568 for a notched disc 569 fast on shaft 64, and an arm 570 joined to a link 571 operated by the step mechanism to be later described. The down motion of 571 thus locks both 567 and 569, and thus locks both shafts 50 and 64 in their non-driving positions. The step mechanism and cut mechanism are thus interlocked.

Knife stop mechanism

We now come to the knife-stop mechanism located at the front of wall 450, Figures 1, 25.

Fast on the front end of the cam shaft 452 is knife-stop dog-holder 575. It is a disc with a T-slot 576 all around. On headed bolts in this slot are mounted three or more dogs. One is 577, which is perfectly round and has a large disc and a small hub, the dog being mounted with the disc forward. Another is 578, just like 577 but mounted with the disc contacting the holder 575. A third is the centralizing spool or replacing dog 579. It has a groove 580 midway between the discs of 578 and 577.

Fast on the front end of the quick stop shaft 456, Figure 1, is an arm 581 working with a lever 582, rotatable on shaft 453. At its bottom the lever has a fork 583, Figure 40, sheet 11 which carries a shaft on which is slidably and rotatably mounted the lifter 584. This is a round piece with a large disc portion 585 and three V-shaped grooves 586. There is a spring pin 587 for locating the lifter by entering one of the grooves. When the spring pin is in the middle groove, Figure 40, the disc 585 is aligned with the groove 580 of the replacing dog 579. When pulled forward, 585 lines up with 577. When pushed back, 585 aligns with 578. The spool 579 is wide enough to catch 585 in any of its positions and the passing of the spool centralizes, that is replaces the lifter. This is the normal position, so that the dogs will not operate.

Normally, the dogs 577 and 578 pass 585 without contacting. But if the lifter had been displaced forward, it will be in the path of 577, and will be lifted by it and thus rotate lever 582. Also shaft 456 will be rotated counterclockwise and move arm 539, Figure 33. This will quickly stop the knife as previously described.

Attention is called to the fact that the shaft 456 and its arm 538 do not operate link 537 and therefore the knife reverse mechanism is not operated. Therefore the knife simply stops. When it is desired to complete the revolution of the bull gear, the machine is started again by operating the direct-shipper-sleeve handle 51, Figure 1.

As there are two dogs 577 and 579, and as 585 can be brought into cooperation with either, the knife may be stopped at either of two places. Since the dogs are adjustable all around, these two places may be wherever desired.

The knife stop mechanism is used most frequently in changing and adjusting the knife in the beam 156. To change the knife, the beam is brought down to the present place by first pushing back the lifter 585, then pushing the cut button 527. The machine starts and automatically stops at the preset place. The knife is then removed.

By the handle 178, Figure 15, the beam is now adjusted high enough for safety so the new knife will not cut into the wood, the new knife is installed, and the revolution finished by use of handle 51. The lifter 585 is now pulled out, the cut button 527 pushed and the machine will stop with the beam and knife in lowest position, with the knife edge near the table. Now by again using handle 178, the beam is moved down, and both sides of the knife are parallelized to the table to cut the paper properly. The revolution is finished as before. As is common, this operation is repeated a few times until the knife is perfectly adjusted.

The knife is razor-edged and heavy. Moreover the razor edge is very readily injured. It is a mental and physical strain on the operator to change a knife. To facilitate this operation, the beam has been provided with the right angled slots 590, Figure 13. The knife 160 is held by two handles 591 specially provided therefor, which are screwed into special holes in the knife.

The operator lifts the knife by the handles, enters it behind the beam, Figure 5, the handles passing up the vertical portions of the slots, and then he shoves the handles to the right, whereupon the handles enter the horizontal portions of the slots. The knife is now safely supported and the operator can let go the handles. Moreover, it is now in approximately its proper position. The operator now fastens it by the knife screws, as is usual, and then unscrews the handles and removes them.

Operators hate to change a knife because it is such a dangerous proceeding. Moreover, it is a tedious job. So they delay changing it until absolutely necessary. Now it happens that only a sharp knife does good work, a dull knife spoils the work. A knife should be changed at the first sign of dullness. The slots 590 almost completely remove both the danger and the tediousness, and thus overcome the reluctance of the operator to changing the knife. And so the work is of better quality. This improvement is therefore very important.

Attention is called to the fact that the vertical portion of the slot may be of various shapes, and that the horizontal portion may also be considerably modified. All that is really necessary is to bring the knife into place by a motion with the handles still in the knife and to temporarily rest the handles on a portion of the beam itself, or something attached to it.

Moreover, it is customary to have in the knife several series of holes for the knife screws, ordinarily three series. When the knife is new, the screws are entered in the series nearest the edge, that is, farthest from the back of the knife. When the knife is ground and put back on the same series of screw holes, the beam is adjusted for the amount ground off. After repeated grindings, the amount removed may exceed the adjustability of the beam, so it is customary to put in a filler block on top of the back of the knife, while the screws are now entered in the next series of holes, that is, the series next nearer the back of the knife. And so on for the next grindings.

But the change from one series of holes to the next series changes the relative position of the handle screw-holes and the L-shaped slot. To avoid this difficulty, there are as many holes drilled in the knife for each handle as there are series of holes. As ordinarily there are three series, so there are three special handle holes for each handle. By making the horizontal portion of the L slot in line with the screw-holes on the beam, the handle-hole in the knife also comes in line with the knife screw holes of its series. An operator therefore simply inserts his handles into the special screw holes in line with the series he will put the knife screws in.

Of course it would be possible to make the end of the L-slot to be a place to screw in a regular bolt. The slot would then have a width slightly larger than the body of the screw. The screw head wuld be larger than the body, and the head would bind the knife to the beam, in spite of the slot, although not quite so well as previously. This would eliminate the need for extra holes in the knife for the use of the handles. They would be entered into the regular holes. However, the extra holes are the preferred form just because of the non-weakening of any of the knife screw hold.

*Step mechanism*

We shall now describe the mechanism for stepping, that is advancing the paper various steps, one step at a time. The smallest step may be as little as 1/64 inch. The largest may be full capacity of the machine. And there may be any number of steps successively, and ordinarily they are not of equal length. When the pusher has reached a prelocated position, the next step may be an automatic fore-step or an automatic backstep to another prelocated position. Thence the next step may be another back-step or another fore-step as the mechanism gives the direction.

This mechanism is set into operation by a step push button 602, mounted on a shaft 601 rotatable in the front frame, Figure 1. At the right, the shaft carries an arm 600, from which there hangs the link 571, to interlock with the automatic cut mechanism as previously described. The shaft 601 continues to the left, where it has another arm 603, Figures 28, 29, joined to a rising link 604. This is joined to an arm 605 on the front of a cross shaft 606. The latter goes through both the front and rear frames and at its rear has an arm 607 joined to long downward link 608, extending through holes in the framing to connect to the step mechanism button clutch lever 610, rotatable on shaft 609 held in the walls 19 and 13, Figures 52, 55.

A push on the button 602 will rotate the lever 610 clockwise. The lever 610 is a part of the step mechanism which is chiefly located in the main casting beneath the top 16, Figure 2, above the smaller platform 20, and between the left platform wall 19, and left main wall 13. In Figure 2 this space is closed by a cover 611.

Looking at Figures 2, 4, 30, 52, we find the motor driven power shaft 88, journaled on the walls 19, 13 as previously described. Next to the wall 19 the shaft 88 carries a pinion 613, Figure 52. This gears with and drives a gear 614, Figures 52, 53, 64 screwed to the power clutch 615. The latter has an anti-friction bearing, and rotates loosely on the step mechanism cam shaft 616, rotatably mounted in the walls 19 and 13.

This step-cam shaft furnishes power when so desired to accomplish various step mechanism functions to be later described. Some of them occur before the stepping of the paper, and others after the stepping. As the length of the step may be anything from a 1/64 inch up to the capacity of the machine, and therefore takes a variable and perhaps long time, the step camshaft is brought to rest and waits while the paper takes the time and steps. After the step end, the cam shaft starts again and gives power again as desired. This portion of the mechanism will be described now.

This cam shaft carries on it a jump-clutch 617, which is constantly urged by a spring 618 inside of it to jump toward the power clutch 615. The jump clutch can shift upon the cam shaft 616 but cannot rotate on it, being prevented by a pin 619, indirectly fastened to the cam shaft.

Normally the jump clutch is disconnected from the power clutch as shown in Figures 52 and 53, the clutch teeth being kept out of engagement. This is done by an unclutching pin 620, fast in the step button lever 610. The pin is seen in section in Figure 54. This figure is a development of the outside of the jump-clutch 617. Adjacent to the clutch teeth, it shows a raised portion 621 extending almost completely around the clutch body but having a cut-out 622. This has an helically inclined edge 623, a circular edge 624, and an axial edge 625.

Let the step button 602 be pressed and thereby pin 620 be pulled out from its normal position, holding the jump-clutch out from power-clutch 615. The jump clutch jumps into the constantly rotating power clutch, and thus the jump clutch and cam shaft both commence to rotate. Let the button 602 now be released. The pin 620 will fall on the continuous raised portion 621 and rest thereon. The jump clutch continues its rotation until in due time the cut-out 622 again comes opposite the pin 620. Thereupon the pin falls in, being urged thereto by the spring 626, Figure 55. Almost immediately the helical edge 623 strikes the now intruded pin 620 and as the latter cannot move axially, the former does. The jump clutch is thus forcibly pulled out from the power clutch 615, again compressing the spring 618. A moment later the circular or dwell portion 624 engages the pin 620, and a moment later yet the axial portion 625 strikes the pin 620, and the jump clutch 617 and the cam shaft 616 are prevented from rotating further.

The portion marked 628, Figures 54, 55, is inclined. The edge 625 is nearer the center than the edge 629. Thus if the pin 620 is lifted out sufficiently to clear the edge 625, the jump clutch will engage and start rotating, and thus by its own power, force the pin 620 further out. This, through the intermediate mechanism already described, will give the shaft 601 an extra movement. This will be utilized in the wait mechanism to be described later.

The jump clutch 617, Figure 54, has a reduced portion 631, from which rises a raised portion 632 which has a helical edge 633, a circular edge 634, and an axial edge 635, similar to the edges 623, 624, 625, already described. Working with the edges 633, 634 and 635 is another unclutching pin 636. This pin is fast in the step end clutch-lever 637, Figures 56, 57.

Upon the pushing of the step-button 602, the jump clutch starts rotating as above described. After about a semi-revolution, this rotation is stopped by the operation of pin 636 upon the edges 633, 634 and 635. The jump-clutch and cam shaft thereupon rest. This resting time is the variable time when the paper moves its step small or large. When the step-end occurs, the lever 637 is moved to pull its pin 636 from the jump clutch. The latter again engages the power clutch and completes the revolution to be again stopped, this time by the button clutch pin 620, Figure 55.

This stepping of the paper is of course of a preset amount, small or large. This is accomplished by moving the paper pusher the desired distance, and this is done by rotating the main shaft 366, Figures 2, 3, 4, 27, a predetermined angle. This will now be described.

In order to determine this step-angle of the main shaft, there is mounted on it the stepper carrier 640, Figures 1, 2, 3, 27, 29, 30. This is a drum cylinder in which have been cut a number of dovetail grooves 641, Figure 27, for the carrying of the steppers. The steppers are of three different styles, the fore-stepper 642, the back-stepper 643 and the direction-stepper 644, Figures 41, 44 to 51.

The steppers cooperate with a set of detectors mounted in a sled, Figures 41 to 51. This sled 647 embraces and is slidable on a slide 648. The sled may be fastened to the slide by having a hole therein 649, Figures 42, 44, entered by a pin 650, carried on a spring push button 651. To release the sled from the slide, the button 651 is pushed. Then the sled is slid to bring its detectors opposite any set of stepper carrier grooves 641 desired, and the pin 650 allowed to spring into the desired hole 649.

The slide bar 648 is fast on an inner plate 652 and an outer plate 653, Figures 1, 2, 3, 27, 28, 29, 30, 31, 42, 43. The inner plate is mounted to the inside of the stepper carrier 640, Figures 27, 29, and fastened to a hub 654, rotatable on the main shaft 366. The outer plate 653 also is rotatable about the main shaft axis. The two plates are strengthened by some struts 655, and the whole structure, plates, struts and slide bar look somewhat like a cage; it will be called the feeder cage.

As this cage is rotatable about the main shaft axis, its slide 648 and sled 647 and detectors therein constantly keep at the same distance from the stepper carrier 640, whether the carrier or cage or both are rotating. The cage may be rotated automatically as will be later explained. It may be rotated manually by the power feed lever 387, Figure 3, which drives the arm 380, Figures 30, 31, which works a pin 379 fast in the plate 652. This is done for the feeding of the paper.

Each cage plate 652, 653 has pivoted on it a downward link 656. This link at its bottom is pivoted on an arm 657 extending forward from a stiffener 658, Figures 30, 31. This is a substantial casting and is rotatably supported in a bracket 659, bolted to the top surface of the sled foot 211. The stiffener 658 has also a middle arm 660 to which is pivoted a down link 661, passing through a hole into the mechanism underneath to be connected thereto.

The upper ends of the links 656 are attached to the plates 652 and 653 very close to the slide bar 648, Figure 31. Thus the latter is stiffly held parallel to the main shaft axis and at a constant distance therefrom.

In the detector sled 647, Figures 41, 42, 43, are mounted seven detectors. The four to the left are alike and are called the fore-detectors 663. The next is a back-detector 664 and is different. And finally the last or direction-detector 665 is different again. Between the back-detector and the direction-detector is a setting-detector 662 to be later explained. All are rotatably mounted on a shaft 666, fast in the sled frame 647. Each detector except the direction-detector 665 carries a spring pin 667, Figures 45, 41, constantly urged outward, against the beveled under surface of a bar 668, passing over all the detectors and forming part of the sled framing.

There is a prepost shaft 669, rotatable in the plates 652 and 653, Figure 31, and passing through the walls of the sled 647 and cooperating with tails on the detectors. This shaft has on its right end a spur pinion 670, meshing with a spur-gear sector 671, fulcrumed on a stud 672, fast in the inner plate 652. There is a guiding stud 673 also fast in plate 652, which fits in a slot 674 of the sector and serves to support and limit the sector movement. Joined to and hanging down from the sector is a link 675, whose lower end is joined to the inner tine of a fork-shaped arm 676, pivoted on a stud 677, fast in the bracket 659, Figures 30, 31. The outer tine of the fork arm has attached to and hanging down from it, a link 678 which passes through a hole into the lower mechanism to which it is connected. Motion of the link 678 moves the arm 676, the link 675, the sector 671, the spur gear 670, and so rotates the prepost shaft 669.

The prepost shaft 669 has on it a number of cam portions, one opposite each dovetail groove 641 of the carrier. All cam portions are alike. Each cam portion is composed of three parts, a forward cam portion 680, a back cam portion 681, and a setting or clearance portion 682. Normally this prepost shaft 669 is located as shown in Figures 44 and 47, with the setting portion 682 parallel to the tails 683 of the fore-detector 663, or 684, the tail of the back-detector 664.

Attention is called to the fact that the four fore-detectors 663 have their tails 683 at their left, Figures 41, 42, 43, while the back-detector 664 has its tail 684 at its right. The result is that the tails 683 are arranged opposite to the cams 680, while the tail 684 is opposite cam 681. Rotation of the prepost cam shaft 669 clockwise, Figure 44, will therefore bring the clearance portion 680 over the tails 683 and free them, but will keep full shaft diameter metal over tail 684 and thus hold it. But rotation of the prepost cam shaft 669 anticlockwise, Figure 47, will hold tails 683 and free tail 684. In other words, rotation of shaft 669 clockwise frees the fore-detector and holds the back-detector. Anticlockwise rotation frees the back-detector and holds the fore-detector.

The detectors 663 and 664 are shown in their normal position, Figures 44, 47, to have their spring pins 667, on the inner end of the left bevel on the bottom of bar 668. The spring pin thus constantly urges its detector to rotate anticlockwise into positions, Figures 45, 48. This the detectors cannot do, being held by the prepost shaft 669. But upon a detector 663 being freed, it does advance to position, Figure 45; similarly upon the detector 664 being freed it advances to the position, Figure 48.

Each fore-detector 663 has a stop tooth 685, to work with a fore-stepper 642, Figures 44, 45, mounted on the carrier. Similarly the back-detector 664 has a tooth 686 to work with a back-stepper 643. Rotation of the carrier clockwise (that is, fore motion of the paper pusher) will make the fore-stepper 642 and fore-detector 663 effective on each other, Figure 45. Reverse rotation would simply cause the stepper to push the detector back and click by. Similarly back motion of the pusher, that is anticlockwise rotation of the carrier and stepper 643 will be effective on back-detector 664, while reverse rotation would let them click by.

Referring now to Figures 2, 4, 30, 31, let us recall that the feed friction wheel 76, slid by link 82, caused the fore motion of the paper pusher when below the center of the friction disc 68 and back motion of pusher when above. The down motion of link 82 is connected to the up motion of link 661, Figure 30. Moreover, as will be explained later, the sector link 678 is given a preliminary or rather prepost push in the same direction. From then on links 661 and 678 travel up at the same rate. That is, for a fore feed of the paper pusher, the sector 671 and prepost shaft 669, Figures 44, 45, is given first a preliminary motion to make the fore detector 663 effective, and after that the whole feeder cage inclusive of the slide bar 648 and sled 647, and all the detectors are lifted up. That is, the detectors are rotated about the center of the main shaft in the direction opposite to the fore-feed of the stepper carrier.

The same is true when the friction feed wheel 76 is lifted to back the paper pusher. First the prepost shaft 669, Figures 47, 48, is made effective on the back detector, the sled and detector 664 drops down, and the adjacent part of the carrier rises.

In a sheet fore-feed, the next stepper is near. In a long feed, the next stepper is far away. In the short feed, the feeder cage detector will soon encounter the stepper, and will soon stop. In a long feed, the feeder cage will rise to the extreme of its motion, and then it will stop. As the paper pusher and paper are generally quite heavy, the friction feed wheel always slips a little so that the feeder cage generally rises quite a distance before the stepper carrier starts rotating.

But whether soon or after a wait the carrier rotation starts, and continues, and it will finally bring the oncoming next stepper to contact the tooth of its cooperating detector. It will thenceforth force the detector along. This will force the detector sled back to normal, thus forcing the feeder cage back, and finally forcing the friction wheel 76, Figure 4, back to central or non-driving position. The feeding will therefore stop and the paper pusher come to rest.

The fore-steppers 642 and the back-steppers 643 and their cooperating detectors are operative to stop the motion of the pusher. The pusher motion is started by the step push button. It is, however, desirable to provide mechanism to have the motion start in the proper direction. This direction mechanism will now be described.

In the sled 647, Figures 41, 42, 43, is the direction-detector 665, Figures 50, 51. It is pivoted about the shaft 666 and has a tooth 687 to contact a direction-stepper 644 placed in the carrier. The direction-detector 665 is pin-and-slot joined to a direction lower lever 688, pivoted on a stud 689 fast in the sled frame. There is a spring 690 holding the lever out, and the direction detector up against the bar 668, Figure 50. This is the normal position.

There is a direction bar 692, mounted on arms 693, fast on a direction shaft 694. Normally the bar is as in Figure 50, with 692 free from 688. For a stepping cycle, before the drum starts feeding, the direction shaft 694 is given a push by a spring to move the bar 692 to the left. It starts to do so. Soon it encounters the lower lever 688, which it pushes away, overcoming the resistance of the little spring 690. This pushes the tooth 687 toward the drum. If there is no resistance encountered, then 687 moves and 688 moves, and the parts assume the position of Figure 51. If, however, resistance is encountered because a direction stepper 644 is opposite the tooth 687, then 687 comes up to it and is stopped. Therefore direction bar 692 is stopped. Therefore direction shaft 694 is stopped.

The shaft 694 is journaled in bearings 695, Figures 28, 29, 1, 3, fastened on top of the left-front-wall 210 of the rear frame. The shaft extends to the outside and at its end carries an arm 696, to which is pivoted a link 697, reaching down and jointed to a lever 698, Figures 27, 28, fulcrumed on a pin, fast in the rear frame wall 210. The other end of the lever 698 is jointed to a link 699 reaching through a hole in the framing and connected to the mechanism beneath.

Let us review the links reaching from the upper step mechanism, thus far described, to the mechanism underneath. Taken in the order that they go through the holes in the framing, they are the innermost 608, next 661, then 678 and finally 699. 608 is the step push button link, 661 rotates the feeder cage about the drum, 678 rotates the gearing driving the prepost shaft 669, and 699 feels for the absence or presence of a direction stepper. They will be called step button link, feeder cage link, prepost link and direction link.

Referring now to Sheets 13, 18, 19, 20. We see that the step mechanism lower part has the power shaft 88, Figure 30, and the step-cam shaft 616, both already described. Underneath 616 is the step cam lever shaft 609, already described, and the lower shaft 711. To the left in Figure 30 we find the rear shaft 712, and beneath it the bar 713. The shafts and the bar all reach from wall 19 to wall 13, Figure 52, and are fastened rigidly thereto.

Resuming our consideration of the figures, we will first trace the connections to the links 608, 661, 678, 699, just considered.

The button link 608 has already been described. It connects to the button clutch lever 610, Figure 55.

The feeder cage link 661 is connected to the front end of the feeder base 715, rotatably mounted on shaft 609, Figures 30, 52, 61, 62, 63, 64, 65.

The prepost shaft link 678 is connected to the front arm of a bell crank 716 pivoted on a stud 717 fast in the feeder base 715, Figures 61, 64.

The direction link 699 is connected to the front end of a direction cam lever 718, also mounted on shaft 609.

Now following the operation of the machine as far as convenient. We have already seen that the pushing of the step button, rotates button lever 610 clockwise, Figure 55, and frees the jump clutch 617 and initiates rotation in the cam shaft.

Soon the direction cam 719, Figures 52, 74, 76, 77, fast on the cam shaft 616 rotates its solid portion away from the roller 720, and the direction lever 718 under the influence of the spring 721, whose other end abuts bar 713, Figure 30, pushes link 699 up. This lever by the chain of parts already described, namely links 699, 698, 697, 696, 694, 692, 688, 665 inclusive of direction tooth 687, Figures 50 and 51, may be stopped by the presence of a direction stepper 644. The lever 718 has integral therewith a lug 722, in which is fastened a shift pin 723, Figure 77.

Shiftably, but not rotatably, mounted on the cam shaft is the compound cam 724. It is both a direction and a prepost cam. It is composed of six cams all rigid together. They are 725, 726, 727, 728, 729, 730, Figures 52, 75, 76. Of these 725, Figures 72, 73, works with the direction lever shift pin 723. If the pin is out, the cam 725 will not be affected by the pin and will continue its rotation unshifted. If the pin is in, then in due time the cam helix 725 will strike the pin, and as the pin cannot shift axially, the cam shifts. It therefore shifts on the cam shaft 616, shifting the whole compound cam from position Figure 76 to position Figure 77.

To prevent the shifted cam being displaced, there is provided a fixed shift pin 732, Figures 52, 66, 67, 76, 77, fast in the main casting top 16. Working with it, is cam 730 which has a holding ridge 731 which thus catches on one side or the other of 732, Figures 76, 77, and prevents the compound cam from shifting at the wrong time. At the right time, a helical bevel 733 on the cam 730 catches on the fixed shift pin and shifts the compound cam back into position Figure 76.

The middle four cams are composed of two pairs, 726 and 728, and 727 and 729, and will be called the prepost cams. The first pair work a roller 734 and the other pair work a roller 735. These two rollers, Figures 69, 70, 76, 77, are mounted on arms of a prepost lever 736, rotatable on shaft 609. The no-direction stepper position, that is the shifted position of the compound cam, Figure 77, brings into alignment 726 with 734, and 728 and 735. The direction-stepper position of the compound cam, that is the unshifted position, Figure 76, keeps 727 to 734 and keeps 729 to 735. In the normal position, the rollers 734 and 735 locate the prepost lever 736 centrally, Figure 69. But the rotation of the cam shaft causes one pair 726—728 or the other pair 727—729 to move the lever 736. One pair moves the prepost lever one way, the other pair of cams moves the prepost lever the other way.

The prepost cam lever 736 works the prepost counter-lever 737, Figures 52, 69, 70, 71. This lever is rotatable on shaft 711. With its outer arm it works with 736 and on its inner end it carries the prepost fork 738, Figures 52, 61, 64, 65, 71. This fork embraces the centric 739, Figures 61, 65, 71, fast on the preposter 740.

This preposter is mounted in gibs 741, 742 fast on the feeder base 715. There is an elongated hole in the plate and also in the centric, permitting a limited sliding of the plate and centric within the gibs, without interference from the feeder base 715 or the shaft 609. The gibs, however, compel the preposter and the feeder base to rotate together. The fork 738 has sufficient clearance to permit the centric to move up or down in it somewhat. The fork therefore can slide the preposter, but does not prevent its rotation about the cam lever shaft 609.

And finally we reach the statement. No direction stepper present on the carrier makes the preposter move toward the rear, left, Sheet 19. A direction stepper present and the preposter moves toward the front.

The preposter at its rear by a pin-and-slot moves a bell crank 745, Figures 4, 60, 61, 64, fulcrumed on a stud fast in feeder base 715. The other arm of the bell crank is jointed to the upper eye of the link 82, sliding the friction wheel 76.

At its front, the preposter by a pin-and-slot moves a bell crank 716. This bell-crank by its other arm moves the link 678 which at the other of its chain of parts rotates the prepost cam shaft 669, Sheet 17.

On its inner side, left Figures 52, 64, 59, 60, the preposter carries two pins 747, 748. Working with 747 is a pin 749 and working with 748 is a pin 750. Pin 749 is fast in a radial arm 751 and extends through to the other side. Pin 750 is fast and extends through a radial arm 752 rotatable on shaft 609 and carrying the arm 751. Pins 749 and 750 on the porition near the preposter pins 747 and 748 are cut to have their upper surfaces to be a radius to the center of shaft 609. Moreover, their outsides are cut away for clearance. At their opposite ends pins 749 and 750 are round, Figure 58, and enter slots in the feed spring lever 753, constantly urged upward by a long, strong spring 754, whose lower end abuts the bottom 11 of the main casting. The feed spring lever 753 thus gives a constant tendency to the pins 749 and 750 to rotate as shown by the arrows, Figure 58.

When the pins 749 and 750, Figure 59, both abut their mating pins 747 and 748, then 747 tends to go up and 748 tends to go up also. But both pins are fast in the same preposter 740, Figure 60. The latter cannot go both ways at once, so it is simply positioned. And the parts are so dimensioned that this position is also the central or normal position. Should the preposter, however, be slid off center, say to the rear, as in forestepping, Figure 59, then 747 clears 749, while 748 slides further upon 751. The former thus becomes ineffective, the latter remains effective. The upward tendency of 750 is now unopposed and may rotate, the preposter and the feeder base anticlockwise. Similarly if the preposter had been moved to the front, as in a back-stepping, it would have a tendency to rotate clockwise.

The preposter also carries two pins 755, 756, Figures 60, 59, 64. These work with two pins 757, 758, fast in the magnifier 759, Figures 52, 57, 59, 64, fulcrumed in a bracket 760, fast in the front wall 15. In the normal central position, the plate pins 755, 756 are both between the magnifier pins 757, 758, Figure 59. Sliding the preposter rearward makes 757 effective, sliding the preposter forward makes 758 effective.

Normally when the machine is not feeding or stepping, the parts are in their central positions as shown in the figures. The operator may now move the feed power handle 389, Figure 3, and by the parts already described, rotate the arm 380, Figures 30, 31, and by means of pin 379 rotate the whole feeder cage about the axis of the main shaft. The chain of parts already described inclusive of link 661, Figures 4, 30, 31, rotates the feeder base 715. This rotates the preposter and one of its pins 747 or 748 goes down. This depresses 749 or 750, which depresses the spring lever 753, Figure 58, and compresses spring 754. Both arms 751 and 752 go down. The plate pins 755, 756 pass between the magnifier pins 757, 758, Figure 59, without contact.

The bell crank 745, Figures 60, 61, is not moved on its fulcrum, but moves like a body rigid with the feeder base 715, to move the friction wheel link 82. The bell crank 716 is not moved on its fulcrum either and therefore also moves like a body rigid with the feeder base. Therefore, the links 661 and 678, Figures 62, 61, move like a single link, and since the upper eyes of these links, Figures 30, 31, are in alignment, the cage and detector sled mechanism move like a rigid body without any relative motion. Therefore no prepost movement is given to the prepost shaft 669 or to any of the detectors. So they all remain retracted from the steppers and will not interfere with them. When the operator lets go the feed-power handle 388, the spring 754, Figure 58, lifts the lever 753 and all the parts are brought back to their normal central positions and held there.

However, suppose the step-button is pushed. The cam shaft 616 starts rotating. The direction cam lever 718, Figures 52, 73, 74, determines the absence or presence of a direction stepper. Next the compound cam 724 is shifted or not shifted, respectively. Then the prepost fork 738, Figure 61, is slid toward the rear for the absence of a direction stepper or toward the front for its presence. This is before the release of the feeder base which is temporarily held, as will be later explained. Thus preliminarily the preposter moves link 82 to slide the friction wheel 76, off from the center hole in the leather facing 75 on the friction disc 68, Figure 4. Thus power to feed is now obtained independent of and before any motion of the feeder base. Also this preliminary motion of the preposter cleared a pin 747 or 748 from its mating pin, so that upon subsequent release the feeder base will have a tendency to rotate only one way. Also the preposter has operated bell crank 716, which by link 678, etc. has rotated prepost cam shaft 669 and made effective the proper kind of detector 663 or 664 in the sled, Sheet 17. And finally, the prepost plate has brought one of its pins only, 755 or 756, to engage its proper mating pin 757 or 758 of the magnifier.

All this time, the feeder base has not yet rotated on the shaft 609. This was because it could not. It was held by having two pins, 762 and 763, fast in it, Figures 62, 63, 64, engaged by a centralizing lever 764 fulcrumed on shaft 712. The lever has a stud 765 which is engaged by the bottom of a cam lever 766 which is cammed by a cam 767. At that moment the cam shaft in its rotation had rotated sufficiently to jam the cam 767 on the roller of cam lever 766, which jammed the centralizing lever 764, which centralized the feeder base. And the preposter was slid by the fork 738, while the feeder base 715 was held. Thus all the pre-part of the prepost work is over before cam 767 releases its cam lever 766.

Immediately upon the release of the centralizing lever, the push of feeder spring 754, Figure 58, becomes effective. The feeder base now bodily rotates in the same direction as 745 and 716, Figure 61 had already rotated, that is, anticlockwise for fore-stepping. The friction-feed wheel thus moves further from the center and the feed gains speed. The carrier steppers move down, faster. The links 661 and 678 rise and the sled and detectors rise.

Between times the cam shaft 616 had continued its rotation until the jump clutch 617 had been pulled out of clutch by the unclutching pin 636, Figures 56, 53, 54. The cam shaft comes to rest and waits.

The feed continues until an oncoming stepper 642 encounters its mating detector 663. The stepper pushes back the detector which pushes back the sled 647, etc. until at the end of the chain of parts, the link 661 pushes back the feeder base 715, which carries the prepost plate pin 755 to hit the top of magnifier pin 757.

When the magnifier pin 757 is pushed down, the magnifier bottom 759 is moved to the front (right in Figure 57). It thereupon clicks off and releases an arm 770 of the step-end counterlever 771, which is constantly urged by a spring 772, to move the step end lever 637 to pull out its unclutching pin 636 from the jump-clutch. The jump-clutch is thus released and the cam shaft starts on its second semirevolution.

The step end counter lever has a pin 773, Figures 57, 56, which holds down an arm 774 of the brake-release lever 775, rotatable on shaft 711, Figure 4. This lever by means of a link 776, rising through a hole in the main frame, is connected to the brake lever 777, operating a brake band 778 embracing a brake pulley 779, fast on the main shaft 366, Figures 5, 2, 4. There is a strong spring 780 about link 776 and tending to brake the main shaft. Normally the brake band is held open and the spring 780 is compressed, because the brake release lever 775 is held by the step-end counter-lever 771, which is held by the magnifier. Upon the clicking off of the latter, as above described, not only is the next semi-revolution of the cam shaft 616 started, but the brake band 778 grabs the brake pulley 779 and stops it, and the paper pusher is thus stopped.

When the drum dog had encountered its mating pawl, it had pushed back the feeder cage, etc., the feeder base 715, Figure 61, etc., inclusive of the friction wheel 76, Figure 4. The latter had thus been forced back nearer to the center of the friction disc wheel 76, and so had slowed down. So when the brake was applied, the feed was already slow, and the shock of suddenly stopping was not great.

However, the preliminary prepost motion of 76 downward had not yet been offset, and the wheel 76 is still below the center of the disc and so still is rubbed by the leather to move the paper pusher, although slowly. This it cannot do, as the stepper is still on its detector and the preposter is still on the magnifier, which cannot go any further. This rubbing of the leather therefore puts a strain in the shafts and other connecting parts. And if the friction wheel were now freed, the wheel would relieve its strain, spin back, overrun its non-strained position, and actually move the pusher back. This must not occur so the brake band is applied, and the motion of the main shaft is completely stopped while the friction wheel 76 continues to slip on the friction disc.

Immediately thereafter, however, the second semi-revolution of the cam shaft 616 commences. The cam 767, Figure 63, forces down the centralizing lever 764, thus locking the feeder base 715 in its central position. The parts were already there, having been brought there by the carrier stepper pushing back the detector, but now they are locked in place. Then the prepost cams 726, 727, 728, 729, Figures 69, 70, return the prepost lever 736, prepost counter lever 737, prepost fork 738 and preposter 740 to its central position, Figure 61, jerking link 82 up and bringing the friction wheel 76 into the clear. This clearing of the friction wheel permits the freeing of the strains made by the friction leather. The wheel spins back, overruns, spins forward, etc. This vibration very soon dies out and the wheel assumes a non-strained position. All this time, the main shaft was held by the brake, so the pusher remained stationary, unaffected by the vibrations of the feeder wheel. The return prepost motion of the preposter also jerked link 678 down, rotating the prepost cam shaft 669 back to its central position and pulling out the detector 663 from under stepper 642, to clear the same for the next feed-step. This is the post part of the prepost movement. The rotation of the cam shaft continues and shifts the compound cam 724 back to its normal position, Figure 76. Also it forces back roller 782, Figure 57, upon the step-end clutch lever 637. This forces down arm 770 to be again caught by the magnifier bottom 759. It also forces down the pin 773, Figure 56, which pulls down the link 776, which compresses the spring 780, pulls down the brake band lever 777 and opens the brake band 778.

The operating parts of the cycle thus are replaced. So now the unclutching pin 620 in the step button lever 619, Figures 55, 52, 54, falls into its gap and the jump clutch is pulled out and the step cam shaft comes to rest.

This completes the explanation of the operation of the parts for a forward step. In case the step would have been backward, the cycle would have been the same except that the prepost plate would have had its preliminary motion to the front, and its connected parts would have moved correspondingly.

Attention is called to the fact that during a fore-step, the prepost plate pins 755, 756, Figure 60, first move up, then down again. For a back step the pins 755, 756 first move down then up again. In both cases, however, the kick-off moves the magnifier bottom 759 toward the front, Figures 59, 57, and operates on the step-end counter-lever 770 in the same way.

The prepost mechanism will be somewhat further explained. The reason why the feed-friction wheel has been given this preliminary or prepost motion is to enable the friction-wheel to have some power even when the feed is tiny, say 1/64 inch. The friction-wheel, while at the center of the friction disc, has no power, as there is a hole in the leather. By pushing it off center to engage the leather with a good grip, the friction obtains some power even when the step is small, and thus tries to feed the drum. It does so and generally no harm would occur. However, if the feed is tiny, say 1/64 inch, it might easily be overfed unless prevented. This is done by having the fore-detector already intruded in the way of the next fore-stepper. So the prepost motion also lets the fore-detector in. The feed friction moves the carrier along until the stepper encounters the mating detector, and pushes the feeder cage back. This continues until the magnifier is clicked off as above described. In the case of a tiny step, this occurs almost immediately. The prepost mechanism would be unnecessary if no small steps were to be made. Then the proper detector could be made effective during the stepping. With the prepost mechanism, the smallness of the step is not limited.

Moreover, the prepost mechanism not only brings the detector into cooperation with the steppers during the stepping cycle, but also holds it out of cooperation during the time when the step-cam-shaft is at rest in normal position, that is, when a step-cycle is not established. Therefore, during feeding by the hand-wheel or by the power feed lever, there is no cooperativeness between the stepper and the detector, and no interference. But during the step cycle, the prepost mechanism moves before (-pre) the step, does not move during the step, and moves again after (-post) the step. This (before, not during, and after) the step, but all within the step cycle, I have named the prepost. During hand or power feeding some of the prepost parts, for instance, the preposter itself, have a motion, with the feeder base. But during the stepping cycle, the preposter has not only the feed motion just stated, but also its own prepost motion additional to the feed motion and occuring prepost the feed.

A certain number of conveniences will now be mentioned.

The constant rotation of the power clutch 615, Figure 52, by its friction tends to rotate the cam shaft 616 with it, and tends to carry edge 625, Figure 54, against pin 620. This makes it hard for the operator's finger to remove the unclutching pin 620 by the step button 602, Figure 28.

It is desirable to free the pin 620. This is done by adding an extra notched cam 785, Figures 52, 75, 76, 77, which operates on a locating spring lever 786, which holds the cam shaft so that both pins 620 and 636 are free.

In operation, the clutch bevel 623 strikes the pin 620, and forces the clutch 617 out of engagement. The drive is thus broken, but inertia and friction rotate it on in the same direction. But soon the edge 625 strikes the pin 620, and the clutch 617 and connected parts are forcibly stopped. But the friction of 615 on 616 tends to keep the edge 625 against the pin 620. The notched cam 785 is so dimensioned that it causes the shaft 616 and the jump clutch 617 to back up a little, and thus free the pin 620.

It is convenient to give the magnifier 759 only a limited motion. This is done by a screw 788, which strikes the wall 15.

It is found that the sliding of the prepost plate wears out its pins. To prevent this, spring lever 753, Figures 58, 59, is supplied with an extension 789, Figures 59, 62, 64, reaching under the centralizing lever 764. When the cam 767 locks the cam lever 766 and lever 764 down, Figure 63, the latter pushes down slightly upon 789 and thus pushes down 753 and the pins 749 and 750. This frees the plate pins 747 and 748 from rubbing. Of course when the cam 767 has freed it, the spring lever 753 rises and the pins 747 and 748 are both held again.

We now return to the mechanism above.

In order to preset the various steppers 642, 643, 644, Sheets 16, 17, in their proper places in the dovetail grooves, the procdure is thus. First bring the paper pusher to the proper place. This may be judged by either the scale 396 and pointer 395, or by bringing down the paper clamp by the pedal, and looking at the paper. The drum is now properly located, and all that is necessary is to place a stepper therein. To accomplish this readily, the prepost shaft 669, Figures 41, 42, is shifted to the right, Figure 43, whereupon a spring pin 790, assembled in the wall 652, enters the left groove 791 in the shaft 669. This does not ungear the pinion 670 from the sector 671. But it does bring the clearance setting portions 682 opposite all the tails 683 and 684. Any detector can therefore be readily moved by its tail, and when so moved it will tend to remain either completely out, Figures 44, 47, or completely in, Figure 45. Now the operator pushes in all the way, the particular detector 685 by which he wishes to set a stepper 642. He slips the stepper 642 into the dovetail groove 641, Figure 41, but loosely so that it drops by gravity on top of the tooth 685 and rests there. He then screws the stepper tight. It is set.

To advance for the next stepper setting, he pushes the tail 683 down, 663 assuming the position, Figure 46. He now feeds the pusher, and repeats for next stepper.

For the back-stepper, the procedure is far more clumsy. This is so because now gravity instead of being a help is a hindrance. If the stepper, loose in the slot, were let go, it would slide down in the groove to the bottom of the carrier drum. If the operator were to hold the stepper, he might move it, and his fingers would be in the way of the screw driver. To eliminate all this trouble, the stepper is given a temporary support underneath. This may be done by sliding the sled and setting the back-stepper on top of a fore-detector. This supporting detector is then removed by sliding back the sled. But better yet, the sled is left unchanged in position, but between the back-detector and direction-detector is placed an auxiliary setting detector 662, which is shaped like the fore-detector 663, but has its tooth broad enough to be brought under the bottom of the back-stepper, Figure 49. Locating the detector 662 also locates it for the back detector 664. After locating, the back-stepper is screwed tight and the setting detector 662 is withdrawn.

The procedure for locating the direction stepper is similar. In fact the direction stepper 644 may be shaped just like the regular fore-stepper 642.

When all the steppers are set, then the shaft 669 is shifted back to position, Figures 41, 42, and all desired detectors are brought to position, Figures 45, 48.

The reason why there are four fore-detectors is that it sometimes is necessary to do four side trimming on a pile of paper, and the trims may be very little. The steppers could therefore not be brought close enough together, in a single groove of the carrier. They would be in each other's way. Bay having four grooves and four fore-detectors, all such possibilities are provided for.

Again it frequently happens that the paper is being cut up into labels, and that a trim has to be taken between the labels. The trims are thrown away. The labels are kept. The series then is (label, trim), (label, trim), etc. This continues to the last label where the procedure is different. Here to obtain a smooth cut, and on the portion now up against the pusher, the labels are turned around and a trim is taken. At this place, the series becomes label, trim, trim, label. Two trims come together. The steppers are thus brought close together and there may be no room for them in one dovetail groove. So they are set in more than one groove. The steppers thus are arranged into groups, one group in each groove, but all the groups together constituting a single series of steppers.

A similar arrangement of steppers is made when the paper is to be cut into very narrow labels. The steppers are arranged in the several grooves, in several groups constituting one series.

It frequently happens, particularly in label work, that the number of cuts on a sheet is very large. For that reason the number of dovetail grooves in the drum has been made quite large. The sled may be slid from one set of steppers to another, and fastened there by the locking pin 650.

But large as the number of grooves is, nevertheless there are many label sheets for which this is insufficient. But in most of them, first the paper is cut into portions and then these much smaller portions are cut up again. This requires comparatively few steppers when the sheet is large, that is when the steppers are far from the detectors and requires many steppers when the sheet is small, that is when the steppers are near to the detectors. Advantage has been taken of this situation to multiply the stepper capacity of the machine.

Thus, the stepper-carrier 640, instead of being rigid on the main shaft 366, Figures 27, 30, is slidable and rotatable thereon. It, however, carries a pin 800, which fits into a hole 801, in a wheel 802 fast upon the main shaft 366. There are six holes 801 and the pin 800 may be entered into any of them. The carrier 640 can thus be pulled out, and be given a turn and its pin 800 entered into any of the other holes 801. When the paper lengths to be cut are small, this sextuples the room for steppers. To prevent the carrier from accidentally working itself out, it is held in by a disc 803, itself held in by a spring 804.

As the carrier may thus be brought to several positions about the main shaft, it became highly inadvisable to cut any openings in the dovetail groove for the insertion of the steppers. Those openings might come just where they would be in the way. So the grooves are continuous and stepper fastening of such a nature was chosen, that a stepper could be inserted readily anywhere. The form adopted consists of a double wedge where the body of the stepper has a wedge tail 808, Figure 41, formed integrally therewith and inside of the groove is a wedge or block 809, wedging on one side against the groove side and on the other side against the tail 808 to thereby wedge the tail against the other side of the groove. Moreover a screw 810 passes through the stepper-body and is threaded into the wedge. The screw is riveted over at its end. To remove a stepper, the screw is unscrewed. The operator need not be too careful as the riveted end prevents the complete unscrewing of the screw from the wedge block. The combination stepper may now be readily removed by first pushing the tail toward the wedge block, and then pulling out. Conversely in inserting a stepper, the operator places the wedge block on the slot and pushes the stepper tail toward it, whereupon it readily enters the slot. Then he lets the stepper fall down by gravity on top of the detector as previously described, and tightens the screw.

Sometimes, although rarely, it is desirable to remove the whole carrier 641 with the steppers set upon it. For this purpose the outer plate 653 is ring shaped and it is kept central by a removable triradius 805 which has some pins 806 entering holes in the ring plate.

Attention is called to the fact that the knife mechanism and the step mechanism are totally independent of each other. It is therefore possible for the operator to push the cut button and make a cut. This does not start any stepping. If the operator is dissatisfied (for instance, if the stop does not "bleed" satisfactorily), he may advance the paper any amount by hand or power without in any way being interfered with by the stepping mechanism. He may now take a cut by pushing the cut-button. Then on pushing the step-button, the paper will advance to the next stepper and will stop at the preset place. The intermediate cuts and feeds have not changed the preset places for the automatic steps.

Again, suppose the steppers have been set up and the operator wishes to make sure that they are in their proper places. He then pushes the step button. The machine steps and stops. The operator may now examine the accuracy of the stepping by either the scale at the top, or by bringing the clamp down on the paper. Without making any cut, he may then again push the step button and advance the next step, etc.

Sometimes it happens that the operator loads the table with paper, and before he has placed steppers in their proper positions, he inadvertenly pushes the step-button, the machine begins to step, and as there may be no stepper in the carrier to stop it, the paper is fed forward and may fall off the front table. Under these circumstances, the operator grabs the power-feed-handle 389, Figure 3, and pushes it back by main force. He thus pushes back the feeder base 715. This rotates back the prepost 740. This, by means of its pin (755 or 756) engages the mating pin (757 or 758) of the magnifier. The magnifier is thus clicked off, the cam-shaft makes its second semi-revolution and the step stops.

A similar danger exists when the back table is loaded with paper and the operator started the pusher back without lifting it. The pusher might brush off or injure the paper. The back motion of the pusher can be stopped by the operator by the power-feed-handle 388, as above.

To prevent the feeding of the pusher too far in either direction and causing a jam, the wheel 802 is supplied with one pin 811, Figures 27 and 30, and the inner plate 652 with two pins 812 and 813. The wheel pin in its extreme position pushes back the plate to its central position and stops the feed.

Should a step have been started by the step push button and there is no stepper to stop the step and the operator does not stop the step, the feed will continue until the pin 811 strikes either 812 or 813. This will force the feeder base 715 back to central position, click off the magnifier and stop the step.

It is thus seen that the fore-stepper is really a stopper of the fore-step. The back-stepper is similarly a stopper for the back-step. The direction stepper does not start and does not stop any step. Its presence determines that the next step shall be a back-step. Since they are all mounted on the stepping mechanism drum, and as each has something to do with either the end or the beginning of a step, the term "stepper" has been chosen as a contraction for the expression "preset part associated with either the beginning or end of a step of the paper pusher". The detector is a part that detects either the presence or the absence of a stepper.

*Waiting mechanism*

With the mechanism above described, an operator can prepare the machine by first setting the stepper, detector, sled, etc. He then can step the machine to the desired location by pushing the step button one or more times. He can make a cut by pushing the cut button. He can make a trim by advancing the paper, and then again push the cut button. But for every step, he must push the step button, and for every cut he must push the cut button.

Some machines on the market have mechanism whereby the paper is fed and cut, fed and cut, repeatedly. The mechanisms on the market have been found unsatisfactory because they cannot be arranged to give sufficient time for certain intermediate functions. They cannot be made to "wait".

In the cutting of paper, various jobs occur frequently. Of the most common is the cutting of labels. Suppose a cut has been made. A bunch of labels has been cut off. Because of the bevel edge of the knife and the beam, the labels cut off are now in a leaning oblique pile with the top label far out over the bottom. If let alone the labels would fall over, a condition that must be avoided. This is commonly done by the operator catching the falling labels either on a board that he holds or on the back of his hand or hands, and straightening the label pile up, tilting it back against the vertical surface of the paper on the back table. He then removes that bunch of labels and proceeds. But to straighten up the labels and remove them requires time, and so here we find need of a wait period immediately after the cut.

Now the operator feeds the paper ahead ready for the next cut. However, it happens that, particularly on slippery paper, the pile of paper is frequently disturbed during feeding. It must be jogged back before cutting. This also requires time. He therefore needs a wait period after the feeding.

Another very frequent job is four or three side trimming. Here the operator makes a cut, obtains a trim. He throws the trim away. Between times the machine should automatically advance the paper to the next stop. The operator now takes the paper pile and turns it around for the next cut. This takes time, and so a waiting period is required after the feed and before the next cut.

Other requirements are easily possible, so the waiting mechanism provided for this machine has been made quite adjustable. Starting with the cut, there is a wait of an adjustable amount from 0 seconds to the maximum. Then comes the step, after which there is again a wait of an adjustable period from 0 seconds to the maximum. Then the cycle (cut, wait, feed, wait) is repeated, etc.

The mechanism is shown in Figures 1, 4, 78, 79, 80. There is a power shaft 820, driven (say by a sprocket 821 or belt) from the motor driven shaft 88, Figure 4. The shaft 820 is supported in bearings in the front frame. It carries a worm 822, which drives a worm wheel 823, rotatable about its center. As the motor runs at commercially uniform speed, so does this worm wheel 823 and it may be considered as a clock. In Figure 78 it rotates arrowwise.

This clock wheel 823, Figure 80, is ring shaped. It is mounted on a hub 825 of the waiter 826. The latter has three rolls 827, working on inclines therein, and which constitute a silent pawl and ratchet connection between the waiter and the clock. The waiter is rotatably mounted on a stud 828 fast in the wall 213 of the front framing. Rotating the waiter in the anti-arrowwise direction, winds up a spring 829 constantly urging the waiter arrowwise. Upon release, the waiter therefore moves arrowwise, but no faster than the clockwheel permits, the ratchet rolls 827 preventing any speed in excess.

Behind the waiter 826 is the winder 831. This is rotatable on the stud 828 and carries a pin 832, adapted to strike a pin 830 in the waiter. Rotation of the winder in the winding direction will in due time make pin 832 catch 830 and wind up the waiter, and spring.

The winder 831 has on it a gear 835 which meshes with a rack bar 836, which reaches down through a hole in the framing and is operated by a pin 834 in the knife lever 158, Figures 1, 13. In the normal position the knife lever is up, and rack bar 836 is up. During a cut, the knife lever goes down, and the rack bar rotates the winder, Figure 78, and pushes the waiter back to full wound position. The knife lever then goes up, the winder rotates back and removes the interference of pin 832 from pin 830, leaving pin 832 in position marked 833, Figure 78.

The cylindrical surface of the waiter 826 is cut into a continuous ratchet wheel 837. In its front face, the waiter has a groove 838, in which may be adjustably bolted the cut-starter 839 and the step-starter 840.

The cut starter in due time may push up the tooth rod 841 connected at its upper end by an arm to the cut-button shaft 526. It thus operates as though the cut button 527 had been pushed and the machine therefore makes a cut, etc.

The step starter 840, in its own due time, lifts up a clicker 842 mounted on a lever 843 pivoted on a stud fast in wall 213. The lever is connected by a link 844 to an arm which is fast on shaft 601, Figures 2, 29. It thus operates as though the step-button 602 had been pushed and a step is therefore initiated.

Since the step may feed the paper from $\frac{1}{64}$ inch to capacity, it is of variable duration and may take some time. So it was decided to halt the running down rotation of the waiter, while the paper is stepping. This is accomplished by a pawl 845 engaging the ratchet 837 and preventing the waiter from following the clock. The waiter waits.

The starter 840 lifts clicker 842 sufficiently to start the step mechanism. That is, it lifts pin 620, Figure 54, Sheet 18, higher than the edge 628. The jump clutch starts and by its bevel surface 628 lifts the pin 620 still higher. That is, the clicker 842, Figure 78, is lifted still higher and thus brings the pawl 845 into mesh with the ratchet 837 only after the step mechanism cam shaft is already rotating.

During the lifting of 842 by 840, the latter passed to the left of the former. So when the step mechanism cam shaft has finished its rotation and the shaft 601 lifts link 844 and removes the pawl 845 from the ratchet 837, the clicker 842 will fall to the right of the step starter 840 and not interfere with it. The waiter will thus advance further until something stops it. It has already been said that sometimes it is cut starter 839 striking 841 that stops it. The machine then makes a cut. Sometimes it is desired that no cut should be made automatically. Then a stopper pin 846 is inserted in the path of 839. The waiter thus stops moving before a cut is made. However, if the cut button is pushed, the machine will make a cut.

On the winding up of the waiter, the starter 840 pushes the clicker 842 back without moving the lever 843.

It was thought advisable to prevent any motion of the waiter unless the knife was completely up. For this purpose a pawl 847 was provided. It is fulcrumed on a pin fast in the framing and is constantly spring urged to keep the pawl out of engagement with the waiter ratchet 837. But when the winder 831 starts its movement, that is when the knife starts down, then an incline 848 cams the pawl 847 into engagement with the ratchet. In all positions of the knife except the extreme top, the waiter is thus held against running down.

It is frequently necessary for the operator to stop the operation of the machine. This he does by manaling out the disoperator bar 850. This cams down the rod 851 and pawl 852, which thereupon engages the ratchet 837 and stops the motion of the waiter. This, however, does not prevent the manual operation of the machine by either the cut button or the step-button. Moreover, it does not prevent the winding up return motion of the waiter as the pawls are sufficiently flexible to permit the ratchet teeth to pass under them even if the pawls are in.

The machine thus (cuts, waits, feeds, waits), and repeats the cycle. In due time all the stock will be cut up and the machine is ready for a new load. The step mechanism automatically makes a back-step and stops. It is highly desirable that now the waiting mechanism should automatically become inoperative. In fact any back motion of the pusher should disconnect the waiting mechanism. This is accomplished by extending the disoperator bar 850 to the rear, Figure 30, and providing a wedge cam 853 upon the plate 852. Any backing motion of the pusher (by hand or automatic) carries the cam 853 down, that is, the disoperator bar 850 is pushed forward. Thus it operates as though the waiting mechanism had been stopped by hand. When it is required to resume the automatic repeat, the bar 850 is pushed in manually and the work resumes.

In the mechanism above described, the power to move the waiter was supplied by the wound spring. This is not necessary. If the silent ratchet rolls 827 and the spring were removed and a friction were substituted, the mechanism would function equally well. The winder would still wind up the waiter, in spite of the friction. The friction would attempt to carry the waiter along in its own direction, at its own speed, and would do so unless, resisted by one or more of the pawls, as above described; moreover the pawls might be silent pawls stopping the waiter by greater friction. All that is really necessary is to attempt to give motion to the waiter, and to resist that motion when desired.

It is understood that the word paper as used in this specification or claims refers to any material to be cut by the knife. For instance, paper, cardboard, photographic film, asbestos, etc.

It will also be understood that while I have illustrated one specific form of paper cutter, many modifications could be introduced without departing from the essence of my invention. Therefore, it is my intention to cover any such modifications that will come within the scope of the appended claims.

I claim:

1. In a cutter, a table, a cutting knife means to drive said knife through a regular cutting stroke, and reversing means to reverse the motion of the knife after it has started on its stroke to thereby bring the knife back to its starting position without its finishing the regular cutting stroke, the movement of said reversing means being initiated by actuating means located above said table.

2. In a cutter, a table, a clamp adapted to hold stock in cutting position on said table, a pusher on the table, means for lifting the entire pusher from the table to thereby clear the table for the purpose of loading said table from the rear.

3. In a cutter, a table, a clamp adapted to hold stock in cutting position on said table, a side wall for said table, and means for lowering said side wall to bring its surface in line with the table top.

4. In a cutter, a table, a clamp adapted to hold stock in cutting position on said table, a lowerable wall for said table, a second table, the lowerable wall when down making the top of the first table continuous with the top of the second table.

5. In a cutter, a beam, connections at the two ends of the beam, one connection causing one end of the beam to move in a true arc of a circle, and the other connection causing the other end to move in a curved path other than truly arcuate.

6. In a cutter, a knife beam, means to support the beam at its ends, and a stalactite to guide the beam, near the middle.

7. In a cutter, a clamp, two links therefor a power lever for both links, a spring pusher for the lever, and means for adjusting the relative movement of the lever and pusher, to thereby vary the pressure of the clamp.

8. In a cutter, a clamp, a spring pusher therefor, and a stopping means for the pusher to stop it independently of the clamp.

9. In a cutter, a clamp, a spring pusher therefor, adjustable intermediate mechanism between them, a stop for stopping the pusher at its central location, whereby the intermediate mechanism can be adjusted, while in contact with the pusher, and without moving the same.

10. In a cutter, a clamp, a spring pusher therefor, intermediate mechanism between them, adapted to be adjusted to vary the pressure of the pusher on the clamp while always in operative connection with the pusher and without moving it.

11. In a cutter, a clamp having a pressing face, a clamp plate for the face, and adapted to be mounted on the clamp by a motion parallel to the face.

12. In a cutter, a stock supporting table, comprising two table tops adjustable to form a slot between them for accommodating a cutting stick, and means for widening and narrowing said slot.

13. In a cutter, a stock supporting table, comprising two table tops adjustable to form a slot between them for accommodating a cutting stick, and means for holding said stick down in the slot.

14. A cutter, a knife, a stock supporting table, a clamp to hold stock on said table, an adjustable front-table, a scale in the latter, and means for locating said scale at a constant distance from the cutting plane of the knife.

15. In a cutter, a knife, a driving clutch for the knife, a spring tending to make the clutch operative, and a pawl for preventing the spring from operating.

16. In a cutter, a knife, a brake for the knife, a spring tending to make the brake operative, and a pawl for preventing the spring from operating.

17. In a cutter, a knife, a clutch for driving the knife, a compeller for unclutching the clutch, and mechanism for advancing the compeller to thereby remove its interference for the next clutching.

18. In a cutter, a knife, a bull gear for the knife adapted to have both a direct and reverse rotation, a driving clutch for the bull gear, an unclutcher for the clutch operated by the direct rotation of the bull gear and mechanism for rendering the unclutcher inoperative during the reverse rotation of the bull gear.

19. In a cutter, a table, a knife, mechanism for driving the knife, and a reverser plate located above said table and pushable to thereby stop the knife.

20. In a cutter, a knife, a clutch for driving the knife, an unclutcher for rendering the clutch inoperative, a pawl for rendering the unclutcher inoperative, and an adjustable dog for removing the interference of the pawl to thereby unclutch the knife and stop it at a predetermined position.

21. In a cutter, a table, a clamp adapted to hold paper in cutting position on said table, knife mechanism, paper pusher mechanism, and a mechanical interlock between the two mechanisms to prevent them from functioning simultaneously.

22. In a cutter, a table, a clamp adapted to hold paper in cutting position on said table, a knife, a cut-button operating mechanically for controlling the knife to make one cut, a paper pusher, a step button for advancing the pusher one step, the knife mechanism and the step mechanism being independent of each other whereby cuts may be taken without intermediate stepping.

23. In a cutter, a table, a clamp adapted to hold paper in cutting position on said table, a knife, a cut-button operating mechanically for controlling the knife to make one cut, a paper pusher, a step button for advancing the pusher one step, the knife mechanism and the step mechanism being independent of each other whereby steps may be taken without intermediate cutting.

24. In a cutter, a knife, a power supply therefor, a paper pusher, a cam shaft therefor, a power supply therefor, the power to the cam control shaft and the power to the knife being independent of each other.

25. In a cutter, a table, a paper pusher, a cam shaft therefor, automatic means for stopping the cam shaft at the beginning of a step, and means for starting the cam shaft at the end of a step.

26. In a cutter, a table, a paper pusher adapted to step in both directions, a prelocatable back-stepper for automatically stopping the back movement of the pusher.

27. In a cutter, a table, a paper pusher adapted to step in both directions, and a prelocatable direction stepper, controlling that the next step shall be in a predetermined direction.

28. In a cutter, a table, a paper pusher, two or more groups of steppers associated with said pusher and two or more detectors, each detector cooperating with the steppers of one group.

29. In a cutter, a table, a paper pusher, steppers associated with said pusher, a mechanical detector for the steppers and means for rendering the steppers ineffective.

30. In a cutter, a table, a paper pusher, a stepper, associated with said pusher, a mechanical detector therefor, the stepper and detector cooperating to first slow down the pusher movement and then to stop it.

31. In a cutter, a table, a stepper adapted to step in both directions, a mechanical detector therefor, the detector mechanism being operative for both fore and back steps.

32. In a cutter, a table, a paper pusher, a stepper associated with said pusher, a feeder base, a preposter cooperating therewith, the feeder base having feeding motion and imparting such motion to the preposter, the preposter having additional prepost motion, independent of the feeder movement.

33. In a cutter, a table, a paper pusher, a stepper associated with said pusher, a feeder mechanism, prepost mechanism, the feeder mechanism and prepost mechanism both operating during hand feeding of the pusher and the prepost mechanism having an additional prepost motion during the stepping.

34. In a cutter, a table, a paper pusher, steppers associated with said pusher, a detector, and prepost mechanism for moving the detector.

35. In a cutter, a table, a paper pusher, a power feed therefor, a corpal for the feed, a step-mechanism for the feed, and a feeder spring urging the feed to stop when said corpal is actuated and urging the feed to increase its speed when said step-mechanism is actuated.

36. In a cutter, a table, a paper pusher adapted to step in both directions, a power feed therefor, a direction-stepper determining the direction of the feed, and a lever tending to increase the speed of the feed.

37. In a cutter, a table, a paper pusher, a detector sled operatively associated with said pusher, and a centralizer for locking the sled into its central position.

38. In a cutter, a table, a paper pusher, a step mechanism therefor, including a carrier adapted to carry a direction stepper and a friction feed for the pusher, set into rotation one way when the stepper is absent and in the opposite way when the stepper is present.

39. In a cutter, a table, a paper pusher, a step mechanism therefor, and a magnifier magnifying the motion of the paper pusher and coming into operation toward the end of the step.

40. In a cutter, a table, a paper pusher, a step mechanism therefor, including a feed for the pusher, a step-end mechanism first stopping the pusher, then disconnecting the feed, and finally releasing the pusher.

41. In a cutter, a table, a paper pusher, steppers associated with said pusher, a fore-detector for said steppers, a back-detector and mechanism for making the fore-detector operative and the back-detector inoperative.

42. In a cutter, a table, a paper pusher, steppers associated with said pusher, a fore-detector for said steppers, a back-detector and mechanism for making the back-detector operative and the fore-detector inoperative.

43. In a cutter, a paper pusher, step-mechanism for operating said pusher, a feeder spring, a preposter for controlling the operation of said step-mechanism and located by the feeder spring, and a centralizing mechanism for centralizing the preposter and for relieving the pressure of the spring from the prepost while the preposter is moved.

44. In a cutter, a cut mechanism and a step mechanism adapted to be operated independently of each other, and a waiter for operating both mechanisms.

45. In a cutter, a cut mechanism and a step mechanism adapted to be operated independently of each other, and a waiter for operating both mechanisms, the waiter waiting a preset time after the cut mechanism before operating the step mechanism.

46. In a cutter, a cut mechanism and a step mechanism adapted to be operated independently of each other, and a waiter for operating both mechanisms in a repeated cycle (cut, wait, step, wait).

47. In a cutter, a pusher, a cut mechanism and a step mechanism adapted to be operated independently, a waiter for operating them, a disoperator for rendering the waiter inoperative, and means for controlling both the back motion of the pusher and the disoperator.

48. In a cutter, a cut mechanism and a step mechanism adapted to be operated independently of each other, and a waiter for operating both, power attempting to move the waiter and a stopper for stopping the waiter.

49. In a cutter, a cut mechanism and a step mechanism adapted to be operated independently of each other, a waiter for operating both and means for returning the waiter to its initial position.

50. In a cutter, a table, a cutting knife, means to drive said knife through a regular cutting stroke, and reversing means to reverse the motion of the knife after its has started on its stroke to thereby bring the knife back to its starting position without its finishing the regular cutting stroke, the movement of said reversing means being initiated by actuating means located above said table and extending substantially over the entire width of said knife.

51. In a cutter, a table, a cutting knife, means to drive said knife through a regular cutting stroke, and reversing means to reverse the motion of the knife after it has started on its stroke to thereby bring the knife back to its starting position without its finishing the regular cutting stroke, the movement of said reversing means being initiated by actuating means located above said table, and arranged so that it may be actuated by the operator's head.

HYMAN ELI GOLBER.

CERTIFICATE OF CORRECTION.

Patent No. 2,049,256.                                                          July 28, 1936.

HYMAN ELI GOLBER.

It is hereby certified that error appears in the printed specification of the above numbered patent requiring correction as follows: Page 1, second column, line 43, and page 2, first column, line 1, for the word "large" read larger; page 2, first column, line 21, for "Figure" read Figures; same page, second column, line 66, for "integal" read integral; page 5, first column, line 74, for "bull-rank" read bull-crank; page 6, second column, line 48, for "One" read On; page 8, first column, line 15, for "front-rear" read front-to-rear; page 10, first column, line 70, for "ilders" read idlers; page 12, first column, line 63, for "is" read its; page 14, second column, line 72, for "present" read preset; page 15, second column, line 11, for "wuld" read would; page 16, second column, line 48, for the numeral "31" read 31, 2; page 18, second column, line 22, for "and" second occurrence, read with: line 74, for "porition" read portion; page 26, first column, line 7, for "its" first occurrence read it; and that the said Letters Patent should be read with these corrections therein that the same may conform to the record of the case in the Patent Office.

Signed and sealed this 3rd day of November, A. D. 1936.

Henry Van Arsdale (Seal)                                              Acting Commissioner of Patents.